(12) United States Patent
Kozuka et al.

(10) Patent No.: US 9,596,499 B2
(45) Date of Patent: Mar. 14, 2017

(54) CONTENT RECORDING METHOD, RECORDING APPARATUS, AND RECORDING SYSTEM

(71) Applicant: Panasonic Intellectual Property Corporation of America, Torrance, CA (US)

(72) Inventors: Masayuki Kozuka, Osaka (JP); Masaya Yamamoto, Kyoto (JP); Hiroshi Yahata, Osaka (JP); Shingo Matsumoto, Tokyo (JP); Kaoru Murase, Nara (JP); Tadamasa Toma, Osaka (JP); Tomoki Ogawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 153 days.

(21) Appl. No.: 14/573,141

(22) Filed: Dec. 17, 2014

(65) Prior Publication Data

US 2015/0189359 A1 Jul. 2, 2015

Related U.S. Application Data

(60) Provisional application No. 61/928,222, filed on Jan. 16, 2014, provisional application No. 61/921,273, filed on Dec. 27, 2013.

(30) Foreign Application Priority Data

Aug. 27, 2014 (JP) .................................. 2014-172552

(51) Int. Cl.
*H04N 5/76* (2006.01)
*H04N 5/93* (2006.01)
(Continued)

(52) U.S. Cl.
CPC ......... *H04N 21/4135* (2013.01); *H04N 5/765* (2013.01); *H04N 5/7605* (2013.01);
(Continued)

(58) Field of Classification Search
CPC ... H04N 5/76; H04N 5/93; H04N 9/80; G11B 27/00
(Continued)

(56) References Cited

U.S. PATENT DOCUMENTS

2010/0198944 A1 8/2010 Ho et al.
2010/0272414 A1* 10/2010 Reneris .............. H04N 21/4882
386/291

(Continued)

FOREIGN PATENT DOCUMENTS

JP 2011-254139 12/2011

OTHER PUBLICATIONS

Extended European Search Report issued Jun. 3, 2015 in corresponding European Patent Application No. 14197542.5.
(Continued)

*Primary Examiner* — Daquan Zhao
(74) *Attorney, Agent, or Firm* — Wenderoth, Lind & Ponack, L.L.P.

(57) ABSTRACT

A content recording method for a recording apparatus includes the following steps: an automatic recording control step of automatically recording a first plurality of pieces of content in a channel automatic recording area, each of the first plurality of pieces of content being broadcast through a channel in a time slot; a deletion step of instructing a mobile apparatus to delete a first piece of content that has previously been copied or moved from the channel automatic recording area to the mobile apparatus when the recording apparatus detects that the recording apparatus has become able to communicate with the mobile apparatus; and a content
(Continued)

| APPARATUS ID | MEDIUM ID | COMPATIBILITY WITH CHANNEL AUTOMATIC TRANSFER | CAPACITY OF CHANNEL AUTOMATIC RECORDED CONTENT TRANSFER AREA | AUTOMATIC TRANSFER IN INDIVIDUAL RECORDING AREA |
|---|---|---|---|---|
| APPARATUS ID 1 | – | COMPATIBLE | 16 GB | INCOMPATIBLE |
| APPARATUS ID 2 | MEDIUM ID 1 | COMPATIBLE | 32 GB | COMPATIBLE |
| APPARATUS ID 2 | MEDIUM ID 2 | INCOMPATIBLE | NA | INCOMPATIBLE |
| APPARATUS ID 3 | – | INCOMPATIBLE | NA | COMPATIBLE |
| APPARATUS ID 4 | MEDIUM ID 3 | COMPATIBLE | 64 GB | INCOMPATIBLE |
| APPARATUS ID 5 | MEDIUM ID 4 | COMPATIBLE | 128 GB | COMPATIBLE |
| APPARATUS ID 6 | MEDIUM ID 5 | COMPATIBLE | 16 GB | COMPATIBLE | transfer step of copying or moving a second piece of content included in the first plurality of pieces of content to the mobile apparatus when the recording apparatus detects that the recording apparatus has become able to communicate with the mobile apparatus.

14 Claims, 29 Drawing Sheets

(51) Int. Cl.
| | |
|---|---|
| *H04N 21/41* | (2011.01) |
| *H04N 5/765* | (2006.01) |
| *H04N 21/436* | (2011.01) |
| *H04N 21/433* | (2011.01) |
| *H04N 21/4335* | (2011.01) |
| *H04W 8/20* | (2009.01) |
| *H04N 9/80* | (2006.01) |
| *G11B 27/00* | (2006.01) |

(52) U.S. Cl.
CPC ..... *H04N 21/4126* (2013.01); *H04N 21/4334* (2013.01); *H04N 21/4335* (2013.01); *H04N 21/43622* (2013.01); *H04W 8/205* (2013.01)

(58) Field of Classification Search
USPC .................. 386/299, 291, 292, 294, 296
See application file for complete search history.

(56) References Cited

U.S. PATENT DOCUMENTS

| | | |
|---|---|---|
| 2011/0208831 A1 | 8/2011 | Ho et al. |
| 2012/0002952 A1* | 1/2012 | Anderson ............ G11B 27/034 386/293 |
| 2012/0229656 A1 | 9/2012 | Cok |
| 2013/0290485 A1 | 10/2013 | Ho et al. |

OTHER PUBLICATIONS

"DTCP+ Overview Presentation", Oct. 26, 2011 (Oct. 26, 2011), pp. 1-18, XP55187867, Retrieved from the Internet: URL:http://www.dtcp.com/documents/dtcp/dtcp-plus-presentation-for-cptwg-october-2011.pdf [retrieved on May 6, 2015].

* cited by examiner

FIG. 4

| APPARATUS ID OR MEDIUM ID | COMPATIBILITY WITH CHANNEL AUTOMATIC TRANSFER | CAPACITY OF CHANNEL AUTOMATIC RECORDED CONTENT TRANSFER AREA |
|---|---|---|
| APPARATUS ID 1 | COMPATIBLE | 16 GB |
| APPARATUS ID 2 | COMPATIBLE | 32 GB |
| MEDIUM ID 1 | INCOMPATIBLE | NA |
| APPARATUS ID 3 | INCOMPATIBLE | NA |
| MEDIUM ID 2 | COMPATIBLE | 64 GB |
| APPARATUS ID 4 | COMPATIBLE | 128 GB |
| MEDIUM ID 3 | COMPATIBLE | 16 GB |

FIG. 5

| APPARATUS ID | MEDIUM ID | COMPATIBILITY WITH CHANNEL AUTOMATIC TRANSFER | CAPACITY OF CHANNEL AUTOMATIC RECORDED CONTENT TRANSFER AREA |
|---|---|---|---|
| APPARATUS ID 1 | NA | COMPATIBLE | 16 GB |
| – | MEDIUM ID 1 | COMPATIBLE | 32 GB |
| APPARATUS ID 2 | MEDIUM ID 2 | INCOMPATIBLE | NA |
| APPARATUS ID 3 | NA | INCOMPATIBLE | NA |
| APPARATUS ID 4 | MEDIUM ID 3 | COMPATIBLE | 64 GB |
| APPARATUS ID 5 | MEDIUM ID 4 | COMPATIBLE | 128 GB |
| APPARATUS ID 6 | MEDIUM ID 5 | COMPATIBLE | 16 GB |

FIG. 6

| APPARATUS ID | MEDIUM ID | COMPATIBILITY WITH CHANNEL AUTOMATIC TRANSFER | CAPACITY OF CHANNEL AUTOMATIC RECORDED CONTENT TRANSFER AREA | AUTOMATIC TRANSFER IN INDIVIDUAL RECORDING AREA |
|---|---|---|---|---|
| APPARATUS ID 1 | – | COMPATIBLE | 16 GB | INCOMPATIBLE |
| APPARATUS ID 2 | MEDIUM ID 1 | COMPATIBLE | 32 GB | COMPATIBLE |
| APPARATUS ID 2 | MEDIUM ID 2 | INCOMPATIBLE | NA | INCOMPATIBLE |
| APPARATUS ID 3 | – | INCOMPATIBLE | NA | COMPATIBLE |
| APPARATUS ID 4 | MEDIUM ID 3 | COMPATIBLE | 64 GB | INCOMPATIBLE |
| APPARATUS ID 5 | MEDIUM ID 4 | COMPATIBLE | 128 GB | COMPATIBLE |
| APPARATUS ID 6 | MEDIUM ID 5 | COMPATIBLE | 16 GB | COMPATIBLE |

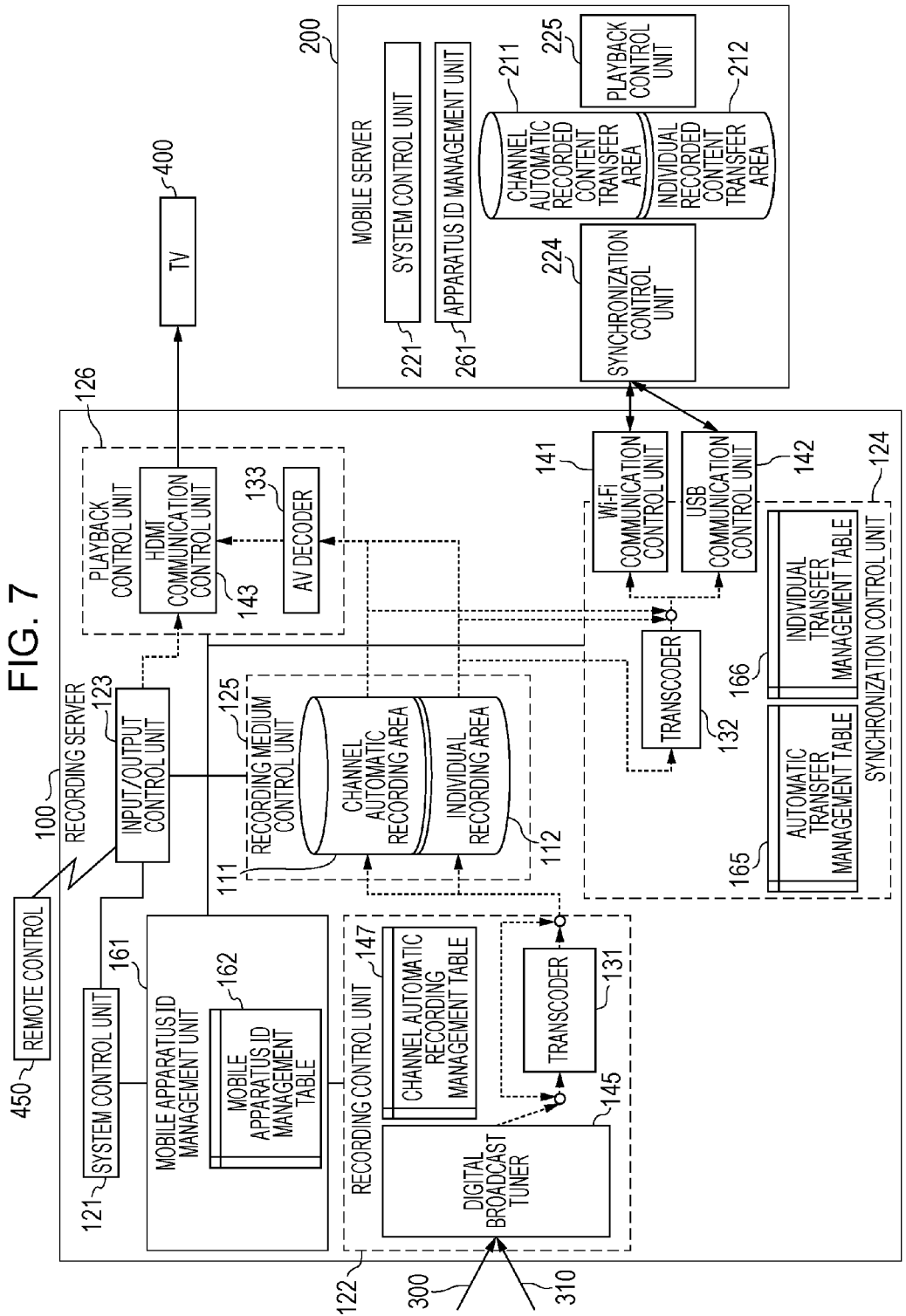

FIG. 8

| RECORDING CHANNEL | RECORDING TIME SLOT | | IMAGE QUALITY | RECORDING PERIOD |
|---|---|---|---|---|
| | START TIME | END TIME | | |
| BROADCAST STATION A | 07:00 | 24:00 | AUTO | 2 WEEKS |
| BROADCAST STATION B | 18:00 | 25:00 | AUTO | |
| BROADCAST STATION C | 18:00 | 25:00 | AUTO | |
| BROADCAST STATION D | 18:00 | 25:00 | AUTO | |
| BROADCAST STATION E | 18:00 | 25:00 | AUTO | |
| BROADCAST STATION F | 23:00 | 24:00 | AUTO | |

FIG. 10

| RECORDING CHANNEL | RECORDING TIME SLOT | | IMAGE QUALITY | RECORDING PERIOD | AUTOMATIC TRANSFER |
|---|---|---|---|---|---|
| | START TIME | END TIME | | | |
| BROADCAST STATION A | 07:00 | 24:00 | AUTO | 2 WEEKS | AUTO |
| BROADCAST STATION B | 18:00 | 25:00 | AUTO | 2 WEEKS | HALT |
| BROADCAST STATION C | 18:00 | 25:00 | AUTO | 2 WEEKS | HALT |
| BROADCAST STATION D | 18:00 | 25:00 | AUTO | 2 WEEKS | AUTO |
| BROADCAST STATION E | 18:00 | 25:00 | AUTO | 2 WEEKS | AUTO |
| BROADCAST STATION G | 00:00 | 24:00 | DR | 2 WEEKS | IMPOSSIBLE |
| BROADCAST STATION F | 23:00 | 24:00 | AUTO | 2 WEEKS | AUTO |

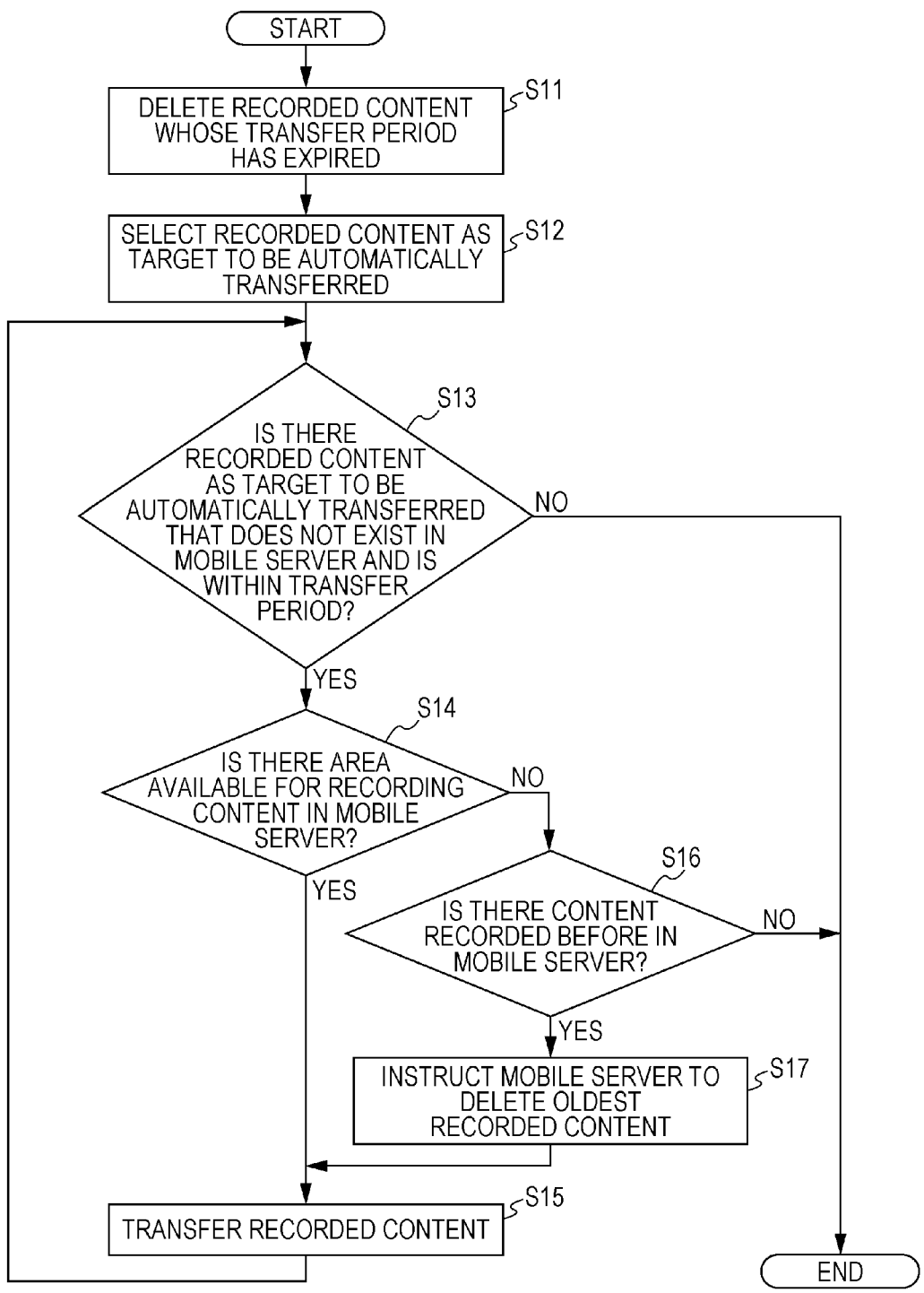

FIG. 12

| RECORDING CHANNEL | RECORDING TIME SLOT | | IMAGE QUALITY | RECORDING PERIOD | AUTOMATIC TRANSFER AND TRANSFER PERIOD |
|---|---|---|---|---|---|
| | START TIME | END TIME | | | |
| BROADCAST STATION A | 18:00 | 25:00 | 15× | AUTO | 5 DAYS |
| BROADCAST STATION B | | | | | 0 DAYS |
| BROADCAST STATION C | | | | | 3 DAYS |
| BROADCAST STATION D | | | | | 3 DAYS |
| BROADCAST STATION E | | | | | 0 DAYS |
| BROADCAST STATION F | | | | | 5 DAYS |

FIG. 15

| RECORDING CHANNEL | RECORDING TIME SLOT | | IMAGE QUALITY | AUTOMATIC TRANSFER | TRANSFER TIME SLOT | | GENRE |
|---|---|---|---|---|---|---|---|
| | START TIME | END TIME | | | START TIME | END TIME | |
| BROADCAST STATION A | 07:00 | 24:00 | 15× | AUTO | 08:00 | 08:30 | NEWS · DRAMA |
| BROADCAST STATION B | 18:00 | 25:00 | 15× | HALT | – | – | – |
| BROADCAST STATION C | 18:00 | 25:00 | 15× | HALT | – | – | – |
| BROADCAST STATION D | 18:00 | 25:00 | 15× | AUTO | 20:00 | 23:00 | VARIETY |
| BROADCAST STATION E | 18:00 | 25:00 | 10× | AUTO | 20:00 | 23:00 | DRAMA |
| BROADCAST STATION G | 00:00 | 24:00 | DR | IMPOSSIBLE | – | – | – |
| BROADCAST STATION F | 23:00 | 24:00 | 15× | AUTO | 23:00 | 24:00 | NEWS |

FIG. 16

| RECORDING CHANNEL | RECORDING TIME SLOT | | IMAGE QUALITY | RECORDING CHANNEL ID |
|---|---|---|---|---|
| | START TIME | END TIME | | |
| BROADCAST STATION A | 07:00 | 24:00 | 15× | #1 |
| BROADCAST STATION B | 18:00 | 25:00 | 15× | #2 |
| BROADCAST STATION C | 18:00 | 25:00 | 15× | #3 |
| BROADCAST STATION D | 18:00 | 25:00 | 15× | #4 |
| BROADCAST STATION E | 18:00 | 25:00 | 10× | #5 |
| BROADCAST STATION G | 00:00 | 24:00 | DR | #6 |
| BROADCAST STATION F | 23:00 | 24:00 | 15× | #7 |

FIG. 17

| RECORDING CHANNEL ID | AUTOMATIC TRANSFER | RECORDING TIME SLOT | | GENRE |
|---|---|---|---|---|
| | | START TIME | END TIME | |
| #1 | AUTO | 08:00 | 08:30 | NEWS·DRAMA |
| #2 | HALT | – | – | – |
| #3 | HALT | – | – | – |
| #4 | AUTO | 20:00 | 23:00 | VARIETY |
| #5 | AUTO | 20:00 | 23:00 | DRAMA |
| #6 | IMPOSSIBLE | – | – | – |
| #7 | AUTO | 23:00 | 24:00 | NEWS |

FIG. 21

| RECORDED CONTENT | DESTINATION OF AUTOMATIC TRANSFER | ATTRIBUTE INFORMATION | NUMBER OF PERMITTED TRANSFERS |
|---|---|---|---|
| AAAA | APPARATUS 1 | BROADCAST STATION G (COPY ONCE: MOVE ONLY) | 0 (TRANSFERRED) |
| BBBB | UNUSED | BROADCAST STATION G (COPY ONCE: MOVE ONLY) | 1 |
| CCCC | APPARATUS 1 | BROADCAST STATION G (COPY ONCE: MOVE ONLY) | 1 |
| DDDD | AUTO | BROADCAST STATION A (DUBBING 10: CAN BE COPIED 9 TIMES) | 10 |
| EEEE | UNUSED | BROADCAST STATION G (COPY ONCE: MOVE ONLY) | 1 |
| FFFF | AUTO | BROADCAST STATION A (DUBBING 10: CAN BE COPIED 9 TIMES) | 10 |
| GGGG | AUTO | BROADCAST STATION A (DUBBING 10: CAN BE COPIED 9 TIMES) | 10 |
| ...... | | | |

FIG. 26

| APPARATUS ID OR MEDIUM ID | COMPATIBILITY WITH CHANNEL AUTOMATIC TRANSFER | CAPACITY OF CHANNEL AUTOMATIC TRANSFER AREA | AUTOMATIC TRANSFER IN INDIVIDUAL RECORDING AREA | COMPATIBILITY WITH INDIVIDUAL RECORDING CI/CO |
|---|---|---|---|---|
| APPARATUS ID 1 | COMPATIBLE | 16 GB | INCOMPATIBLE | NA |
| APPARATUS ID 2 | COMPATIBLE | 32 GB | COMPATIBLE | COMPATIBLE |
| MEDIUM ID 1 | INCOMPATIBLE | NA | COMPATIBLE | INCOMPATIBLE |
| APPARATUS ID 3 | INCOMPATIBLE | NA | COMPATIBLE | INCOMPATIBLE |
| MEDIUM ID 2 | COMPATIBLE | 64 GB | INCOMPATIBLE | NA |
| APPARATUS ID 4 | COMPATIBLE | 128 GB | COMPATIBLE | COMPATIBLE |
| MEDIUM ID 3 | COMPATIBLE | 16 GB | COMPATIBLE | INCOMPATIBLE |

FIG. 30

| USER ID | APPARATUS ID OR MEDIUM ID |
|---------|---------------------------|
| USER    | APPARATUS 1               |
| SPOUSE  | APPARATUS 2               |
| CHILD 1 | APPARATUS 3               |
| CHILD 2 | MEDIUM 3                  |
| ...     |                           |

FIG. 31

| USER ID | APPARATUS ID OR MEDIUM ID |
|---------|---------------------------|
| USER    | APPARATUS 1               |
| USER    | MEDIUM 1                  |
| SPOUSE  | APPARATUS 2               |
| CHILD 1 | APPARATUS 3               |
| CHILD 1 | MEDIUM 2                  |
| CHILD 2 | MEDIUM 3                  |
| ...     |                           |

FIG. 32

| RECORDED CONTENT | DESTINATION OF AUTOMATIC TRANSFER | ATTRIBUTE INFORMATION | NUMBER OF PERMITTED TRANSFERS |
|---|---|---|---|
| AAAA | UNAVAILABLE (SOMEONE IS TRANSFERRING) | BROADCAST STATION G (COPY ONCE: MOVE ONLY) | 0 (TRANSFERRED) |
| BBBB | UNUSED | Blu-ray (MOVE ONLY) | 1 |
| CCCC | APPARATUS 1 | BROADCAST STATION G (COPY ONCE: MOVE ONLY) | 1 |
| DDDD | AUTO | BROADCAST STATION A (DUBBING 10: CAN BE COPIED 9 TIMES) | 10 |
| EEEE | UNUSED | Blu-ray (MOVE ONLY) | 1 |
| FFFF | AUTO | BROADCAST STATION A (DUBBING 10: CAN BE COPIED 9 TIMES) | 10 |
| GGGG | AUTO | BROADCAST STATION A (DUBBING 10: CAN BE COPIED 9 TIMES) | 10 |
| ...... | | | |

CONTENT RECORDING METHOD, RECORDING APPARATUS, AND RECORDING SYSTEM

CROSS REFERENCE TO RELATED APPLICATIONS

This application is based on U.S. Provisional Patent Application No. 61/928,222 filed on Jan. 16, 2014, U.S. Provisional Patent Application No. 61/921,273 filed on Dec. 27, 2013, and Japanese Patent Application No. 2014-172552 filed on Aug. 27, 2014, the entire contents of which are hereby incorporated by reference.

BACKGROUND

1. Technical Field

The present disclosure relates to a content recording method, a recording apparatus, and a recording system that are used to record content.

2. Description of the Related Art

In recent years, there have been disclosed mobile information terminals for playing back a piece of content that a user wants to view among pieces of content stored in a memory card to be carried around (see, for example, Japanese Unexamined Patent Application Publication No. 2011-254139).

SUMMARY

However, further improvement has been required for recording systems according to the related art.

One non-limiting and exemplary embodiment provides an improved content recording method.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

In one general aspect, the techniques disclosed here feature a content recording method for a recording apparatus. The content recording method includes an automatic recording control step of automatically recording, with the recording apparatus, a first plurality of pieces of content in a channel automatic recording area included in a recording medium, each of the first plurality of pieces of content being broadcast through a channel in a time slot, the channel and the time slot being designated by a user; a deletion step of instructing, with the recording apparatus, a mobile apparatus to delete a first piece of content that has previously been copied or moved from the channel automatic recording area to the mobile apparatus when the recording apparatus detects that the recording apparatus has become able to communicate with the mobile apparatus; and a content transfer step of copying or moving, with the recording apparatus, a second piece of content included in the first plurality of pieces of content to the mobile apparatus when the recording apparatus detects that the recording apparatus has become able to communicate with the mobile apparatus.

The comprehensive or specific aspect may be implemented by a system, apparatus, integrated circuit, computer program, or computer-readable recording medium such as a compact disc read only memory (CD-ROM), or may be implemented by a certain combination of some of the system, apparatus, integrated circuit, computer program, and recording medium.

According to the present disclosure, further improvement can be made.

BRIEF DESCRIPTION OF THE DRAWINGS

FIG. 4 is a diagram illustrating an example of a mobile apparatus ID management table in which mobile apparatuses or recording media, compatibility with channel automatic transfer, and the capacity of a channel automatic recorded content transfer area are managed in association with one another.

FIG. 5 is a diagram illustrating an example of a mobile apparatus ID management table in which combinations of a mobile apparatus and a recording medium, compatibility with channel automatic transfer, and the capacity of a channel automatic recorded content transfer area are managed in association with one another.

FIG. 6 is a diagram illustrating another example of a mobile apparatus ID management table for managing mobile apparatuses and recording media.

FIG. 7 is a diagram illustrating the basic configuration of a recording server according to the embodiment.

FIG. 8 is a diagram illustrating an example of a channel automatic recording management table.

FIG. 10 is a diagram illustrating an example of an automatic transfer management table for each apparatus ID.

FIG. 11 is a flowchart illustrating a first modification example of the automatic transfer process of automatically transferring recorded content in the channel automatic recording area to the channel automatic recorded content transfer area in the mobile server.

FIG. 12 is a diagram illustrating another example of the automatic transfer management table for each apparatus ID.

FIG. 15 is a diagram illustrating another example of the automatic transfer management table for each apparatus ID.

FIG. 16 is a diagram illustrating an example of a channel automatic recording management table.

FIG. 17 is a diagram illustrating an example of an automatic transfer management table.

FIG. 21 is a diagram illustrating an example of an individual transfer management table.

FIG. 26 is a diagram illustrating another example of the mobile apparatus ID management table.

FIG. 30 is a diagram illustrating an example of a user/apparatus ID management table in a case where each user has one mobile server.

FIG. 31 is a diagram illustrating an example of a user/apparatus ID management table in a case where each user has a plurality of mobile servers.

FIG. 32 is a diagram illustrating an example of an individual transfer management table for each user.

DETAILED DESCRIPTION

Figure 1:
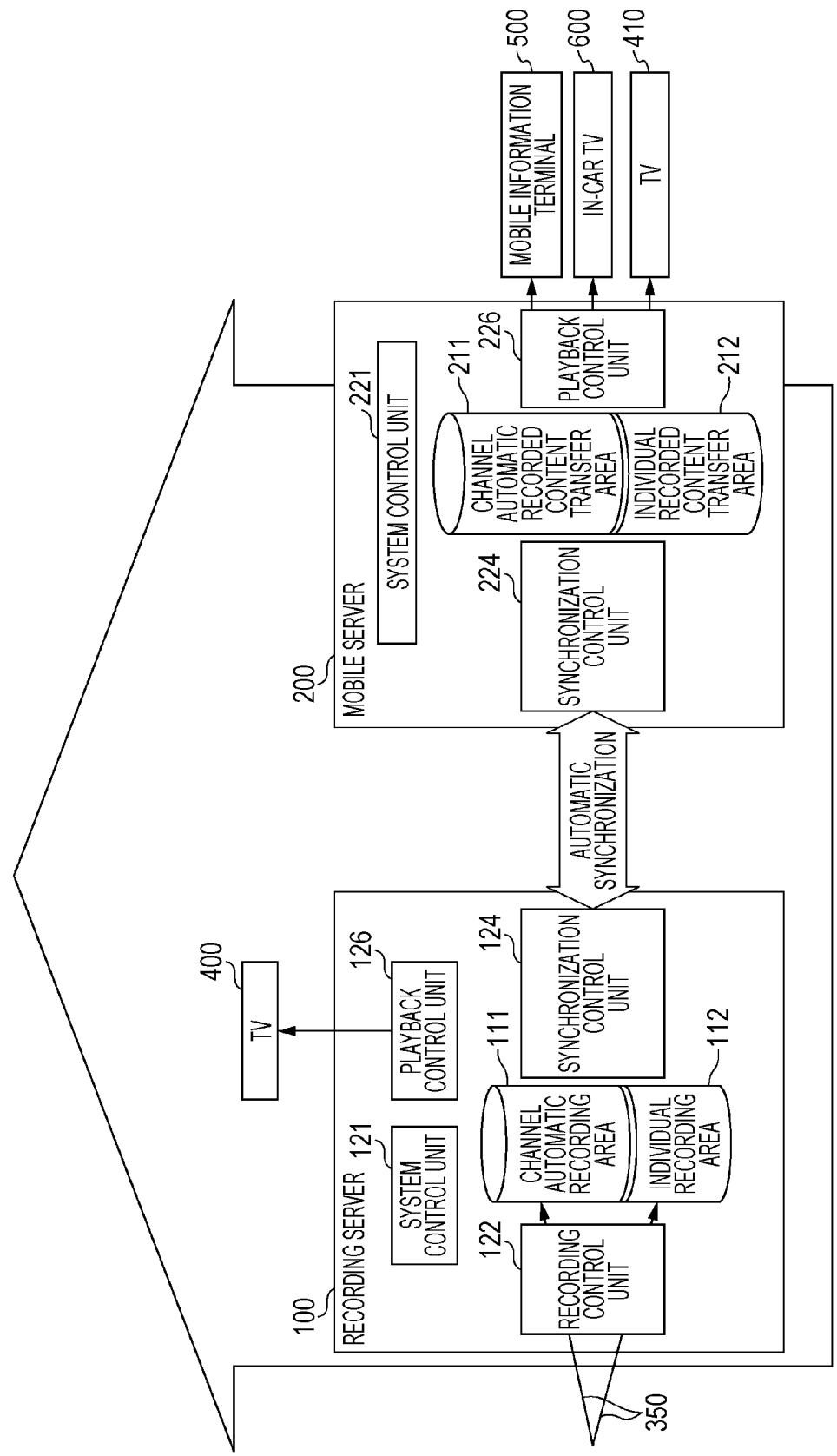
FIG. 1 is a diagram illustrating the configuration of a recording system according to an embodiment.

Underlying Knowledge Forming Basis of the Present Disclosure

The recent proliferation of smartphones, tablet computers, and the like has been creating an environment where users can easily view videos outside of their houses by using mobile apparatuses. In particular, users are now able to view videos on video distribution sites by using a mobile communication standard, such as Long Term Evolution (LTE), and accordingly streaming video viewing in a mobile environment has become popular. However, streaming viewing outside a house involves the following two issues.

Firstly, in a case where an IP retransmission service of retransmitting broadcast content is not provided for free, even if the broadcast content is free, it is not common to view good broadcast content through mobile communication outside a house.

Secondly, in a packet flat-rate contract of mobile communication, the amount of available packets is limited to about 7 GB maximum per month. If monthly usage exceeds 7 GB, the user is charged more than the flat rate, and thus viewing of high-definition (HD) videos such as full HD videos for a long time is not reasonable in terms of communication fees.

To address the two foregoing issues, broadcast recorders such as optical disc recorders have a function of transferring recorded content to a secure digital (SD) memory card, a universal serial bus (USB) memory, a smartphone, a tablet computer, a portable game machine, or the like.

For example, Japanese Unexamined Patent Application Publication No. 2011-254139 discloses a configuration of moving content from a digital video recorder to a mobile phone by using a memory card. Typically, a digital video recorder is stationary and connected to a television set in a house, and plays back a recorded broadcast program or distributed content. The broadcast program or distributed content recorded in the digital video recorder cannot be viewed outside the house in its original form. Thus, use cases in which a broadcast program or distributed content is recorded in a portable playback apparatus or a recording medium so as to be viewed are becoming common.

In Japan, operation rules for so-called dubbing 10 started to be implemented in 2008. Under dubbing 10, each piece of broadcast content that has been recorded is permitted to be copied nine times and moved once. These rules have made it easier to record broadcast content and view the content by taking it out of the house. As for viewing using a portable playback apparatus, there is a demand for viewing content using a smartphone or tablet computer, which has been rapidly becoming widespread in recent years, in addition to viewing content using a dedicated playback terminal. Compact smartphones with a screen having an HD resolution are now available, which has enabled users to take digital broadcast content having HD quality out of their houses and view the content.

Also, recording media for which a user is authorized to record content broadcast in HD quality as is by employing the latest encryption technique are now available. Such a recording medium enables a user to play back content recorded on the recording medium by using an in-car audiovisual (AV) system or a television set installed in a hotel room that the user stays at when the user travels on business or for sightseeing. A mechanism for recording content that has been recorded by a recorder in a portable playback apparatus or a recording medium is also available.

However, this mechanism merely achieves mechanical synchronization between a recorder and a playback apparatus or a recording medium on the basis of information such as a genre, creation date, or update date, and is not necessarily a mechanism in which a broadcast program or distributed content desired by a user is recorded in a playback apparatus or a recording medium.

Also, recorders (recording servers) that employ a channel automatic recording scheme are becoming common. Under the channel automatic recording scheme, all pieces of content broadcast in a specific period of time are recorded for a specific channel or all channels, and pieces of content that have become old relative to a recorded piece of content are automatically deleted.

However, no consideration has been made regarding the method of recording content that has been recorded using such a channel automatic recording scheme in a mobile terminal.

Further, an existing method of recording content in a mobile terminal is not user-friendly, and is not often used even if the function of recording content in a mobile terminal is provided in a recorder.

The present disclosure has been made to address the above-described issues, and provides a content recording method, a recording apparatus, and a recording system that are capable of enhancing user convenience.

A content recording method according to an aspect of the present disclosure is a content recording method for a recording apparatus. The content recording method includes an automatic recording control step of automatically recording, with the recording apparatus, a first plurality of pieces of content in a channel automatic recording area included in a recording medium, each of the first plurality of pieces of content being broadcast through a channel in a time slot, the channel and the time slot being designated by a user; a deletion step of instructing, with the recording apparatus, a mobile apparatus to delete a first piece of content that has previously been copied or moved from the channel automatic recording area to the mobile apparatus when the recording apparatus detects that the recording apparatus has become able to communicate with the mobile apparatus; and a content transfer step of copying or moving, with the recording apparatus, a second piece of content included in the first plurality of pieces of content to the mobile apparatus when the recording apparatus detects that the recording apparatus has become able to communicate with the mobile apparatus.

When it is detected that the recording apparatus has become able to communicate with the mobile apparatus, a piece of content that has previously been copied or moved from the channel automatic recording area to the mobile apparatus is deleted from the mobile apparatus. Accordingly, an unnecessary piece of content recorded in the mobile apparatus can be automatically deleted, and user convenience can be enhanced.

Hereinafter, an embodiment of the present disclosure will be described with reference to the attached drawings. The following embodiment is an example in which the present disclosure is embodied, and does not limit the technical scope of the present disclosure.

The present disclosure is directed to easily realizing an environment where video content is taken out of a house and viewed, with cooperation between a recording apparatus (recording server) having a channel automatic recording function and a mobile server.

The recording server includes a recording medium. The recording medium includes a channel automatic recording area, an individual recording area, and a personal data recording area. In the channel automatic recording area, content of a program broadcast through a channel in a time slot designated by a user is automatically recorded. In the individual recording area, content of a program for which scheduled recording is individually set by the user is recorded. In the personal data recording area, photographs or moving images captured by using a smartphone or a digital still camera (DSC), music data that has been purchased, ripped, and transferred by the user, or the like is stored.

When the mobile server is connected to the recording server and synchronization therebetween becomes possible, part of content (permitted to be copied under the dubbing 10 rule) in the channel automatic recording area in the recording server is automatically synchronized with (transferred to) the mobile server side by using a method designated by the user in advance. For example, the recording server automatically transfers, to the mobile server, one or a plurality of pieces of content among content for the last one week, news and weather forecast programs for the last two weeks, a drama belonging to a drama series including a drama viewed at least once in the last two weeks, and movies broadcast in the last one month. Also, the recording server automatically transfers content to the mobile server as far as the recording capacity of the mobile server allows.

Paid broadcast content (copy once content) in the individual recording area and the channel automatic recording area is transferred when the content is individually designated by the user. Here, copy once content is content that is permitted to be copied only once. As for the personal data recording area, in a case where content is newly added to the mobile server, the newly added content is automatically copied from the mobile server to the personal data recording area.

The mobile server has a function of individually managing a channel automatic recorded content transfer area for storing content in the channel automatic recording area in the recording server, an individual recorded content transfer area for storing content in the individual recording area in the recording server, and a personal data temporary recording area for storing content in the personal data recording area in the recording server.

The recording server automatically deletes existing content stored in the channel automatic recorded content transfer area of the mobile server by using a method designated by the user in advance. Also, the recording server automatically transfers new content that can be stored in the channel automatic recorded content transfer area of the mobile server from the channel automatic recording area to the channel automatic recorded content transfer area by using a method designated by the user in advance. Accordingly, the user does not have to manually delete old content in the mobile server and does not have to be concerned about an available capacity of the mobile server every time the content in the recording server and the content in the mobile server are synchronized with each other, and is able to store the latest broadcast content desired by the user in the mobile server.

The mobile server is capable of easily transferring, by streaming, video content to a mobile apparatus (for example a tablet computer, a smartphone, or an in-car television set) or a DLNA-compatible television set by using a Digital Living Network Alliance (DLNA) function or the like. Each apparatus plays back the video content transferred thereto, and accordingly the user can view the broadcast content outside of the house.

Further, in a case where personal content such as still images or moving images captured by a DSC, a video camera, a smartphone, or the like is transferred to the mobile server, the user can capture images without concern for the recording capacity of the apparatus. Normally, the user needs to be concerned about and check the recording capacity of the mobile server when transferring personal content to the mobile server. However, for example, if the content in the channel automatic recorded content transfer area is deleted by using a method designated by the user in advance, such as a method of deleting content from the oldest piece of content, so as to produce an available area in the mobile server, the user can transfer the personal content without concern for the capacity of the mobile server.

In a case where personal content, such as photographs, has been recorded in the mobile server, the recording server automatically acquires the personal content from the mobile server when performing a synchronization process for the mobile server. At this time, if there is no available area in the personal data recording area of the recording server, the channel automatic recording area of the recording server is automatically reduced to acquire an available area in the personal data recording area. In this case, in order to acquire an available area, the user selects in advance a reduction of a recording period from 30 days to 29 days, for example, or an increase in compression ratio of part of content or entire content.

Embodiment

Description of Recording System

FIG. 1 is a diagram illustrating the configuration of a recording system according to an embodiment. The recording system includes a recording server 100 and a mobile server 200.

The recording server 100 includes a channel automatic recording area 111, an individual recording area 112, a system control unit 121, a recording control unit 122, a synchronization control unit 124, and a playback control unit 126.

The channel automatic recording area 111 is an area in which content of a program broadcast through a channel designated by a user in a time slot designated by the user is recorded. The individual recording area 112 is an area in which content of a program for which scheduled recording is individually set by the user is recorded. For example, a recording medium such as a magnetic disk used for a hard disk drive includes the channel automatic recording area 111 and the individual recording area 112.

Moving of content is an operation form realized in the following manner. For example, in a case where content is recorded on a first recording medium (for example, a hard disk), the content is copied from the first recording medium to a second recording medium (for example, a memory card), and then the content in the first recording medium, which is a copy source (in this case, the hard disk), is deleted. The first recording medium may be a recording medium included in the recording server 100, and the second recording medium may be a recording medium included in the mobile server 200.

The system control unit 121 controls the entire recording server 100. The recording control unit 122 designates a channel group, a time slot, a compression ratio, and so forth of programs that the user wants to record, and automatically records broadcast content 350. The recorded broadcast content may be a plurality of pieces of broadcast content. The recording control unit 122 automatically records content of a program broadcast through a channel designated by the user in a time slot designated by the user in the channel automatic recording area 111 of the recording medium. Also, the recording control unit 122 sets scheduled recording of a program individually designated by the user, and records the content of the set program in the individual recording area 112 of the recording medium. Also, the recording control unit 122 deletes a piece of content designated by the user among at least one piece of content recorded in the individual recording area 112. The recording server 100 may accept a plurality of settings of scheduled recording of pieces of content individually designated by the user, and may record the plurality of individually designated pieces of content in the individual recording area 112 of the recording medium. The recording server 100 may delete a piece of content designated by the user among the plurality of pieces of content recorded in the individual recording area 112. The synchronization control unit 124 communicates with the mobile server 200 and achieves synchronization of recorded content between the recording server 100 and the mobile server 200. The synchronization control unit 124 detects that it has become possible to communicate with the mobile server 200, which is connected to the recording server 100 so as to be able to communicate with the recording server 100, and copies or moves the content recorded in the channel automatic recording area 111 to the mobile server 200. The recording server 100 may be connected to a single mobile server 200 so as to be able to communicate with the mobile server 200, or may be connected to a plurality of mobile servers 200 so as to be able to communicate with the mobile servers 200. The synchronization control unit 124 causes the mobile server 200 to delete content that has previously been copied or moved from the channel automatic recording area 111 to the mobile server 200 when detecting that the recording server 100 has become able to communicate with the mobile server 200. The synchronization control unit 124 may instruct the mobile server 200 to delete the content, and the mobile server 200 that has received the instruction may delete the designated content. The synchronization control unit 124 may memorize a date designated by the user, and may provide an instruction to delete the content on the date.

Also, when the synchronization control unit 124 detects that the recording server 100 has become able to communicate with the mobile server 200, the synchronization control unit 124 causes the mobile server 200 to delete, among pieces of content that have been transferred from the channel automatic recording area 111 to the mobile server 200 and are recorded in the mobile server 200, a piece of content for which a transfer period has expired. The transfer period is a period in which the piece of content is transferred from the channel automatic recording area 111 to the mobile server 200. The synchronization control unit 124 may instruct the mobile server 200 to delete the above-described piece of content, and the mobile server 200 that has received the instruction may delete the designated piece of content.

Further, in a case where, when the synchronization control unit 124 detects that the recording server 100 has become able to communicate with the mobile server 200, the number of days that have elapsed since last detection where the synchronization control unit 124 last detects that the recording server 100 has become able to communicate with the mobile server 200 is smaller than a designated number of days designated by the user, the synchronization control unit 124 may copy or move, to the mobile server 200, a piece of content recorded in the channel automatic recording area 111 after the last detection regardless of the designated number of days.

The playback control unit 126 plays back recorded content stored in the channel automatic recording area 111 and the individual recording area 112. The user can view the played back content on a television set (TV) 400 or the like.

The broadcast content 350 includes free broadcast content that is available for free (dubbing-10 content or the like) and paid broadcast content that is available on a chargeable basis (copy once content or the like). The recording system targets only free broadcast content, or both free broadcast content and paid broadcast content. Dubbing-10 content is content that is permitted to be copied nine times and moved once. In the channel automatic recording area 111, broadcast programs (pieces of broadcast content) are automatically recorded in accordance with the recording capacity thereof, and old programs are automatically deleted. Thus, the user does not have to designate and set a program to be recorded, and does not have to delete content recorded in the channel automatic recording area 111 in order to acquire available recording capacity.

The playback control unit 126 has an interface in a program table form, which shows channels as a recording target so that the user is able to select and view a piece of recorded content in the channel automatic recording area 111. Also, the playback control unit 126 has an interface that is used to display a list of individual pieces of recorded content in the individual recording area 112 and select one of the pieces of recorded content in order to view it, or that is used to perform a search process on the pieces of recorded content in the individual recording area 112 and select one of the pieces of recorded content.

The mobile server 200 includes a channel automatic recorded content transfer area 211, an individual recorded content transfer area 212, a system control unit 221, a synchronization control unit 224, and a playback control unit 226.

The channel automatic recorded content transfer area 211 stores the recorded content stored in the channel automatic recording area 111 in the recording server 100. The individual recorded content transfer area 212 stores the recorded content stored in the individual recording area 112 in the recording server 100. The recording capacities of the channel automatic recorded content transfer area 211 and the individual recorded content transfer area 212 are not fixed. The recording capacity of the channel automatic recorded content transfer area 211 can be increased or decreased in accordance with the recording capacity of the recorded content stored in the individual recorded content transfer area 212.

The system control unit 221 controls the entire mobile server 200.

The synchronization control unit 224 communicates with the recording server 100, and achieves synchronization of recorded content between the mobile server 200 and the recording server 100. The synchronization control unit 224 records the recorded content transferred from the recording server 100 in the channel automatic recorded content transfer area 211 or the individual recorded content transfer area 212.

The synchronization control unit 224 records, among pieces of recorded content transferred from the recording server 100, a piece of recorded content that had been stored in the channel automatic recording area 111 of the recording server 100 in the channel automatic recorded content transfer area 211. Also, the synchronization control unit 224 records, among the pieces of recorded content transferred from the recording server 100, a piece of recorded content that had been stored in the individual recording area 112 of the recording server 100 in the individual recorded content transfer area 212.

Also, the synchronization control unit 224 deletes, from the channel automatic recorded content transfer area 211, a piece of content that has previously been copied or moved from the channel automatic recording area 111 in response to an instruction from the recording server 100.

When the mobile server 200 is brought close to the recording server 100 and connected to the recording server 100 through wireless communication such as Wi-Fi communication, synchronization between the pieces of content recorded in both the servers can be achieved. Alternatively, when the mobile server 200 is connected to the recording server 100 through wired communication such as a USB cable, synchronization between the pieces of content recorded in both the servers can be achieved.

In a state where the synchronization has be achieved, part of free broadcast content (permitted to be copied under the dubbing 10 rule) in the channel automatic recording area 111 in the recording server 100 is automatically transferred to the mobile server 200 in accordance with a method designated in advance by the user using the user interface of the recording server 100. The recording server 100 accepts, for example, designation of one or a plurality of pieces of content among content for the last one week, news and weather forecast programs for the last two weeks, a drama belonging to a drama series including a drama viewed at least once in the last two weeks, and movies broadcast in the last one month. Also, the recording server 100 accepts designation of transferring content as far as the recording capacity of the mobile server 200 allows.

When the synchronization control unit 124 detects that the recording server 100 has become able to communicate with the mobile server 200, the synchronization control unit 124 may select, among the pieces of content recorded in the channel automatic recording area 111, a piece of content to be copied or moved to the mobile server 200 on the basis of a viewing history of the user, and may copy or move the selected piece of content to the mobile server 200. The recording server 100 may add information representing "already viewed" to a piece of content that has been viewed on the TV 400. The recording server 100 may copy or move, to the mobile server 200, a piece of content belonging to the same genre as the piece of content to which information representing "already viewed" has been added.

The pieces of content in the individual recording area 112 are transferred by being individually designated by the user. When a piece of content in the individual recording area 112 is transferred, an old piece of content in the individual recorded content transfer area 212 in the mobile server 200 is automatically deleted. Accordingly, the user can transfer the latest piece of content to the mobile server 200 without concern for an available area.

The playback control unit 226 transmits, to a display apparatus connected to the mobile server 200 so as to be able to communicate with the mobile server 200, a piece of content recorded in the channel automatic recorded content transfer area 211 or the individual recorded content transfer area 212.

The mobile server 200 uses a DLNA function or the like to easily transfer, by streaming, video content to a group of mobile apparatuses (a mobile information terminal 500 or an in-car television set (TV) 600) or a DLNA-compatible television set (TV) 410, so that the video content can be played back in each apparatus. The mobile information terminal 500 is, for example, a tablet computer or a smartphone.

Figure 2:
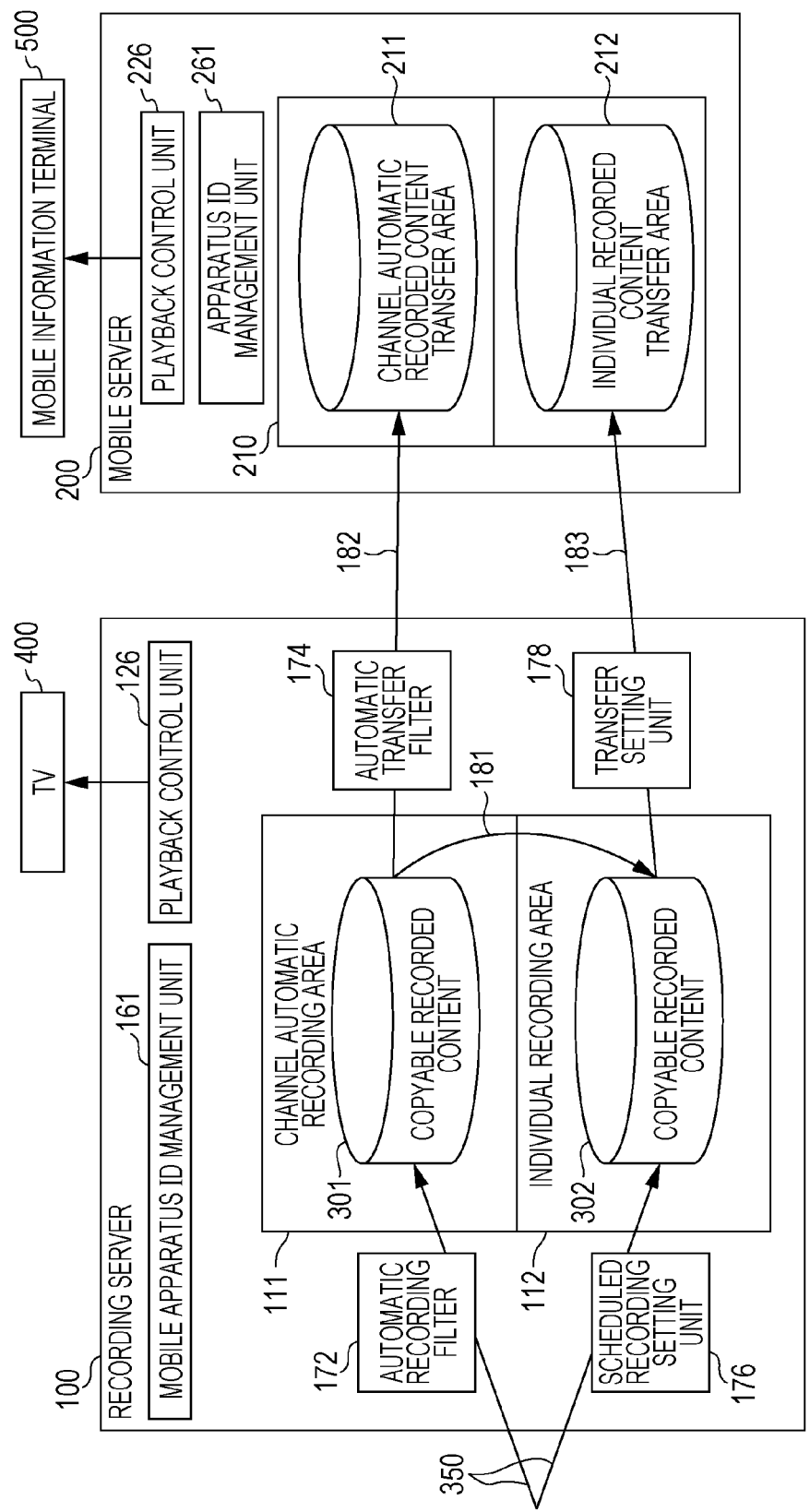
FIG. 2 is a diagram illustrating the flow of recorded content in the recording system according to the embodiment.

FIG. 2 is a diagram illustrating the flow of recorded content in the recording system according to the embodiment.

An automatic recording filter 172 performs a channel automatic recording process on the broadcast content 350 in accordance with a channel automatic recording condition set by the user. The broadcast content 350 as a target of automatic recording is stored as copyable recorded content (such as dubbing-10 content) 301 in the channel automatic recording area 111. A scheduled recording setting unit 176 performs a recording process in accordance with a setting of scheduled recording in which the user individually designates a program to be recorded. The broadcast content 350 as a target of scheduled recording is stored as copyable recorded content (such as dubbing-10 content) 302 in the individual recording area 112.

Pieces of copyable recorded content 301 in the channel automatic recording area 111 are sequentially and automatically recorded in accordance with the setting of the automatic recording filter 172. An old piece of copyable recorded content 301 is automatically deleted. Thus, among the pieces of copyable recorded content 301, a piece of recorded content that the user wants to store for a long period is moved from the channel automatic recording area 111 to the individual recording area 112 (a movement process 181). Accordingly, the piece of copyable recorded content 301 can be eliminated from the target to be automatically deleted and can be managed as the copyable recorded content 302 in the individual recording area 112.

In the playback control unit 126, a piece of recorded content that has been moved from the channel automatic recording area 111 to the individual recording area 112 may be selected as a piece of recorded content in the individual recording area 112, or may be selected as a piece of recorded content in the channel automatic recording area 111 even after the movement process 181 has been performed.

A mobile apparatus ID management unit 161 stores an apparatus ID (managed by an apparatus ID management unit 261) of a mobile apparatus such as the mobile server 200 managed by the recording server 100, or a portable recording medium ID in the mobile apparatus, and manages a mobile apparatus or a portable recording medium to which the copyable recorded content 301 in the channel automatic recording area 111 or the copyable recorded content 302 in the individual recording area 112 is to be transferred.

In a case where it has become possible to perform a synchronization process for data, such as recorded content, between the recording server 100 and the mobile server 200 as a result of wirelessly connecting the mobile server 200 to the recording server 100 by bringing the mobile server 200 close to the recording server 100, or connecting the mobile server 200 to the recording server 100 via a wired network, an automatic transfer process 182 is performed. In the automatic transfer process 182, the copyable recorded content 301 in the channel automatic recording area 111 is automatically transferred to the channel automatic recorded content transfer area 211 in the mobile server 200 in accordance with a transfer condition set for an automatic transfer filter 174 by the user. A piece of recorded content that has been changed to be managed in the individual recording area 112 through the movement process 181 is eliminated from the target of the automatic transfer process 182. However, if the user designates a piece of recorded content that has been moved through the movement process 181 to be included in the target of the automatic transfer process 182, the piece of recorded content can be regarded as the target of the automatic transfer process 182.

In a case where it has become possible to perform a synchronization process, a transfer process 183 is performed in addition to the automatic transfer process 182. In the transfer process 183, the copyable recorded content 302 in the individual recording area 112 is automatically transferred to the individual recorded content transfer area 212 in the mobile server 200 in accordance with a condition set for a transfer setting unit 178 by the user.

The recorded content stored in the channel automatic recorded content transfer area 211 and the individual recorded content transfer area 212 in the mobile server 200 can be transmitted to the mobile information terminal 500 connected in a wireless or wired manner (with the technique of USB, Wi-Fi, or the like) by using a communication function of the DLNA standard or the like, and can be played back in the mobile information terminal 500 so as to be viewed.

Video content communication between the mobile server 200 and the mobile information terminal 500 is not limited to streaming communication based on the DLNA standard or the like. The communication can also be realized by dealing the mobile server 200 as an external recording apparatus and transmitting video content from the mobile server 200 to the mobile information terminal 500 via a network.

Figure 3:
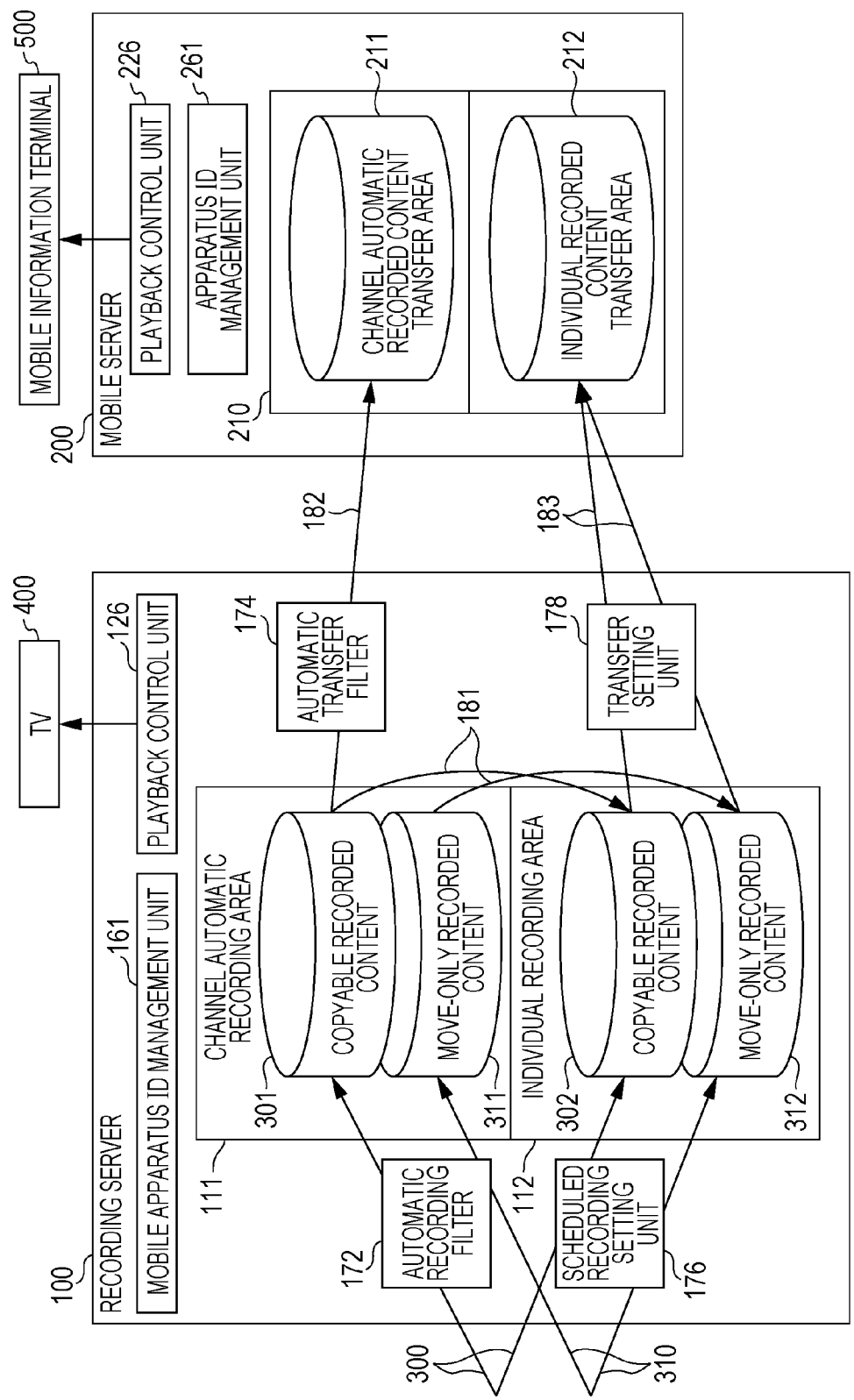
FIG. 3 is a diagram illustrating a first modification example of the flow of recorded content in the recording system according to the embodiment.

FIG. 3 is a diagram illustrating a first modification example of the flow of recorded content in the recording system according to the embodiment.

The recording server 100 illustrated in FIG. 2 targets only free broadcast content. On the other hand, FIG. 3 illustrates a flow of content in the case of recording free broadcast content 300 (dubbing-10 content or the like) and paid broadcast content 310 (copy once content or the like).

The automatic recording filter 172 is capable of setting automatic scheduled recording for the paid broadcast content 310 in addition to the free broadcast content 300. In accordance with the setting of the automatic recording filter 172, the free broadcast content 300 is recorded as the copyable recorded content 301 in the channel automatic recording area 111. The paid broadcast content 310 is recorded as move-only recorded content 311 in the channel automatic recording area 111.

Also regarding the setting of the scheduled recording setting unit 176 for storing a result of user's individual designation of a program to be recorded, the paid broadcast content 310 can be set in addition to the free broadcast content 300. As a result of performing a recording process in accordance with the setting of the scheduled recording setting unit 176, the free broadcast content 300 is recorded as the copyable recorded content (dubbing-10 content or the like) 302 in the individual recording area 112. The paid broadcast content 310 is recorded as move-only recorded content 312 in the individual recording area 112.

In a case where it has become possible to perform a synchronization process for data, such as recorded content, between the recording server 100 and the mobile server 200 as a result of wirelessly connecting the mobile server 200 to the recording server 100 by bringing the mobile server 200 close to the recording server 100, or connecting the mobile server 200 to the recording server 100 via a wired network, the automatic transfer process 182 is performed. In the automatic transfer process 182, the copyable recorded content 301 in the channel automatic recording area 111 is transferred to the channel automatic recorded content transfer area 211 in the mobile server 200 in accordance with a transfer condition set for the automatic transfer filter 174 by the user.

However, the move-only recorded content 311 in the channel automatic recording area 111 can be transferred to the mobile server 200 only once. Further, after having been transferred, the move-only recorded content 311 cannot be viewed any more because it is deleted from the recording server 100. Thus, if the move-only recorded content 311 is set as a target of automatic transfer, an operation that is not intended by the user may be automatically performed.

Thus, the move-only recorded content 311 is not transferred to the mobile server 200 in the automatic transfer process 182 as long as the user does not provide an explicit instruction of transfer. In order to transfer the move-only recorded content 311 in the channel automatic recording area 111 to the mobile server 200, the move-only recorded content 311 is moved from the channel automatic recording area 111 to the individual recording area 112 in accordance with an instruction from the user (movement process 181), and is managed as the move-only recorded content 312.

In a case where it has become possible to perform a synchronization process, the transfer process 183 is performed in addition to the automatic transfer process 182. In the transfer process 183, the copyable recorded content 302 and the move-only recorded content 312 in the individual recording area 112 are automatically transferred to the individual recorded content transfer area 212 in the mobile server 200 in accordance with the condition set to the transfer setting unit 178 by the user.

A recording medium 210 of the mobile server 200 illustrated in FIG. 3 may be constituted by a portable recording medium. In this case, the portable recording medium has a medium ID so that the portable recording medium is identified by the recording server 100. In a case where the mobile server 200 has such a configuration, the mobile apparatus ID management unit 161 in the recording server 100 manages the medium ID instead of the apparatus ID. Thus, in a case where a plurality of portable recording media are used in a single mobile server 200, the recording server 100 is capable of managing the single mobile server 200 as a plurality of mobile servers 200.

The recording medium 210 of the mobile server 200 illustrated in FIG. 3 may be constituted by a built-in recording medium and a portable recording medium. For example, the built-in recording medium includes the channel automatic recorded content transfer area 211, and the portable recording medium includes the individual recorded content transfer area 212.

In a case where the mobile server 200 has this configuration, the mobile apparatus ID management unit 161 in the recording server 100 manages a combination of an apparatus ID and a medium ID. Thus, in a case where a plurality of portable recording media are used in a single mobile server 200, the recording server 100 is capable of managing the single mobile server 200 as a plurality of mobile servers 200.

The recording medium 210 of the mobile server 200 may be constituted by a built-in recording medium and a portable recording medium. The built-in recording medium may include the individual recorded content transfer area 212, and the portable recording medium may include the channel automatic recorded content transfer area 211.

FIGS. 4 and 5 are diagrams illustrating examples of a mobile apparatus ID management table for managing mobile apparatuses and recording media. FIG. 4 is a diagram illustrating an example of a mobile apparatus ID management table for managing, in association with one another, a mobile apparatus or recording medium, compatibility with channel automatic transfer, and the capacity of the channel automatic recorded content transfer area. FIG. 5 is a diagram illustrating an example of a mobile apparatus ID management table for managing, in association with one another, a combination of a mobile apparatus and a recording medium, compatibility with channel automatic transfer, and the capacity of the channel automatic recorded content transfer area. The mobile apparatus ID management table is recorded in the mobile apparatus ID management unit 161.

In the table illustrated in FIG. 4, it is designated, for each mobile server or portable medium, whether or not the mobile server or portable medium is a target on which channel automatic transfer is to be performed at the time of a synchronization process. In a case where the mobile server or portable medium is a target of channel automatic transfer, the capacity of the channel automatic recorded content transfer area is managed. Accordingly, the automatic transfer filter 174 is capable of managing the automatic transfer process 182 of transferring the target managed in the recording server 100 to the mobile server 200 by using the information in the mobile apparatus ID management table.

In the table illustrated in FIG. 5, it is designated, for each combination of a mobile server and a portable medium, whether or not the combination is a target on which channel automatic transfer is to be performed at the time of a synchronization process. In a case where the combination is a target of channel automatic transfer, the capacity of the channel automatic recorded content transfer area is managed. The mobile server 200 illustrated in FIG. 3 is incapable of designating the item of a medium ID.

In a case where the recording medium 210 of the mobile server 200 is constituted by a portable recording medium, the portable recording medium is usable by a plurality of apparatuses, and thus it makes no sense to designate the item of an apparatus ID.

On the other hand, in a case where the recording medium 210 of the mobile server 200 is constituted by a built-in recording medium and a portable recording medium, management is performed based on a combination of an apparatus ID and a medium ID. Thus, it is necessary to designate a valid ID for both the items of an apparatus ID and a medium ID.

FIG. 6 is a diagram illustrating another example of a mobile apparatus ID management table for managing mobile apparatuses and recording media.

The table illustrated in FIG. 6 includes an item of designating whether or not an automatic transfer process is to be performed on the recorded content stored in the individual recording area 112, in addition to the items of the table illustrated in FIG. 5. Accordingly, the automatic transfer filter 174 is capable of managing the automatic transfer process 182 and the transfer process 183 of transferring the target managed by the recording server 100 to the mobile server 200 by using the information in the mobile apparatus ID management table.

FIG. 7 is a diagram illustrating the basic configuration of the recording server 100 according to the embodiment.

In the recording server 100, an input/output control unit 123 that receives signals from a remote control 450, which is an example of an input apparatus, provides a user instruction to the system control unit 121, which controls the entire recording server 100. The system control unit 121 controls the recording control unit 122, the synchronization control unit 124, the playback control unit 126, a recording medium control unit 125, and so forth.

The recording control unit 122 includes a digital broadcast tuner 145, a transcoder 131, and a channel automatic recording management table 147.

The digital broadcast tuner 145 receives a plurality of radio signals of the free broadcast content 300 and the paid broadcast content 310 and converts the radio signals into a group of video signals on the basis of the information stored in the channel automatic recording management table 147. The transcoder 131 converts the received video signals into recorded content with a compression ratio that is designated for each channel, and stores the recorded content obtained through the conversion in the channel automatic recording area 111.

In a case where the user has made a setting for scheduled recording of individual programs, the digital broadcast tuner 145 receives radio signals of the free broadcast content 300 or the paid broadcast content 310 and converts the radio signals into video signals on the basis of the information about the setting. The transcoder 131 converts the received video signals into recorded content with a compression ratio designated for each program for which scheduled recording is set, and stores the recorded content obtained through the conversion in the individual recording area 112.

The playback control unit 126 includes an AV decoder 133 and a high-definition multimedia interface (HDMI) communication control unit 143. The recording medium control unit 125 retrieves recorded content in the channel automatic recording area 111 or the individual recording area 112, and transmits the recorded content to the AV decoder 133. The AV decoder 133 converts the recorded content into baseband video signals, and transmits the video signals obtained through the conversion to the HDMI communication control unit 143. The HDMI communication control unit 143 transfers the video signals to a video display apparatus, such as the TV 400. Accordingly, the user can view the recorded content.

The synchronization control unit 124 controls a Wi-Fi communication control unit 141 and a USB communication control unit 142 so as to communicate with the mobile server 200, and performs a synchronization process for recorded content between the recording server 100 and the mobile server 200. At the time when a synchronization process for the mobile server 200 becomes possible, the synchronization control unit 124 selects a piece of recorded content stored in the channel automatic recording area 111, transfers the selected piece of recorded content to the mobile server 200, and records the piece of recorded content in the channel automatic recorded content transfer area 211 of the mobile server 200 on the basis of the information in an automatic transfer management table 165 for each apparatus ID.

In a case where recorded content to be transferred exists in the individual recording area 112 and the recorded content is recorded in a DR mode, the transcoder 132 converts the recorded content with a designated compression ratio before performing a transfer process. The DR mode is a mode in which digital broadcast signals are recorded in the form of digital signals. A compression process using the transcoder 132 takes time. Thus, recorded content to be transferred may be compressed before being transferred, and the compressed recorded content may be recorded in the individual recording area 112.

The recorded content in the channel automatic recording area 111 or the recorded content in the individual recording area 112 to be transferred from the recording server 100 to the mobile server 200 may have been encrypted. In a case where the recorded content has been encrypted, the recorded content needs to be recorded in the state of being encrypted in the mobile server 200. In this case, in order to prevent a situation from occurring where the encrypted recorded content is simply copied to another apparatus and played back thereby, the process of encrypting the recorded content is bound by using information unique the apparatus, such as an apparatus ID of the recording server 100, or, in a case where the recording medium in the mobile server 200 is constituted by a portable recording medium, information unique to the recording medium, such as a medium ID of the portable recording medium. Regarding the binding method, there are the following two cases: a case where the recorded content is encrypted through a standard encryption process, such as Advanced Encryption Standard (AES), using an apparatus ID unique to the apparatus; and a case where the recorded content is encrypted through a standard encryption process, such as AES, and a key for playing back the encrypted recorded content is encrypted using an apparatus ID unique to the apparatus.

In the former case, the synchronization control unit 124 decrypts the recorded content to be transferred before performing a transfer process so as to obtain plaintext, encrypts the plaintext again by using the apparatus ID or medium ID of the mobile server 200 as a transfer destination, and transfers the encrypted content.

In the latter case, the synchronization control unit 124 does not encrypt the recorded content at the time of transfer, but needs to encrypt, using the apparatus ID or medium ID of the mobile server 200, the key for playing back the recorded content encrypted by the information unique to the recording server 100, and transfer the key by establishing a secure communication channel (Secure Authenticated Channel (SAC)) between the recording server 100 and the mobile server 200.

The scheme of encrypting the recorded content in the recording server 100 varies depending on the regulation of the country where the recording server 100 is used or a technique employed. Also, the encryption process in the mobile server 200 varies depending on whether the recording medium is not constituted by a portable recording medium or is constituted by a portable recording medium. In a case where the recording medium is constituted by a portable recording medium, a process of transferring recorded content is performed in accordance with a rule of a media-bind-type encryption scheme, such as Content Protection for Recordable Media (CPRM), Advanced Access Content System (AACS), or Next Generation Secure Memory Initiative (NSM).

The channel automatic recording management table 147 is constituted by a recording channel designation item for designating a channel as a target of channel automatic recording, a recording time slot designation item for designating a time slot in a day in which automatic recording is to be performed, an image quality designation item for designating image quality for recording, and a recording period designation item for designating the number of days for which automatic recording is to be performed.

Normally, the capacity of the channel automatic recording area 111 is designated. Thus, when one of image quality and a recording period is designated, the other can be obtained through calculation.

For example, a recording time slot, image quality, and a recording period are designated collectively for all the channels, not for each channel.

In a case where the capacity of the channel automatic recording area 111 is 1 TB, the image quality corresponds to a compression ratio of 15×, and the recording period is not designated, the recording period is calculated on the basis of the following expression.

$$\text{Recording period} = 1\ TB\ [\text{capacity}]/(18/8\ \text{Mbps}\ [\text{band}] * 60s * 60s *$$
$$(6\ [\text{number of channels}] * 17[\text{hours}])) * 15\ [\text{image quality}] =$$
$$1000 * 1000/(18/8 * 60 * 60 * 6 * 17) * 15 = 18\ \text{days}$$

For example, in a case where the capacity of the channel automatic recording area 111 is 1 TB, the recording period is designated to be 3 weeks (21 days), and the image quality is not designated, the image quality is calculated on the basis of the following expression.

$$\text{Image quality} = (3 * 7)\ [3\ \text{weeks}] *$$
$$(18/8\ \text{Mbps}\ [\text{band}] * 60s * 60s * (6\ [\text{number of channels}] * 7[\text{hours}]))$$
$$/1\ TB[\text{capacity}] = 21 * (18 * 60 * 60 * 6 * 7/8)/(1000 * 1000) = 7.14 \times$$

In a case where the compression ratio is designated to be an integer, the recorded content is compressed at a compression ratio of 8×.

FIG. 8 is a diagram illustrating an example of the channel automatic recording management table 147.

As illustrated in FIG. 8, with the channel automatic recording management table 147, a recording time slot and image quality can be designated for each channel, so that more detailed user's needs for recording can be satisfied. In FIG. 8, the start time and end time of the recording time slot corresponding to broadcast station A are designated to be 7:00 and 24:00, respectively. The start time and end time of the recording time slot corresponding to broadcast stations B, C, D, and E are designated to be 18:00 and 25:00, respectively. The start time and end time of the recording time slot corresponding to broadcast station F are designated to be 23:00 and 24:00, respectively.

In this example, the capacity of the channel automatic recording area 111 is 1 TB and the recording period is designated to be 2 weeks (14 days), and thus the image quality is calculated on the basis of the following expression.

$$\text{Image quality} = (2*7)\,[2\text{ weeks}]*(18/8\text{ Mbps }[\text{band}]*$$
$$60s*60s*((17+7*4+1)\,[\text{hours}]))/1\,TB[\text{capacity}] =$$
$$14*(18*60*60*(17+7*4+1)/8)/(1000*1000) = 5.2\times$$

In a case where the compression ratio is designated to be an integer, the recorded content is compressed at a compression ratio of 6×.

In the channel automatic recording management table 147, in a case where a recording time slot and image quality can be designated for each channel, more detailed user's needs for recording can be satisfied.

For example, in a case where the capacity of the channel automatic recording area 111 is 1 TB, the recording time slot is designated as in FIG. 8, the image quality corresponds to a compression ratio of 10×, and the recording period is not designated, the recording period is calculated on the basis of the following expression.

$$\text{Recording period} = 1\,TB\,[\text{capacity}]/$$
$$(18/8\text{ Mbps }[\text{band}]*60s*60s*(17+7*4+1)\,[\text{hours}])*$$
$$15\,[\text{image quality}] = 1000*1000/(18/8*60*60*46)*15 = 27\text{ days}$$

Figure 9:
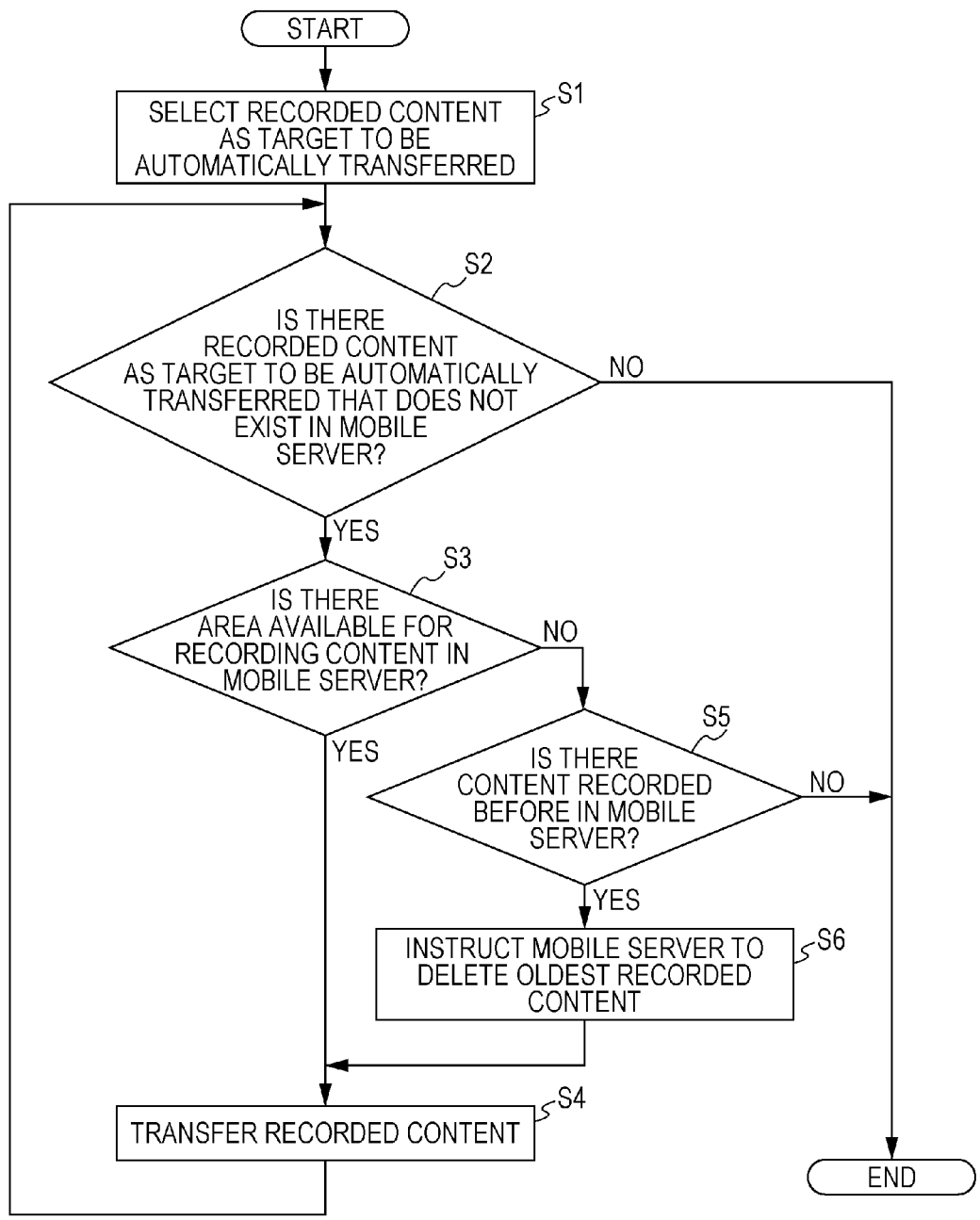
FIG. 9 is a flowchart illustrating an automatic transfer process of automatically transferring recorded content in a channel automatic recording area to a channel automatic recorded content transfer area in a mobile server.

FIG. 9 is a flowchart illustrating an automatic transfer process of automatically transferring the recorded content in the channel automatic recording area 111 to the channel automatic recorded content transfer area 211 in the mobile server 200. FIG. 10 is a diagram illustrating an example the automatic transfer management table 165 for each apparatus ID.

The process illustrated in FIG. 9 may be performed when the recording server 100 detects that the recording server 100 has become able to communicate with the mobile server 200.

First, in step S1, the synchronization control unit 124 refers to the automatic transfer management table 165 for each apparatus ID, and selects the recorded content as a target to be automatically transferred.

As illustrated in FIG. 10, the automatic transfer management table 165 is constituted by a recording channel designation item for designating a channel as a target of channel automatic recording, a recording time slot designation item for designating a time slot in a day in which automatic recording is to be performed, an image quality designation item for designating image quality for recording, a recording period designation item for designating the number of days for which automatic recording is to be performed, and an automatic transfer target designation item for designating, for each channel, whether or not the content is a target to be automatically transferred. Information indicating whether or not the content is a target to be automatically transferred may be generated on the basis of designation by the user.

The recording channel designation item, the recording time slot designation item, the image quality designation item, and the recording period designation item are the same as those in the channel automatic recording management table 147. A recording time slot can be designated for each channel. Whether or not recorded content is to be automatically transferred is designated for each channel that is designated in recording channel designation. In a case where "auto" is set to the automatic transfer target designation item, an available transfer period in which automatic transfer can be performed is calculated. In a case where "halt" is set to the automatic transfer target designation item, the recorded content of the corresponding channel is not transferred. An available transfer period in which automatic transfer can be performed can be calculated by using the recording capacity of a transfer destination.

Recorded content of a paid broadcast channel (copy once content or move-only recorded content 311) cannot be a target of automatic transfer, and thus "impossible" is set to the automatic transfer target designation item.

In FIG. 10, the start time and end time of the recording time slot corresponding to broadcast station A are designated to be 7:00 and 24:00, respectively. The start time and end time of the recording time slot corresponding to broadcast stations B, C, D, and E are designated to be 18:00 and 25:00, respectively. The start time and end time of the recording time slot corresponding to broadcast station F are designated to be 23:00 and 24:00, respectively. The start time and end time of the recording time slot corresponding to broadcast station G are designated to be 0:00 and 24:00, respectively.

Here, in a case where the capacity of the channel automatic recorded content transfer area 211 is 128 GB, the available transfer period is calculated on the basis of the following expression.

$$\text{Available transfer period} = 128\text{ GB }[\text{capacity}]/$$
$$(18/8\text{ Mbps }[\text{band}]*60s*60s*(17+7*2+1)\,[\text{hours}])*$$
$$10\,[\text{image quality}] = 128*1000/(18/8*60*60*32)*10 = 4.8\text{ days}$$

As is understood from the calculation result, recorded content for 4 days can be transferred. Thus, the synchronization control unit 124 selects the recorded content for the latest 4 days as a target to be automatically transferred.

In step S2, the synchronization control unit 124 determines whether or not recorded content as a target to be automatically transferred that does not exist in the mobile server 200 exists in the recording server 100. On the basis of the selection result, the synchronization control unit 124 determines whether or not the recorded content as a target to be automatically transferred in the channel automatic recording area 111 exists in (has been transferred to) the channel automatic recorded content transfer area 211 in the mobile server 200. If the synchronization control unit 124 determines that the recorded content as a target to be automatically transferred that does not exist in the mobile server 200 does not exist (NO in step S2), the process ends.

On the other hand, if the synchronization control unit 124 determines that the recorded content as a target to be automatically transferred that does not exist in the mobile server 200 exists (YES in step S2), the synchronization control unit 124 determines in step S3 whether or not an area available for recording the recorded content exists in the mobile server 200. If the synchronization control unit 124 determines that an area available for recording the recorded content exists in the mobile server 200 (YES in step S3), the synchronization control unit 124 transfers (copies or moves) the target recorded content to the synchronization control unit 224 in step S4. The synchronization control unit 224 of the mobile server 200 records the recorded content that has been transferred from the recording server 100 in the channel automatic recorded content transfer area 211.

On the other hand, if the synchronization control unit 124 determines that an area available for recording the recorded content does not exist in the mobile server 200 (NO in step S3), the synchronization control unit 124 determines in step S5 whether or not content that was recorded before the target recorded content exists in the mobile server 200. If the synchronization control unit 124 determines that content that was recorded before the target recorded content does not exist in the mobile server 200 (NO in step S5), the process ends.

On the other hand, if the synchronization control unit 124 determines that content that was recorded before the target recorded content exists in the mobile server 200 (YES in step S5), the synchronization control unit 124 instructs the mobile server 200 to delete the content recorded therein from the oldest piece of content in step S6. Specifically, the synchronization control unit 124 causes the mobile server 200 to delete, among pieces of content recorded in the mobile server 200, the piece of content whose broadcast time is the earliest. The synchronization control unit 124 may instruct the mobile server 200 to delete the foregoing piece of content, and the mobile server 200 that has received the instruction may delete the piece of content specified by the instruction.

At this time, the synchronization control unit 124 provides an instruction to delete recorded content corresponding to the capacity in which the recorded content as a target to be automatically transferred can be stored. The synchronization control unit 124 may provide an instruction to delete recorded content in units of programs, or may provide an instruction to delete recorded content in units of time. When the synchronization control unit 224 of the mobile server 200 receives a deletion instruction from the recording server 100, the synchronization control unit 224 deletes the content recorded in the channel automatic recorded content transfer area 211 in order from the oldest piece of content. After the synchronization control unit 124 has instructed the mobile server 200 to delete the recorded content in order from the oldest piece of content, the process proceeds to step S4.

In the automatic transfer management table 165, a recording time slot, image quality, and a recording period may be collectively designated for all the channels, not for each channel. The automatic transfer target designation item designates whether or not content is to be transferred for each channel. An available transfer period in which content can be automatically transferred is calculated by using the recording capacity of a transfer destination.

For example, in a case where the recording capacity of the channel automatic recorded content transfer area 211 of the mobile server 200 is 128 GB, the recording time slots of six channels are from 18:00 to 25:00, the image quality corresponds to a compression ratio of 15×, and the recording period is not designated, the available transfer period is calculated on the basis of the following expression.

$$\text{Available transfer period} = $$
$$128 \text{ GB [capacity]}/(18/8 \text{ Mbps [band]} * 60s * 60s *$$
$$(6 \text{ [number of channels]} * 7 \text{ [hours]})) * 15 \text{ [image quality]} =$$
$$128 * 1000/(18/8 * 60 * 60 * 6 * 7) * 15 = 5.6 \text{ days}$$

As is understood from the calculation result, recorded content for 5 days can be transferred, and thus the synchronization control unit 124 selects the recorded content for the latest 5 days as a target to be automatically transferred.

In a case where it is possible to set, for each channel, whether or not recorded content is to be automatically transferred, and "halt" is set to the automatic transfer target designation item, the recorded content of the corresponding channel is not transferred. Among the pieces of recorded content in the channel automatic recording area 111, a piece of recorded content of the channel for which automatic transfer is not performed is eliminated from a target to be automatically transferred. In this case, the recorded content to be transferred is decreased, and thus the available transfer period is increased.

For example, in a case where the recording capacity of the channel automatic recorded content transfer area 211 is 128 GB, the recording time slots of six channels are from 18:00 to 25:00, the image quality corresponds to a compression ratio of 15×, the recording period is not designated, and a setting has been made not to automatically transfer recorded content of two channels, the available transfer period is calculated on the basis of the following expression.

$$\text{Available transfer period} = 128 \text{ GB [capacity]}/$$
$$(18/8 \text{ Mbps [band]} * 60s * 60s * (4\text{[number of channels]} * 7\text{[hours]})) *$$
$$15\text{[image quality]} 128 * 1000/(18/8 * 60 * 60 * 4 * 7) * 15 = 8.4 \text{ days}$$

As is understood from the calculation result, recorded content for 8 days can be transferred, and thus the synchronization control unit 124 selects the recorded content for the latest 8 days as a target to be automatically transferred.

Recorded content of a paid broadcast channel (copy once content or move-only recorded content 311) cannot be a target of automatic transfer, and thus "impossible" is set to the automatic transfer target designation item.

For example, in a case where a recording period is designated and image quality is not designated, it is necessary to calculate an available transfer period by calculating the image quality. The available transfer period can be obtained simply by calculating the ratio of the channel automatic recording area 111 to the channel automatic recorded content transfer area 211 and by multiplying the calculated ratio by the recording period.

For example, in a case where the capacity of the channel automatic recording area 111 is 1 TB, the recording capacity of the channel automatic recorded content transfer area 211 is 128 GB, the recording time slots of six channels are from 18:00 to 25:00, the recording period is designated to be 4 weeks (28 days), and the image quality is not designated, the available transfer period is calculated on the basis of the following expression.

Available transfer period =

$$28 \text{ [days]} * (128 \text{ GB}/1 \text{ TB}) = 28/8 \text{ [days]} = 3.5 \text{ days}$$

As is understood from the calculation result, recorded content for 3 days can be transferred, and thus the synchronization control unit 124 selects the recorded content for the latest 3 days as a target to be automatically transferred.

For example, in a case where the recording capacity of the channel automatic recorded content transfer area 211 is 128 GB, the recording time slots are designated as in FIG. 10, the image quality corresponds to a compression ratio of 10×, the recording period is not designated, and broadcast stations A to F in FIG. 10 are designated as an automatic transfer target, the available transfer period is calculated on the basis of the following expression.

Available transfer period = 128 GB [capacity]/

$$(18/8 \text{ Mbps [band]} * 60s * 60s * (17 + 7*4 + 1) \text{ [hours]}) *$$

$$10\text{[image quality]} = 128 * 1000/(18/8 * 60 * 60 * 46) * 10 = 3.4 \text{ days}$$

As is understood from the calculation result, recorded content for 3 days can be transferred, and thus the synchronization control unit 124 selects the recorded content for the latest 3 days as a target to be automatically transferred.

In the above-described example, an available transfer period is calculated by setting, for each channel, whether or not recorded content is a target to be automatically transferred. The present disclosure is not limited thereto, and a transfer period indicating a period in which content is automatically transferred may be designated for each channel.

FIG. 11 is a flowchart illustrating a first modification example of the automatic transfer process of automatically transferring the recorded content in the channel automatic recording area 111 to the channel automatic recorded content transfer area 211 in the mobile server 200. FIG. 12 is a diagram illustrating another example of the automatic transfer management table 165 for each apparatus ID.

The process illustrated in FIG. 11 may be performed when the recording server 100 detects that the recording server 100 has become able to communicate with the mobile server 200.

First, in step S11, the synchronization control unit 124 provides an instruction to delete, among the pieces of recorded content in the mobile server 200, a piece of recorded content for which the transfer period designated in the automatic transfer management table 165 has expired.

As illustrated in FIG. 12, the automatic transfer management table 165 is constituted by a recording channel designation item for designating a channel as a target of channel automatic recording, a recording time slot designation item for designating a time slot in a day in which automatic recording is to be performed, an image quality designation item for designating image quality for recording, a recording period designation item for designating the number of days for which automatic recording is to be performed, and an automatic transfer target and transfer period designation item for designating, for each channel, whether or not content is a target to be automatically transferred and a transfer period.

The recording channel designation item, the recording time slot designation item, the image quality designation item, and the recording period designation item are the same as those in the channel automatic recording management table 147. A recording time slot, image quality, and a recording period are collectively designated for all the channels, nor for each channel. Whether or not recorded content is to be automatically transferred is designated for each channel that is designated by recording channel designation. Also, a transfer period is designated for each channel designated by recording channel designation.

In the automatic transfer management table 165 illustrated in FIG. 12, whether or not recorded content is to be automatically transferred and a transfer period are indicated as one item. In a case where "0 days" is set to the automatic transfer target and transfer period designation item, the recorded content of the corresponding channel is not transferred. In a case where a specific period, such as "5 days", is set to the automatic transfer target designation item, the recorded content corresponding to the transfer period is transferred. In FIG. 12, automatic transfer for two channels is halted, and thus the entire capacity is decreased.

Here, a necessary capacity of the channel automatic recorded content transfer area 211 can be calculated on the basis of the designation of a transfer period. In this case, the synchronization control unit 124 calculates the capacity of the channel automatic recorded content transfer area 211 for each channel by using the image quality (compression ratio) of recorded content, and the recording time slot and transfer period of each channel, so as to calculate the necessary capacity of the channel automatic recorded content transfer area 211 for all the channels. Thus, the necessary capacity of the channel automatic recorded content transfer area 211 is calculated on the basis of the following expression.

Necessary capacity of channel automatic recorded content transfer area =

$$18/8 \text{ Mbps [band]} * 60s * 60s * (7*(3+5)*2)$$

$$\text{[hours]})/15\text{[image quality]} = (18/8 * 60 * 60 * (58)/15 = 31.3 \text{ GB}$$

As is understood from the calculation result, the necessary capacity of the channel automatic recorded content transfer area 211 of the mobile server 200 is 32 GB.

Step S12 in FIG. 11 is the same as step S1 in FIG. 9, and thus the description thereof is omitted.

In step S13, the synchronization control unit 124 determines whether or not recorded content as a target to be automatically transferred that does not exist in the mobile server 200 and is within the transfer period exists in the recording server 100. If the synchronization control unit 124 determines that recorded content as a target to be automatically transferred that does not exist in the mobile server 200 and is within the transfer period does not exist in the recording server 100 (NO in step S13), the process ends. On the other hand, if the synchronization control unit 124 determines that recorded content as a target to be automatically transferred that does not exist in the mobile server 200 and is within the transfer period exists in the recording server 100 (YES in step S13), the process proceeds to step S14.

Steps S14 to S17 in FIG. 11 are the same as steps S3 to S6 in FIG. 9, and thus the description thereof is omitted.

The automatic transfer target and transfer period designation item illustrated in FIG. 12 may be divided into an automatic transfer target item for designating, for each channel, whether or not content is a target to be automatically transferred, and a transfer period designation item for designating, for each channel, a transfer period.

For example, in a case where the recording time slots of six channels are from 18:00 to 25:00, the image quality corresponds to a compression ratio of 15×, the recording period is not designated, and six channels are designated as a target of automatic transfer where the transfer period is five days for two channels and the transfer period is three days for four channels, the necessary capacity of the channel automatic recorded content transfer area 211 is calculated on the basis of the following expression.

Necessary capacity of channel automatic recorded content transfer area =

$$18/8 \text{ Mbps [band]} * 60s * 60s * (7*4*3 + 7*2*5)\text{[hours]})/$$

$$15\text{[image quality]} = (18/8 * 60 * 60(154)/15 = 83.2 \text{ GB}$$

As is understood from the calculation result, the necessary capacity of the channel automatic recorded content transfer area 211 of the mobile server 200 is 84 GB.

In the above-described example, it is set for each channel whether or not recorded content is a target to be automatically transferred, and a transfer period is set for each channel. The present disclosure is not limited thereto, and a transfer time slot indicating a time slot in which content is automatically transferred may be designated for each channel.

Figure 13:
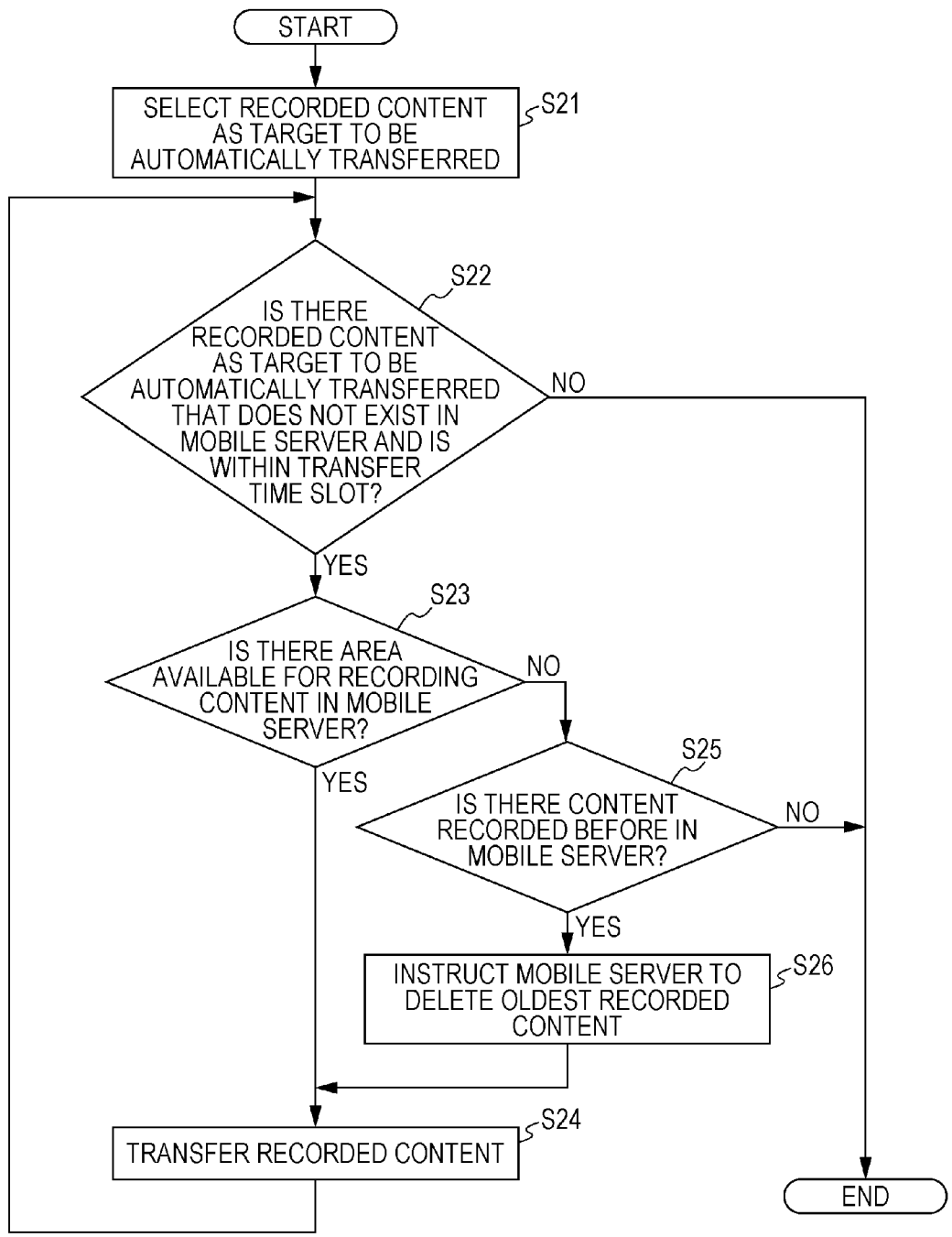
FIG. 13 is a flowchart illustrating a second modification example of the automatic transfer process of automatically transferring recorded content in the channel automatic recording area to the channel automatic recorded content transfer area in the mobile server.

FIG. 13 is a flowchart illustrating a second modification example of the automatic transfer process of automatically transferring the recorded content in the channel automatic recording area 111 to the channel automatic recorded content transfer area 211 of the mobile server 200.

The process illustrated in FIG. 13 may be performed when the recording server 100 detects that the recording server 100 has become able to communicate with the mobile server 200.

Step S21 in FIG. 13 is the same as step S1 in FIG. 9, and thus the description thereof is omitted.

In step S22, the synchronization control unit 124 determines whether or not recorded content as a target to be automatically transferred that does not exist in the mobile server 200 and that is within a transfer time slot exists in the recording server 100.

The automatic transfer management table 165 is constituted by a recording channel designation item for designating a channel as a target of channel automatic recording, a recording time slot designation item for designating a time slot in a day in which automatic recording is to be performed, an image quality designation item for designating image quality for recording, an automatic transfer target designation item for designating, for each channel, whether or not content is a target to be automatically transferred, and a transfer time slot designation item for designating a time slot in which content is automatically transferred in a recording time slot.

The recording channel designation item, the recording time slot designation item, and the image quality designation item are the same as those in the channel automatic recording management table 147. A transfer time slot is designated for each channel, and a start time and an end time of the transfer time slot are designated. The transfer time slot may be collectively designated for all the channels, not for each channel.

When the synchronization control unit 124 detects that the recording server 100 has become able to communicate with the mobile server 200, the synchronization control unit 124 copies or moves, to the mobile server 200, a piece of content of the channel and time slot designated by the user among the pieces of content recorded in the channel automatic recording area 111.

For example, in a case where a transfer time slot is designated, an available transfer period can be calculated by using an available capacity of the channel automatic recorded content transfer area 211. In this case, a transfer capacity necessary in one day for each channel can be calculated by using the image quality (compression ratio) of the recorded content and the transfer time slot of each channel. Thus, the synchronization control unit 124 is capable of calculating an available transfer period (the number of days) on the basis of the capacity of the channel automatic recorded content transfer area 211. Thus, in a case where the recording capacity of the channel automatic recorded content transfer area 211 is 128 GB, the recording time slots of six channels are from 7:00 to 24:00, the image quality corresponds to a compression ratio of 15×, and the transfer time slots of the six channels are from 20:00 to 23:00, the available transfer period is calculated on the basis of the following expression.

Available transfer period =

$$128 \text{ GB[capacity]}/(18/8 \text{ Mbps [band]} * 60s * 60s * (3*6)\text{[hours]}) *$$

$$15\text{[image quality]} = 128 * 1000/(18/8 * 60 * 60 * 18) * 15 = 13.2 \text{ days}$$

As is understood from the calculation result, recorded content for 13 days can be automatically transferred to the mobile server 200.

Alternatively, a transfer time slot may be designated for each channel. For example, in a case where the recording capacity of the channel automatic recorded content transfer area 211 is 128 GB, the recording time slots of six channels are from 7:00 to 24:00, the image quality corresponds to a compression ratio of 15×, the start time and end time of the transfer time slot corresponding to broadcast station A are designated to be 8:00 and 8:30, respectively, the start time and end time of the transfer time slot corresponding to broadcast stations B, C, D, and E are designated to be 20:00 and 23:00, respectively, and the start time and end time of the transfer time slot corresponding to broadcast station F are designated to be 23:00 and 24:00, respectively, the available transfer period is calculated on the basis of the following expression.

Available transfer period =

$$128 \text{ GB[capacity]}(18/8 \text{ Mbps [band]} * 60s * 60s(0.5 + 3*4 + 1\text{[hours]}) *$$

$$15\text{[image quality]} =$$

$$128 * 1000/(18/8 * 60 * 60 * 13.5) * 15 = 17.6 \text{ days}$$

As is understood from the calculation result, recorded content for 17 days can be automatically transferred to the mobile server 200.

Alternatively, a recording time slot, image quality, and a transfer time slot may be designated for each channel. For example, the image quality corresponding to broadcast stations A, B, C, D, and F may be designated to correspond to a compression ratio of 15×, and the image quality corresponding to broadcast station E may be designated to correspond to a compression ratio of 10×. In this case, recorded content whose image quality (compression ratio) is 10× and recorded content whose image quality is 15× exist in mixture. Thus, for example, in a case where the recording capacity of the channel automatic recorded content transfer area 211 is 128 GB, the recording time slots of the six channels are designated as in FIG. 10, the image quality of five channels corresponds to a compression ratio of 15×, the image quality of one channel corresponds to a compression ratio of 10×, the start time and end time of the transfer time slot corresponding to broadcast station A are designated to be 8:00 and 8:30, respectively, the start time and end time of the transfer time slots corresponding to broadcast stations B, C, D, and E are designated to be 20:00 and 23:00, respectively, and the start time and end time of the transfer time slot corresponding to broadcast station F are designated to be 23:00 and 24:00, respectively, the available transfer period is calculated on the basis of the following expression.

$$\text{Available transfer period} =$$
$$128 \text{ GB[capacity]}/(18/8 \text{ Mbps [band]} * 60s * 60s) *$$
$$(0.5 + 3*3 + 3*1.5 + 1 \text{ [hours]}) * 15 \text{[image quality]} =$$
$$128 * 1000/(18/8 * 60 * 60 * 15) * 15 = 15.7 \text{ days}$$

As is understood from the calculation result, recorded content for 15 days can be automatically transferred to the mobile server 200.

Here, if it is determined that recorded content as a target to be automatically transferred that does not exist in the mobile server 200 and is within the transfer time slot does not exist (NO in step S22), the process ends. On the other hand, if it is determined that recorded content as a target to be automatically transferred that does not exist in the mobile server 200 and is within the transfer time slot exists (YES in step S22), the process proceeds to step S23.

Steps S23 to S26 in FIG. 13 are the same as steps S3 to S6 in FIG. 9, and thus the description thereof is omitted.

In the above-described example, whether or not content is a target to be automatically transferred is set for each channel, and a transfer time slot is set for each channel. The present disclosure is not limited thereto, and a genre of recorded content to be transferred may be designated in addition to a transfer time slot indicating a time slot in which the recorded content is automatically transferred.

Figure 14:
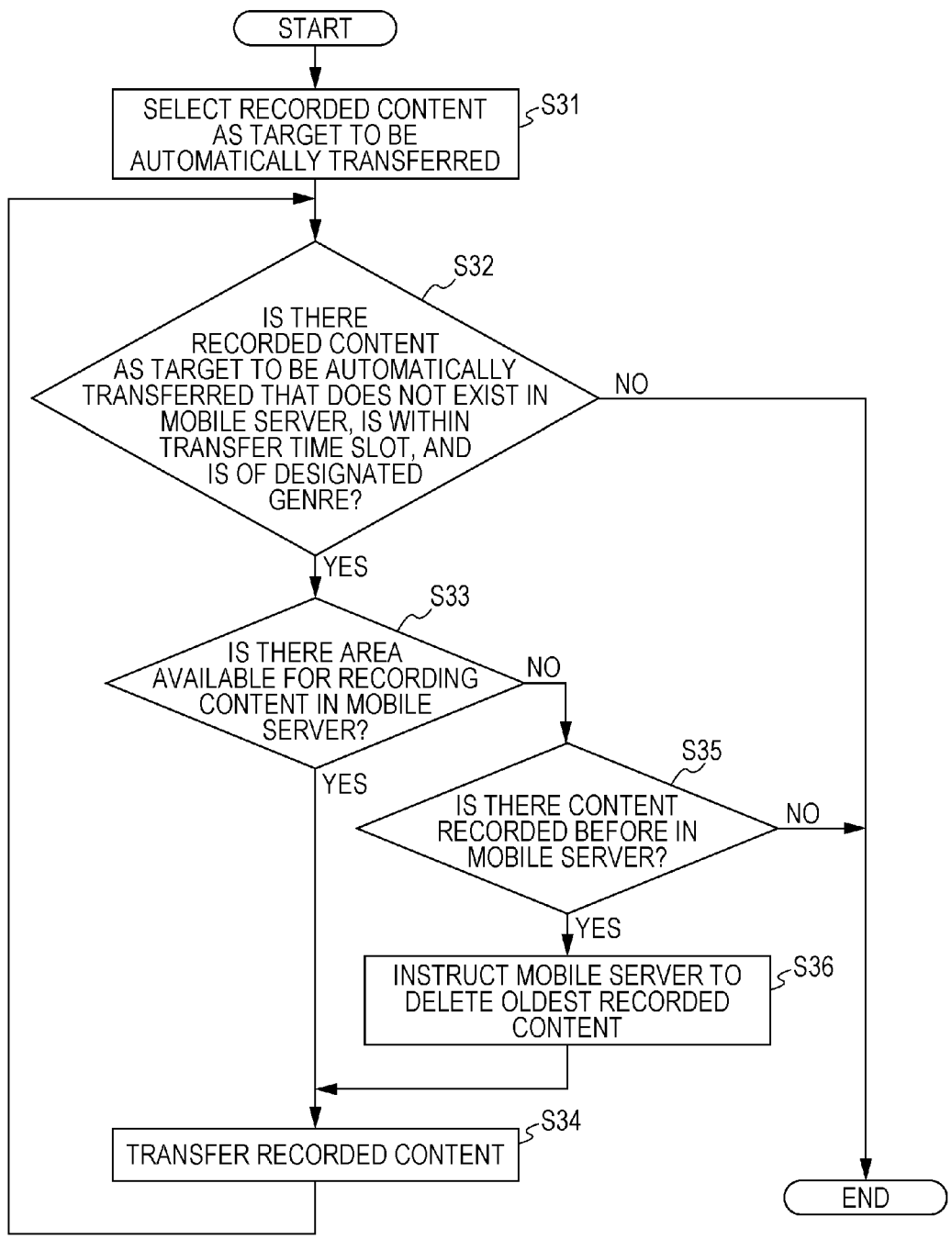
FIG. 14 is a flowchart illustrating a third modification example of the automatic transfer process of automatically transferring recorded content in the channel automatic recording area to the channel automatic recorded content transfer area in the mobile server.

FIG. 14 is a flowchart illustrating a third modification example of the automatic transfer process of automatically transferring the recorded content in the channel automatic recording area 111 to the channel automatic recorded content transfer area 211 in the mobile server 200.

The process illustrated in FIG. 14 may be performed when the recording server 100 detects that the recording server 100 has become able to communicate with the mobile server 200.

Step S31 in FIG. 14 is the same as step S1 in FIG. 9, and thus the description thereof is omitted.

In step S32, the synchronization control unit 124 determines whether or not recorded content as a target to be automatically transferred that does not exist in the mobile server 200, is within the transfer time slot, and is of a designated genre exists in the recording server 100.

FIG. 15 is a diagram illustrating another example of the automatic transfer management table 165 for each apparatus ID.

The automatic transfer management table 165 is constituted by a recording channel designation item for designating a channel as a target of channel automatic recording, a recording time slot designation item for designating a time slot in a day in which automatic recording is to be performed, an image quality designation item for designating image quality for recording, an automatic transfer target designation item for designating, for each channel, whether or not content is a target to be automatically transferred, a transfer time slot designation item for designating a time slot in which automatic transfer is performed in a recording time slot, and a genre designation item for designating a genre of recorded content to be automatically transferred.

The recording channel designation item, the recording time slot designation item, and the image quality designation item are the same as those in the channel automatic recording management table 147. A transfer time slot is designated for each channel, and a start time and an end time of the transfer time slot are designated. A genre is designated for each channel. For example, news, drama, variety, music, animation, or sports is designated as a genre.

As illustrated in FIG. 15, in a case where the recording capacity of the channel automatic recorded content transfer area 211 is 128 GB and the total transfer time is 6 hours in which 2.5 hours/day for variety, 3 hours/day for drama, and 0.5 hours/day for news in a designated transfer time slot, the available transfer period is calculated on the basis of the following expression.

$$\text{Available transfer period} =$$
$$128 \text{ GB[capacity]}/(18/8 \text{ Mbps[band]} * 60s * 60s * (6)\text{[hours]}) *$$
$$15 \text{ [image quality]} = 128 * 1000/(18/8 * 60 * 60 * 6) * 15 = 39.6 \text{ days}$$

As is understood from the calculation result, recorded content for 39 days can be automatically transferred to the mobile server 200.

If it is determined that recorded content as a target to be automatically transferred that does not exist in the mobile server 200, is within the transfer time slot, and is of a designated genre does not exist in the recording server 100 (NO in step S32), the process ends. On the other hand, if it is determined that recorded content as a target to be automatically transferred that does not exist in the mobile server 200, is within the transfer time slot, and is of a designated genre exists in the recording server 100 (YES in step S32), the process proceeds to step S33.

Steps S33 to S36 in FIG. 14 are the same as steps S3 to S6 in FIG. 9, and thus the description thereof is omitted.

In FIG. 15, a transfer time slot and a genre may be collectively designated for all the channels, not for each channel. The synchronization control unit 124 checks the genre information about each piece of recorded content in the transfer time slot so as to select pieces of recorded content as a target to be automatically transferred, and calculates the total capacity of the selected pieces of recorded content. Accordingly, the synchronization control unit 124 is capable of calculating a necessary transfer capacity. Thus, the synchronization control unit 124 is capable of calculating an available transfer period (the number of days) on the basis of the capacity of the channel automatic recorded content transfer area 211. Thus, in a case where the recording capacity of the channel automatic recorded content transfer area 211 is 128 GB, the image quality corresponds to a compression ratio of 15×, and the total transfer time is 12 hours in which 5 hours/day for news, 6 hours/day for drama, and 1 hour/day for animation in the transfer time slot, the available transfer period is calculated on the basis of the following expression.

$$\text{Available transfer period} =$$
$$128 \text{ GB[capacity]}/(18/8 \text{ Mbps[band]} * 60s * 60s * (12)[\text{hours}]) *$$
$$15 \text{ [image quality]} = 128 * 1000/(18/8 * 60 * 60 * 12) * 15 = 19.8 \text{ days}$$

As is understood from the calculation result, recorded content for 19 days can be automatically transferred to the mobile server 200.

Whether or not recorded content is to be automatically transferred may be set for each channel. In a case where "halt" is set to the automatic transfer target designation item, the recorded content of the corresponding channel is not transferred.

For example, in a case where the recording capacity of the channel automatic recorded content transfer area 211 is 128 GB, the image quality corresponds to a compression ratio of 15×, a setting has been made not to automatically transfer recorded content of two channels, and the total transfer time is 8 hours in which 3 hours/day for news, 4 hours/day for drama, and 1 hour/day for animation in the transfer time slot, the available transfer period is calculated on the basis of the following expression.

$$\text{Available transfer period} =$$
$$128 \text{ GB[capacity]}/(18/8 \text{ Mbps[band]} * 60s * 60s * (8)[\text{hours}]) *$$
$$15 \text{ [image quality]} = 128 * 1000/(18/8 * 60 * 60 * 12) * 15 = 29.7 \text{ days}$$

As is understood from the calculation result, recorded content for 29 days can be automatically transferred to the mobile server 200.

In FIG. 15, a transfer time slot may be collectively designated for all the channels, not for each channel, and a genre may be designated for each channel. In addition to designation of whether or not automatic transfer is to be performed for each channel, designation of both of the transfer time slot of recorded content and a genre for each channel can be performed. In this case, the synchronization control unit 124 checks the genre information about each piece of recorded content in the transfer time slot so as to select pieces of recorded content as a target to be automatically transferred, and calculates the total capacity of the selected pieces of recorded content. Accordingly, the synchronization control unit 124 is capable of calculating a necessary transfer capacity. Thus, the synchronization control unit 124 is capable of calculating an available transfer period (the number of days) on the basis of the recording capacity of the channel automatic recorded content transfer area 211. Thus, in a case where the recording capacity of the channel automatic recorded content transfer area 211 is 128 GB, the image quality corresponds to a compression ratio of 15×, and an average recording time of six channels in the transfer time slot is 2 hours/day, the available transfer period is calculated on the basis of the following expression.

$$\text{Available transfer period} =$$
$$128 \text{ GB[capacity]}/(18/8 \text{ Mbps[band]} * 60s * 60s * (12)[\text{hours}]) *$$
$$15 \text{ [image quality]} = 128 * 1000/(18/8 * 60 * 60 * 12) * 15 = 19.8 \text{ days}$$

As is understood from the calculation result, recorded content for 19 days can be automatically transferred to the mobile server 200.

For example, in a case where the recording capacity of the channel automatic recorded content transfer area 211 is 128 GB, the image quality corresponds to a compression ratio of 15×, the start time and end time of the transfer time slot corresponding to broadcast station A are designated to be 8:00 and 8:30, respectively, the start time and end time of the transfer time slots corresponding to broadcast stations B, C, D, and E are designated to be 20:00 and 23:00, respectively, the start time and end time of the transfer time slot corresponding to broadcast station F are designated to be 23:00 and 24:00, respectively, the genre corresponding to broadcast station A is designated to be news and drama, the genre corresponding to broadcast station B is designated to be drama, the genre corresponding to broadcast station C is designated to be music, the genre corresponding to broadcast station D is designated to be variety, the genre corresponding to broadcast station E is designated to be drama, the genre corresponding to broadcast station F is designated to be news, and the total transfer time is 8 hours in which 3 hours/day for variety, 4 hours/day for drama, and 1 hour/day for news in the transfer time slot, the available transfer period is calculated on the basis of the following expression.

$$\text{Available transfer period} =$$
$$128 \text{ GB[capacity]}/(18/8 \text{ Mbps[band]} * 60s * 60s * (8)[\text{hours}]) *$$
$$15 \text{ [image quality]} = 128 * 1000/(18/8 * 60 * 60 * 8) * 15 = 29.7 \text{ days}$$

As is understood from the calculation result, recorded content for 29 days can be automatically transferred to the mobile server 200.

In the automatic transfer process illustrated in FIG. 14, the synchronization control unit 124 determines whether or not recorded content as a target to be automatically transferred that does not exist in the mobile server 200, is within the transfer time slot, and is of a designated genre exists in the recording server 100. The present disclosure is not limited thereto, and the synchronization control unit 124 may determine whether or not recorded content as a target to be automatically transferred that does not exist in the mobile server 200 and is of a designated genre exists in the recording server 100.

In this case, the automatic transfer management table 165 is constituted by a recording channel designation item for designating a channel as a target of channel automatic recording, a recording time slot designation item for designating a time slot in a day in which automatic recording is to be performed, an image quality designation item for designating image quality for recording, an automatic transfer target designation item for designating, for each channel, whether or not content is a target to be automatically transferred, and a genre designation item for designating a genre of the recorded content to be automatically transferred.

When the synchronization control unit 124 detects that the recording server 100 has become able to communicate with the mobile server 200, the synchronization control unit 124 copies or moves, to the mobile server 200, a piece of content corresponding to the genre designated by the user among the pieces of content recorded in the channel automatic recording area 111.

In addition to designation of whether or not automatic transfer is to be performed for each channel, designation of a genre of recorded content can be performed. A genre is collectively designated for all the channels, not for each channel. The synchronization control unit 124 calculates a transfer period on the basis of an available capacity of the channel automatic recorded content transfer area 211. In this case, the synchronization control unit 124 checks the genre information about each piece of recorded content so as to select pieces of recorded content as a target to be automatically transferred, and calculates the total capacity of the selected pieces of recorded content. Accordingly, the synchronization control unit 124 is capable of calculating a necessary transfer capacity. Thus, the synchronization control unit 124 is capable of calculating an available transfer period (the number of days) on the basis of the recording capacity of the channel automatic recorded content transfer area 211. Thus, in a case where the recording capacity of the channel automatic recorded content transfer area 211 is 128 GB, the image quality corresponds to a compression ratio of 15×, and the total transfer time is 18 hours in which 6 hours/day for news, 9 hours/day for drama, and 3 hours/day for animation, the available transfer period is calculated on the basis of the following expression.

Available transfer period =

128 GB[capacity]/(18/8 Mbps[band])∗60s∗60s∗(18)[hours])∗

15 [image quality] = 128∗1000/(18/8∗60∗60∗18)∗15 = 13.2 days

As is understood from the calculation result, recorded content for 13 days can be automatically transferred to the mobile server 200.

In addition to designation of whether or not automatic transfer is to be performed for each channel, designation of a genre of recorded content can be performed for each channel. A genre is designated for each channel. The synchronization control unit 124 calculates a transfer period on the basis of an available capacity of the channel automatic recorded content transfer area 211. In this case, the synchronization control unit 124 checks the genre information about each piece of recorded content so as to select pieces of recorded content as a target to be automatically transferred, and calculates the total capacity of the selected pieces of recorded content. Accordingly, the synchronization control unit 124 is capable of calculating a necessary transfer capacity. Thus, the synchronization control unit 124 is capable of calculating an available transfer period (the number of days) on the basis of the recording capacity of the channel automatic recorded content transfer area 211. Thus, in a case where the recording capacity of the channel automatic recorded content transfer area 211 is 128 GB, the image quality corresponds to a compression ratio of 15×, and the average recording time of each channel is 3 hours/day, the available transfer period is calculated on the basis of the following expression.

Available transfer period =

128 GB[capacity]/(18/8 Mbps[band])∗60s∗60s∗(18)[hours])∗

15 [image quality] = 128∗1000/(18/8∗60∗60∗18)∗15 = 13.2 days

As is understood from the calculation result, recorded content for 13 days can be automatically transferred to the mobile server 200.

FIGS. 16 and 17 are diagrams illustrating an example in which the automatic transfer management table 165 illustrated in FIG. 15 is divided into two tables.

FIG. 16 is a diagram illustrating an example of a channel automatic recording management table, and FIG. 17 is a diagram illustrating an example of an automatic transfer management table.

In order to associate the pieces of information in the two tables with each other, an item of a recording channel ID is added to both tables. With the recording channel IDs, the relationship between the two tables is defined.

Figure 18:
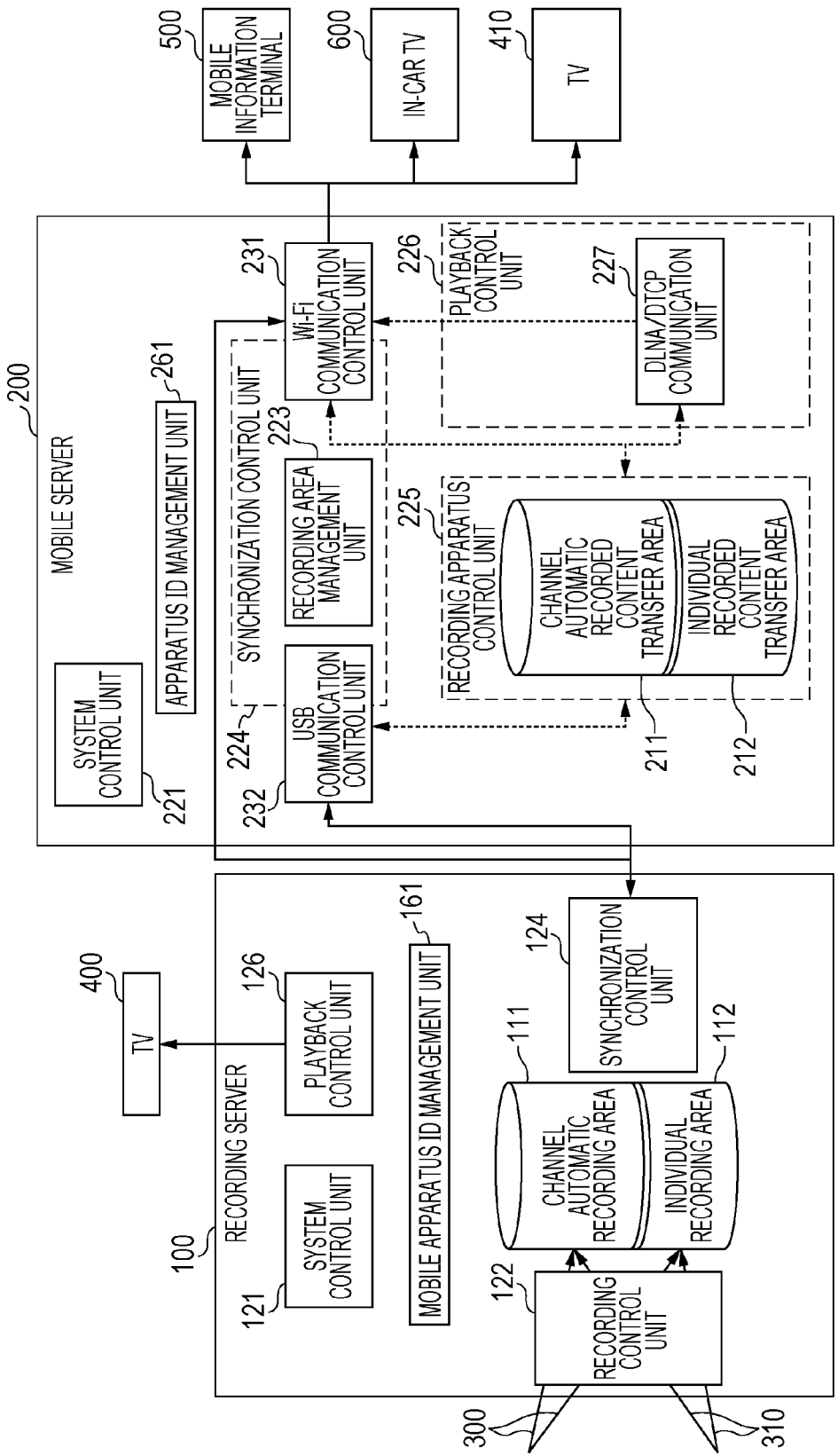
FIG. 18 is a diagram illustrating the basic configuration of the mobile server according to the embodiment.

FIG. 18 is a diagram illustrating the basic configuration of the mobile server 200 according to the embodiment.

The mobile server 200 includes the system control unit 221, the synchronization control unit 224, a recording apparatus control unit 225, the playback control unit 226, and the apparatus ID management unit 261.

The apparatus ID management unit 261 manages apparatus IDs that are used to discriminate the mobile server 200 from apparatuses such as the recording server 100, or that are used for an encryption process for the recorded content stored in the mobile server 200.

The synchronization control unit 224 includes a USB communication control unit 232 or a Wi-Fi communication control unit 231, which is used for communication between the mobile server 200 and the recording server 100. Also, the synchronization control unit 224 includes a recording area management unit 223 that manages the channel automatic recorded content transfer area 211 and the individual recorded content transfer area 212. The synchronization control unit 224 receives information, such as recorded content, from the recording server 100 and transfers the recorded content to the recording apparatus control unit 225, and thereby records the recorded content in the channel automatic recorded content transfer area 211 or the individual recorded content transfer area 212 in the recording apparatus control unit 225.

The recording apparatus control unit 225 includes the channel automatic recorded content transfer area 211 and the individual recorded content transfer area 212. The recording apparatus control unit 225 controls the channel automatic recorded content transfer area 211 and the individual recorded content transfer area 212.

The playback control unit 226 transmits the recorded content recorded in the channel automatic recorded content transfer area 211 or the individual recorded content transfer area 212 in the recording apparatus control unit 225 to an apparatus with which videos can be viewed, such as the mobile information terminal 500, the in-car TV 600, or the DLNA-compatible TV 410, and realizes video viewing. The playback control unit 226 includes a DLNA/DTCP communication unit 227.

The system control unit 221 controls the entire mobile server 200.

In a case where the recorded content in the recording server 100 is encrypted content and is specified, as a commercialization condition or the like, to be encrypted when being stored in the mobile server 200, the synchronization control unit 224 encrypts the recorded content in accordance with the specification of CPRM, AACS, or the like and then stores the encrypted recorded content in the channel automatic recorded content transfer area 211 or the individual recorded content transfer area 212.

In a case where the recorded content in the channel automatic recorded content transfer area 211 or the individual recorded content transfer area 212 is encrypted, the playback control unit 226 performs an appropriate encryption process such as DTCP/IP on the basis of the specification of an encryption scheme, and transfers the encrypted recorded content to the mobile information terminal 500, the DLNA-compatible TV 410, or the like.

In a case where it is demanded to perform operation without power supply from the outside when content is viewed using the mobile information terminal 500, the in-car TV 600, or the like, the mobile server 200 may have a rechargeable secondary battery built therein.

The mobile server 200 includes a minimum user interface (UI), such as a power ON/OFF switch, because it may be taken out of a house and content may be viewed using the mobile information terminal 500, the in-car TV 600, or the like while the mobile server 200 is in a user's bag. A setting of a recorded content transfer process is performed in the recording server 100, whereas an operation of viewing the stored recorded content is performed in the mobile information terminal 500 or the in-car TV 600, which is a video viewing apparatus.

The recording apparatus control unit 225 is capable of determining the capacity of the channel automatic recorded content transfer area 211 in accordance with the recording capacity required for the individual recorded content transfer area 212. Also, the recording apparatus control unit 225 is capable of specifying the recording capacity or the minimum capacity of the channel automatic recorded content transfer area 211 in accordance with an instruction provided from the recording server 100.

In the configuration example illustrated in FIG. 18, a passive apparatus, such as a portable hard disk drive (HDD) or a portable solid state drive (SSD), is assumed. Alternatively, software implementation can be performed by using a mobile apparatus, such as a tablet computer, including a secondary recording apparatus such as a large capacity SSD.

The mobile server 200 may include a portable recording medium instead of the recording apparatus control unit 225, which serves as a built-in recording medium. The portable recording medium includes the channel automatic recorded content transfer area 211 and the individual recorded content transfer area 212. The recording server 100 manages recorded content by using medium IDs of portable recording media, instead of apparatus IDs. Thus, even if there is a single mobile server 200, pieces of recorded content having different settings can be stored by using a plurality of portable recording media. For example, only content broadcast as a news program may be automatically transferred to a first portable recording medium, content broadcast as a drama or documentary program may be automatically transferred to a second portable recording medium, and the first portable recording medium and the second portable recording medium may be exchanged when the recorded content is viewed by using the mobile information terminal 500 or the like.

In this configuration example, a passive apparatus, such as a portable HDD, a portable SSD, or a media card reader, is assumed for the mobile server 200. Alternatively, software implementation can be performed by using a mobile apparatus, such as a tablet computer including a media card slot for an SD memory card or the like.

The mobile server 200 may include a built-in recording medium and a portable recording medium. The built-in recording medium managed by the recording apparatus control unit 225 includes the channel automatic recorded content transfer area 211, whereas the portable recording medium includes the individual recorded content transfer area 212.

In this configuration example, a passive apparatus, such as a portable HDD, a portable SSD, or a media card reader, is assumed. Alternatively, software implementation can be performed by using a mobile apparatus, such as a tablet computer including a secondary recording apparatus such as a large capacity SSD and a media card slot for an SD memory card or the like.

The built-in recording medium managed by the recording apparatus control unit 225 may include the individual recorded content transfer area 212, whereas the portable recording medium may include the channel automatic recorded content transfer area 211.

In this configuration example, a passive apparatus, such as a portable HDD, a portable SSD, or a media card reader, is assumed. Alternatively, software implementation can be performed by using a mobile apparatus, such as a tablet computer including a secondary recording apparatus such as a large capacity SSD and a media card slot for an SD memory card or the like.

The playback control unit 226 may further include an AV decoder and an HDMI communication control unit so that content can be viewed using a typical HDMI-compatible television set via an HDMI or the like. With this configuration, the recorded content in the mobile server 200 can be viewed using an HDMI-compatible television set in a house, in addition to a mobile apparatus.

Further, the playback control unit 226 may be configured by implementing software in a motile terminal, such as the mobile information terminal 500.

Figure 19:
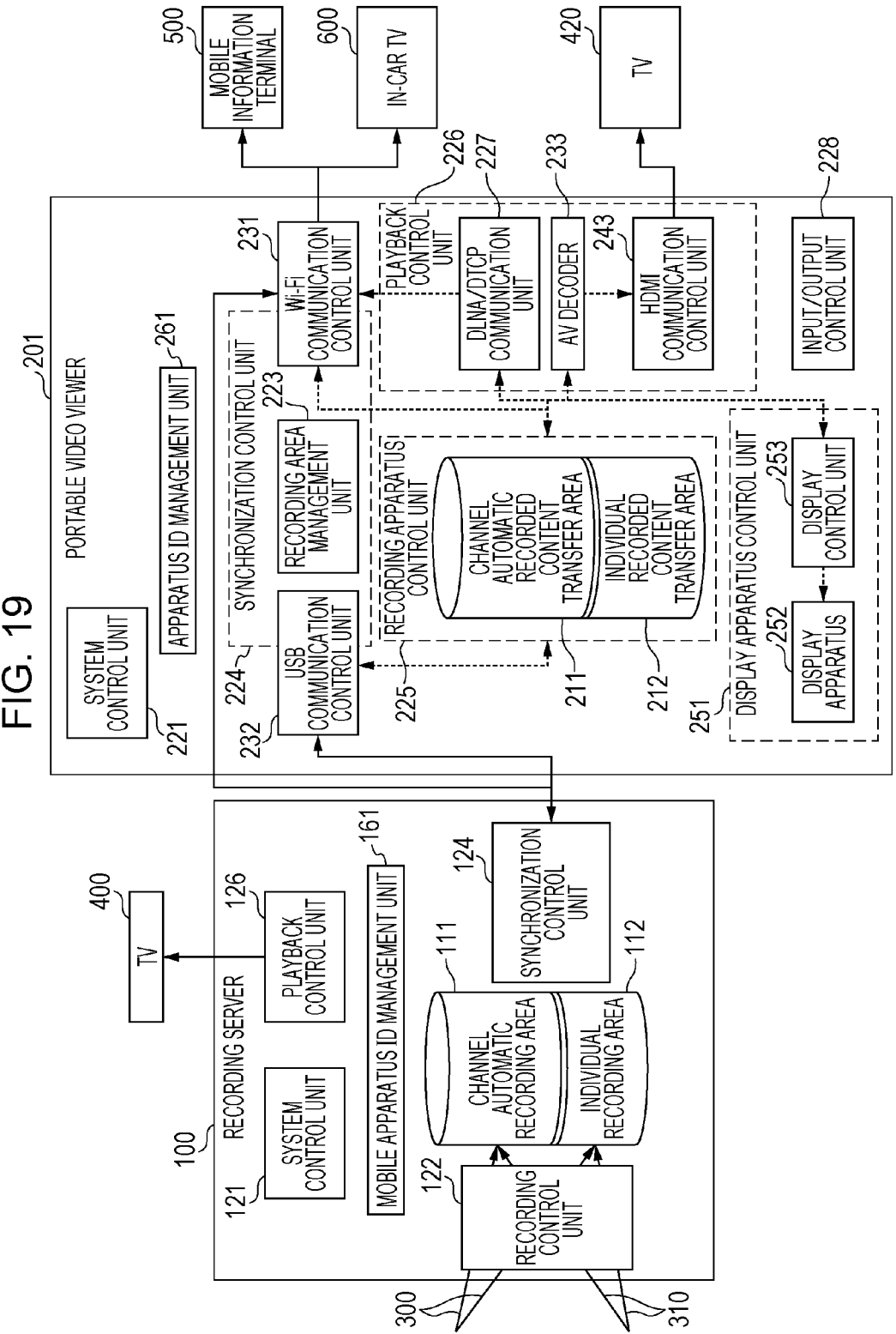
FIG. 19 is a diagram illustrating the basic configuration of a portable video viewer according to the embodiment.

FIG. 19 is a diagram illustrating the basic configuration of a portable video viewer according to the embodiment.

A portable video viewer 201 includes the system control unit 221, an input/output control unit 228, the synchronization control unit 224, the recording apparatus control unit 225, the playback control unit 226, the apparatus ID management unit 261, and a display apparatus control unit 251.

The playback control unit 226 includes the DLNA/DTCP communication unit 227, an AV decoder 233, and an HDMI communication control unit 243.

Video signals that have been played back by the AV decoder 233 are output to an outside HDMI-compatible TV 420 or the like via the HDMI communication control unit 243, and thereby video content are viewed. The display apparatus control unit 251 includes a compact display apparatus 252 constituted by liquid crystal, organic light-emitting diodes (OLEDs), or the like, and a display control unit 253 that performs a down conversion process for displaying video signals on the display apparatus 252. Accordingly, recorded content can be viewed using the portable video viewer 201.

The configuration of the portable video viewer 201 is based on the configuration of the mobile server 200 illustrated in FIG. 18. The configuration of the portable video viewer 201 may be realized by implementing software into a mobile terminal, such as the mobile information terminal 500.

Next, a description will be given of a mobile apparatus ID management table 162 for managing apparatus IDs and medium IDs in the recording server 100.

The mobile apparatus ID management table 162 includes an item indicating apparatus IDs or medium IDs, an item indicating whether or not each apparatus or medium is compatible with channel automatic transfer, an item indicating the capacity of the channel automatic recorded content transfer area 211, and an item indicating whether or not each apparatus or medium is compatible with automatic transfer in the individual recording area 112. With the mobile apparatus ID management table 162, a transfer process at the time of a synchronization process can be managed for each apparatus or medium.

Apparatus IDs and medium IDs may be described in two different items, instead of one item.

Figure 20:
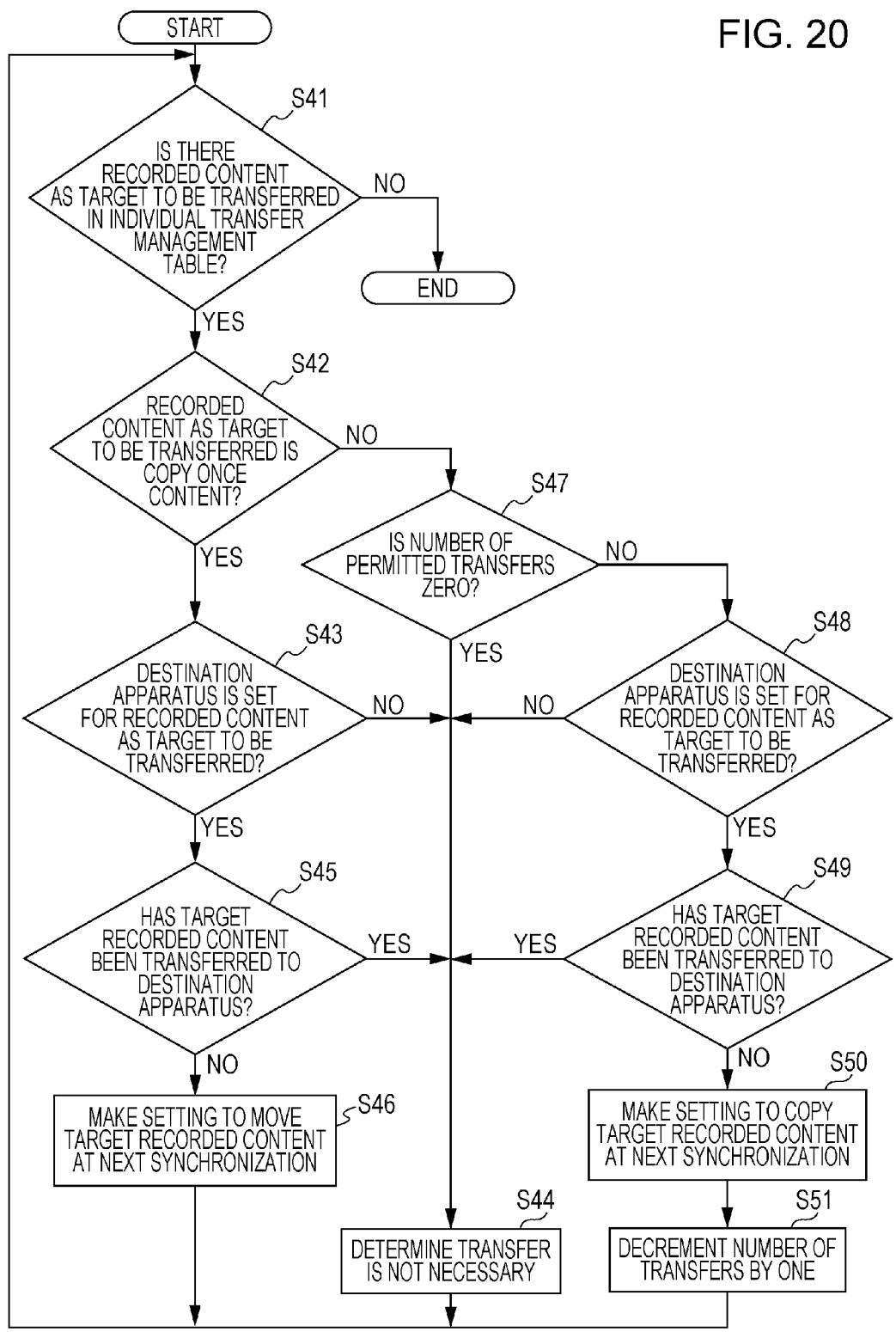
FIG. 20 is a flowchart illustrating a transfer process of transferring copyable recorded content or move-only recorded content in an individual recording area to an individual recorded content transfer area in the mobile server.

FIG. 20 is a flowchart illustrating a transfer process of transferring the copyable recorded content 302 or the move-only recorded content 312 in the individual recording area 112 to the individual recorded content transfer area 212 in the mobile server 200.

First, in step S41, the synchronization control unit 124 determines whether or not recorded content as a target to be transferred exists in an individual transfer management table 166.

FIG. 21 is a diagram illustrating an example of the individual transfer management table 166.

As illustrated in FIG. 21, the individual transfer management table 166 is constituted by a recorded content designation item for designating recorded content that can be a target to be transferred, an item for designating a destination of automatic transfer, an attribute information item indicating an attribute of recorded content, such as copy once content or dubbing-10 content, and an item for managing the number of permitted transfers.

The transfer process illustrated in the flowchart in FIG. 20 varies depending on attribute information. Specifically, in a case where recorded content is free broadcast content (dubbing-10 content), all the ten or less apparatuses managed by the recording server 100 can be an apparatus as a destination of automatic transfer. In a case where recorded content is paid broadcast content (dugging-1 content), the recorded content can be transferred only once, and thus one of the apparatuses can be a destination of automatic transfer, and it is necessary to specify one apparatus as a transfer destination. Further, paid broadcast content (copy once content), which can be transferred only once, enables designation of not transferring recorded content to any apparatus.

If it is determined that recorded content as a target to be transferred does not exist in the individual transfer management table 166 (NO in step S41), the process ends.

On the other hand, if it is determined that recorded content as a target to be transferred exists in the individual transfer management table 166 (YES in step S41), the synchronization control unit 124 determines in step S42 whether or not the recorded content as a target to be transferred is copy once content (move-only content) by using the information in the individual transfer management table 166.

If it is determined that the recorded content as a target to be transferred is copy once content (YES in step S42), the synchronization control unit 124 determines in step S43 whether or not a destination apparatus is set for the target recorded content. If it is determined that a destination apparatus is not set for the target recorded content (NO in step S43), the synchronization control unit 124 determines in step S44 that it is not necessary to transfer the target recorded content, and the process returns to step S41.

On the other hand, if it is determined that a destination apparatus is set for the target recorded content (YES in step S43), the synchronization control unit 124 determines in step S45 whether or not the target recorded content has been transferred to the destination apparatus. If it is determined that the target recorded content has been transferred to the destination apparatus (YES in step S45), the process proceeds to step S44.

On the other hand, if it is determined that the target recorded content has not been transferred to the destination apparatus (NO in step S45), the synchronization control unit 124 makes a setting in step S46 so that the target recorded content will be moved at the time of next synchronization, and the process returns to step S41.

On the other hand, if it is determined that the target recorded content is not copy once content, that is, the target recorded content is dubbing-10 content (NO in step S42), the synchronization control unit 124 determines in step S47 whether or not the number of permitted transfers of the target recorded content is zero. If it is determined that the number of permitted transfers is zero (YES in step S47), the process proceeds to step S44.

On the other hand, if it is determined that the number of permitted transfers is not zero (NO in step S47), the synchronization control unit 124 determines in step S48 whether or not a destination apparatus is set for the target recorded content. If it is determined that a destination apparatus is not set for the target recorded content (NO in step S48), the process proceeds to step S44.

On the other hand, if it is determined that a destination apparatus is set for the target recorded content (YES in step S48), the synchronization control unit 124 determines in step S49 whether or not the target recorded content has been transferred to the destination apparatus. If it is determined that the target recorded content has been transferred to the destination apparatus (YES in step S49), the process proceeds to step S44.

On the other hand, if it is determined that the target recorded content has not been transferred to the destination apparatus (NO in step S49), the synchronization control unit 124 makes a setting in step S50 so that the target recorded content will be copied at the time of next synchronization.

In step S51, the synchronization control unit 124 decrements the number of transfers of the target recorded content by one, and the process returns to step S41.

The individual transfer management table 166 illustrated in FIG. 21 may further include an image quality designation item for designating image quality of recording for each piece of content, and a size item indicating the size (capacity or playback time) of each piece of recorded content.

In a case where the image quality of content is DR image quality (broadcast image quality of MPEG 2), if the content is transcoded into compressed data of MPEG-4 AVC or the like to be viewed in a mobile apparatus at the time of a synchronization process, the time for transferring the content becomes very long, which is not practical, and thus the content may be transcoded before synchronization. At this time, a setting of creating compressed recorded content to be transferred by maintaining recorded content of DR image quality, and a setting of creating compressed recorded content to be transferred by deleting recorded content of DR image quality, is selectively made. Further, in a case where the recorded content of DR image quality is copy once content and a setting of maintaining the recorded content of DR image quality is made, it is necessary to make a setting so that the recorded content to be transferred cannot be played back.

The individual transfer management table 166 illustrated in FIG. 21 may further include an item indicating a status where a setting of transferring content to individual apparatuses or media is made. With this item, the recording server 100 is capable of managing a process of automatically transferring content to a plurality of apparatuses or media.

Figure 22:
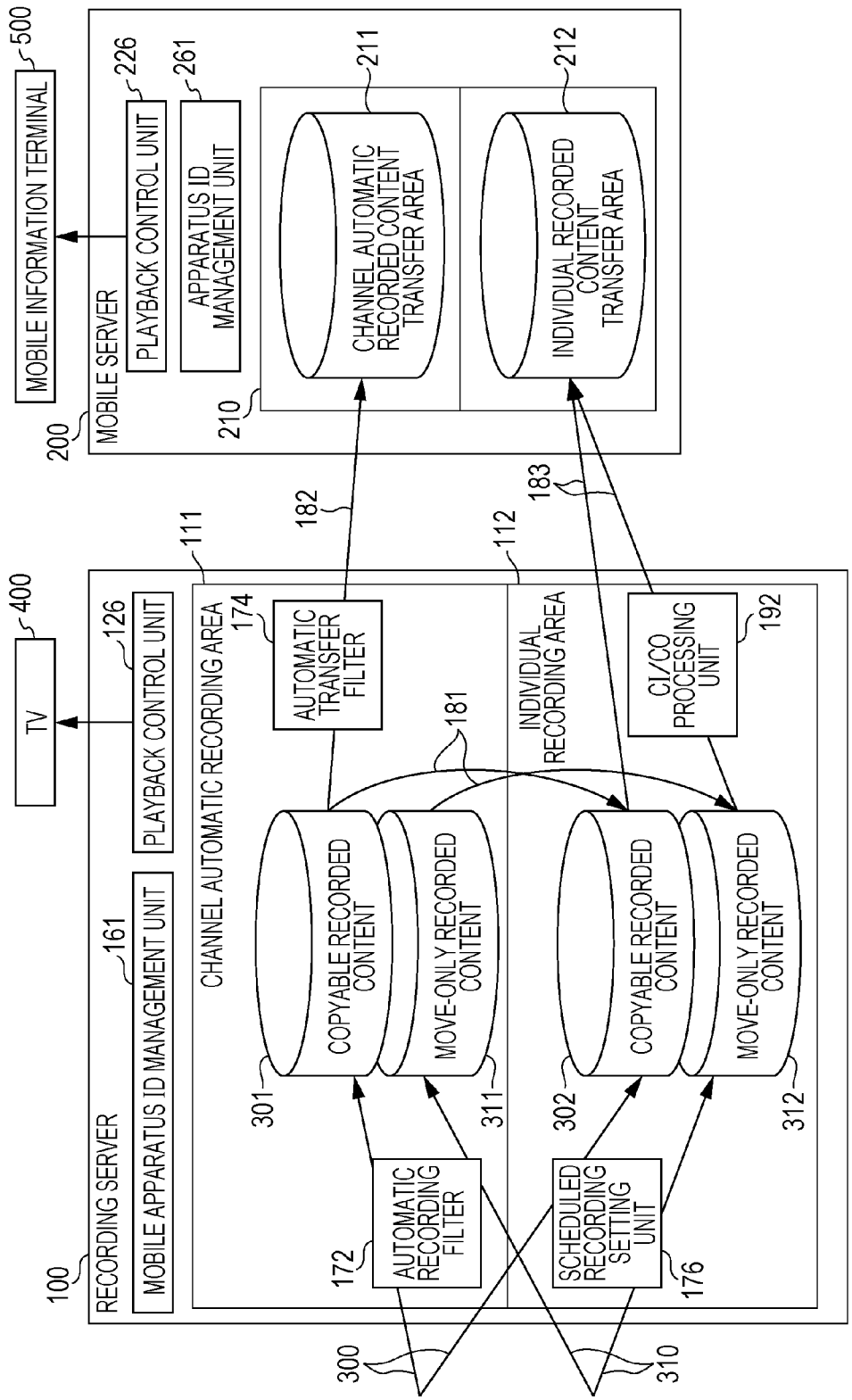
FIG. 22 is a diagram illustrating a second modification example of the flow of recorded content in the recording system according to the embodiment.

FIG. 22 is a diagram illustrating a second modification example of the flow of recorded content in the recording system according to the embodiment. The recording server 100 illustrated in FIG. 22 includes a check-in/check-out processing unit (CI/CO processing unit) 192 in addition to the components of the recording server 100 illustrated in FIG. 3.

In a case where the move-only recorded content 311 has been transferred to the mobile server 200, the recording server 100 needs to delete the original move-only recorded content 311 (so that the move-only recorded content 311 cannot be played back). Thus, in a case where the recorded content is deleted from the mobile server 200 after the recorded content has been transferred to the mobile server 200 and viewing of the content in the mobile server 200 has finished or suspended, the recorded content is reversely transferred from the mobile server 200 to the recording server 100 at the time of synchronization.

Actually, the CI/CO processing unit 192 may reversely transfer the recorded content. At the time of transferring the recorded content from the recording server 100 to the mobile server 200 (check-out), the CI/CO processing unit 192 may set the recorded content in the recording server 100 to be in a playback impossible state instead of deleting the recorded content. Also, when a synchronization process is performed again after the content has been deleted in the mobile server 200, the CI/CO processing unit 192 may set the recorded content in the recording server 100 in a playback impossible state to be in a playback possible state, so as to perform a check-in process.

Figure 23:
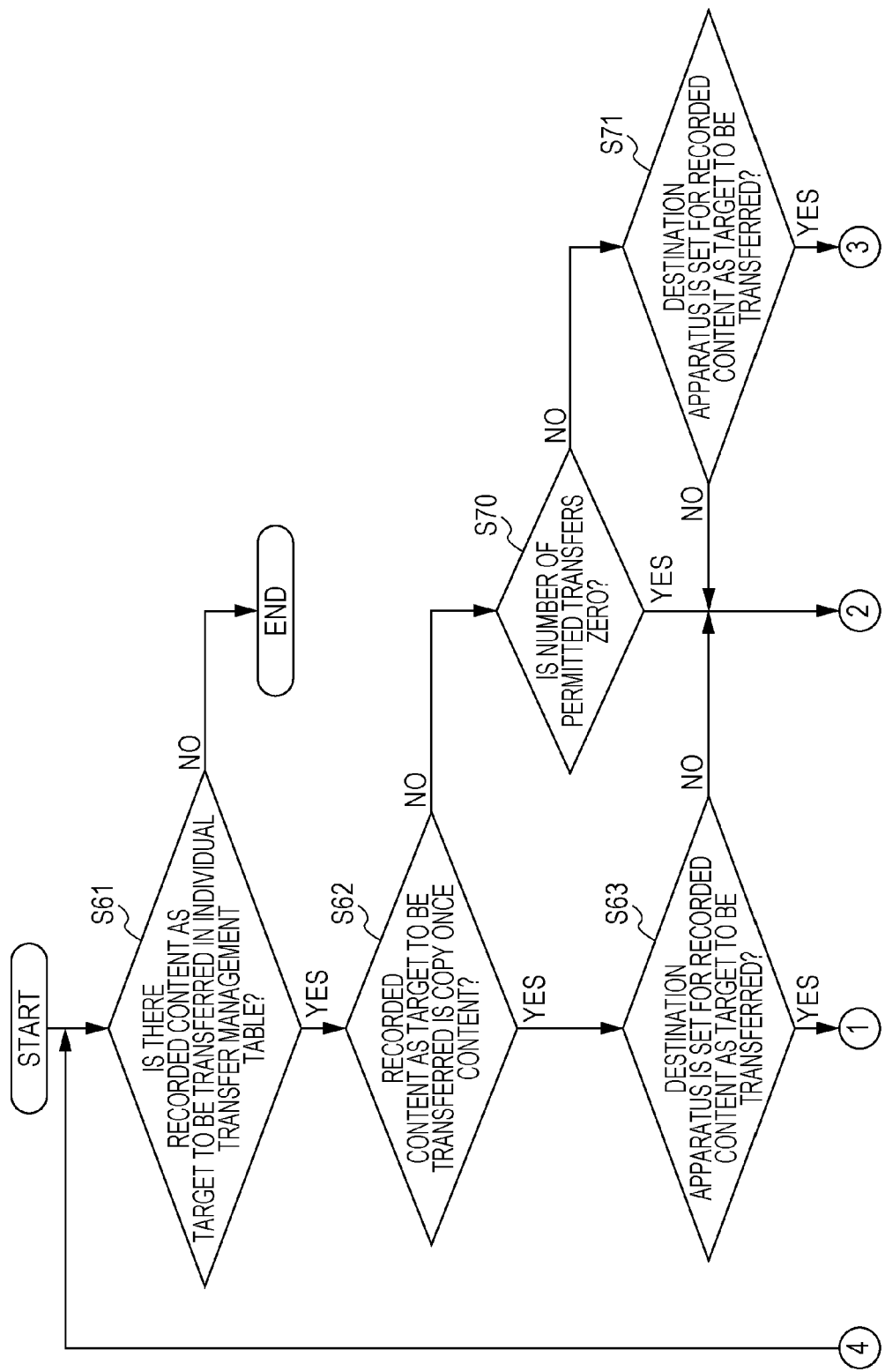
FIG. 23 is a first flowchart illustrating a modification example of a transfer process of transferring copyable recorded content or move-only recorded content in the individual recording area to the individual recorded content transfer area in the mobile server.
Figure 24:
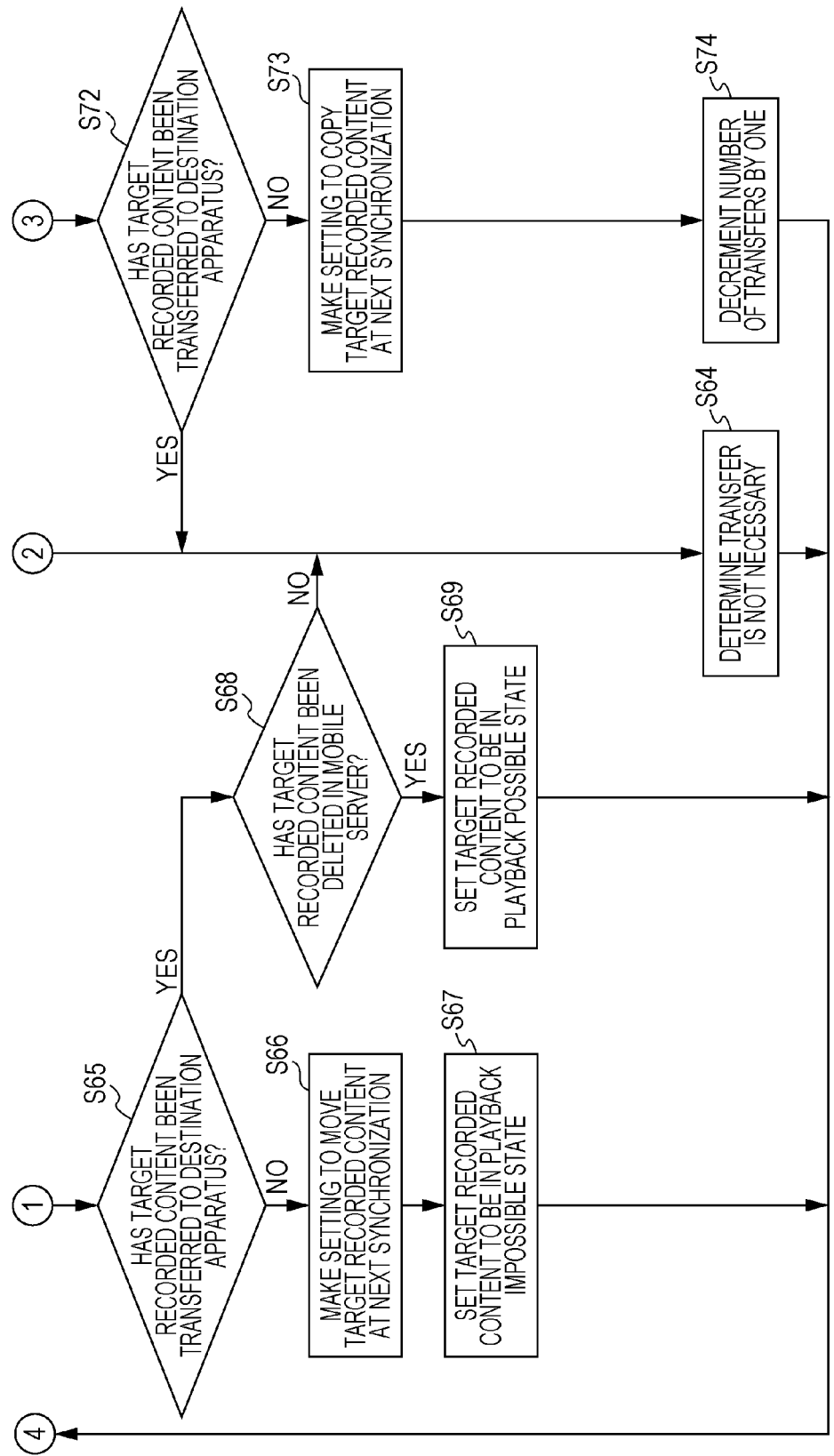
FIG. 24 is a second flowchart illustrating a modification example of a transfer process of transferring copyable recorded content or move-only recorded content in the individual recording area to the individual recorded content transfer area in the mobile server.

FIGS. 23 and 24 are flowcharts illustrating a modification example of the transfer process of transferring the copyable recorded content 302 or the move-only recorded content 312 in the individual recording area 112 to the individual recorded content transfer area 212 in the mobile server 200.

Steps S61 to S66 in FIG. 23 are the same as steps S41 to S46 in FIG. 20, and thus the description thereof is omitted.

In step S67, when transferring target recorded content from the recording server 100 to the mobile server 200 in a check-in/check-out process, the synchronization control unit 124 sets the target recorded content in the recording server 100 to be in a playback impossible state, instead of deleting the target recorded content in the recording server 100 (check-out process).

On the other hand, if it is determined in step S65 that the target recorded content has been transferred to the destination apparatus (YES in step S65), the synchronization control unit 124 determines in step S68 whether or not the target recorded content has been deleted in the mobile server 200. If it is determined that the target recorded content has not been deleted in the mobile server 200 (NO in step S68), the process proceeds to step S64.

On the other hand, if it is determined that the target recorded content has been deleted in the mobile server 200 (YES in step S68), the synchronization control unit 124 sets, in step S69, the target recorded content in the recording server 100 that is in a playback impossible state to be in a playback possible state (check-in process) when a synchronization process is performed again.

Steps S70 to S74 in FIG. 23 are the same as steps S47 to S51 in FIG. 20, and thus the description thereof is omitted.

Figure 25:
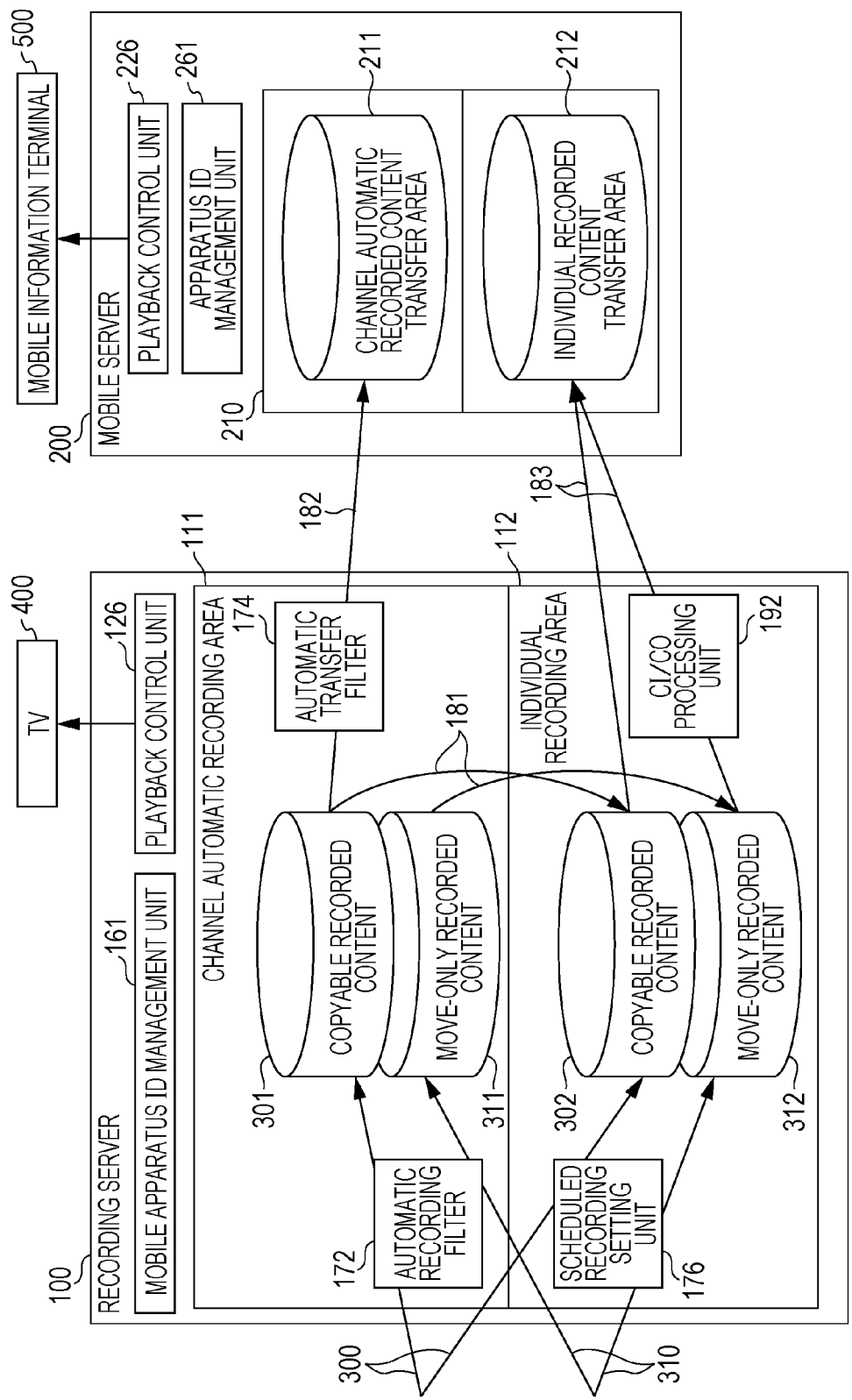
FIG. 25 is a diagram illustrating a third modification example of the flow of recorded content in the recording system according to the embodiment.

FIG. 25 is a diagram illustrating a third modification example of the flow of recorded content in the recording system according to the embodiment. In FIG. 25, the copyable recorded content 302 is also regarded as a target of the CI/CO processing unit 192 illustrated in FIG. 22, in addition to the move-only recorded content 312.

In this case, steps S75 to S76 (not illustrated) are added to the flowchart in FIG. 23 so as to additionally regard the copyable recorded content 302 as a target of a check-in/check-out process.

That is, if it is determined in step S62 that the recorded content as a target to be transferred is copy once content (content as a target of a check-in/check-out process) (YES in step S62), the synchronization control unit 124 determines in step S75 whether or not the number of permitted transfers of the target recorded content is one. If it is determined the number of permitted transfers of the target recorded content is not one (NO in step S75), the process proceeds to step S70.

On the other hand, if it is determined that the number of permitted transfers of the target recorded content is one (YES in step S75), the synchronization control unit 124 performs a setting in step S76 so as to move the target recorded content at the next synchronization. At this time, when transferring the target recorded content from the recording server 100 to the mobile server 200, the synchronization control unit 124 does not delete the target recorded content in the recording server 100, but sets the target recorded content to be in a playback impossible state (check-out process). Then, the synchronization control unit 124 sets the number of transfers to zero, and the process returns to step S61.

FIG. 26 is a diagram illustrating another example of the mobile apparatus ID management table.

The mobile apparatus ID management table illustrated in FIG. 26 additionally includes an individual recording check-in/check-out compatibility item of designating whether or not content is regarded as a target of a check-in/check-out process for each apparatus ID or medium ID.

Figure 27:
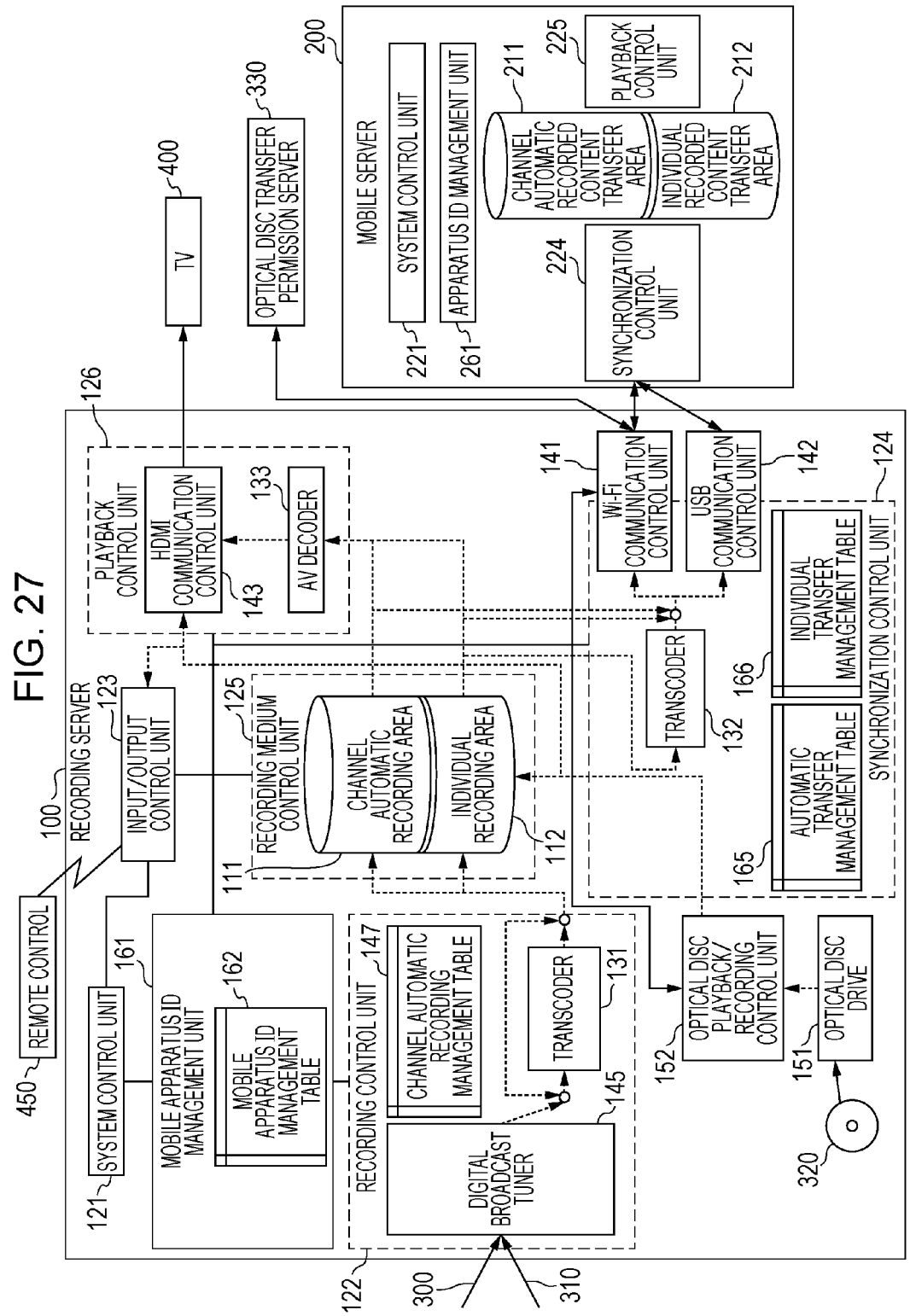
FIG. 27 is a diagram illustrating a first modification example of the basic configuration of the recording server according to the embodiment.

FIG. 27 is a diagram illustrating a first modification example of the basic configuration of the recording server 100 according to the embodiment.

The recording server 100 accesses, via a network, an optical disc transfer permission server 330 designated by information contained in an optical disc 320 that is played back by an optical disc drive 151. The recording server 100 acquires, from the optical disc transfer permission server 330, a transfer permission that permits a transfer of the optical disc content recorded on the optical disc 320 from the recording server 100 to the mobile server 200. When acquiring the transfer permission, the recording server 100 transfers (copies) the optical disc content to the individual recording area 112. This is the point that is different from the configuration of the recording server 100 illustrated in FIG. 7. The optical disc 320 is, for example, a Blu-ray® disc.

Copying of content recorded on a video package medium, such as an optical disc, is generally prohibited. However, in a case where a content right holder permits copying through a network server or the like on the basis of the specification of managed copy of AACS, a permitted number of copies can be created. Thus, if copying of the content in the optical disc is permitted and the content has been stored in the individual recording area 112, the content can be managed in the same manner as paid broadcast content (copy once content).

In this case, an optical disc playback/recording control unit 152 accesses, via a network, the optical disc transfer permission server 330 designated by the information contained in the optical disc 320 that is played back by the optical disc drive 151, and acquires, from the optical disc transfer permission server 330, a transfer permission that permits a transfer of the optical disc content recorded on the optical disc 320 from the recording server 100 to the mobile server 200. When acquiring the transfer permission, the optical disc playback/recording control unit 152 copies the optical disc content to the individual recording area 112.

In a case where the synchronization control unit 124 detects that the recording server 100 has become able to communicate with the mobile server 200 and the optical disc content that has been copied to the individual recording area 112 is designated by the user as a target to be automatically copied or moved, the synchronization control unit 124 automatically copies or moves the optical disc content to the mobile server 200.

Figure 28:
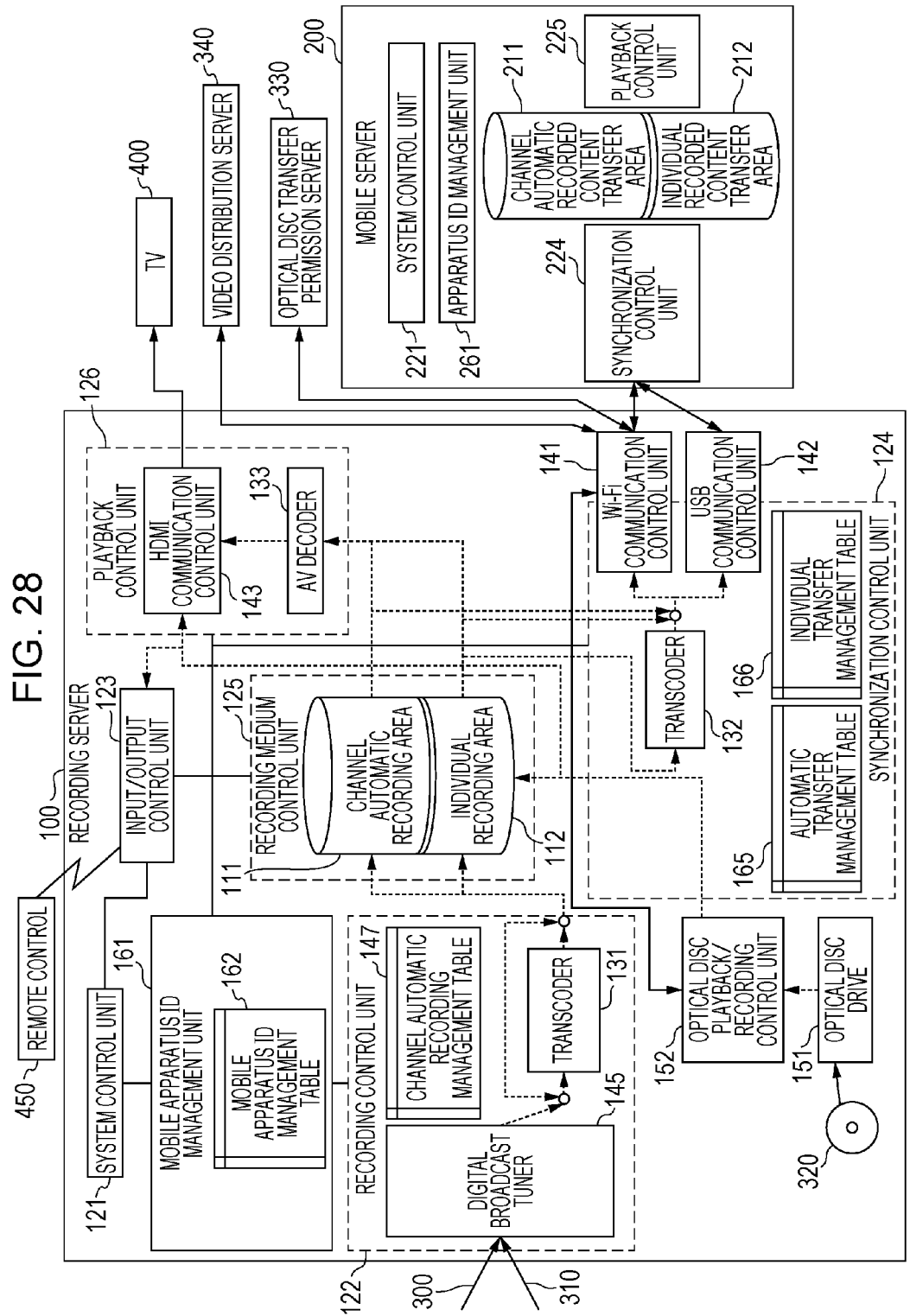
FIG. 28 is a diagram illustrating a second modification example of the basic configuration of the recording server according to the embodiment.

FIG. 28 is a diagram illustrating a second modification example of the basic configuration of the recording server 100 according to the embodiment.

The recording server 100 transfers content that has been purchased from a video distribution server 340 to the individual recording area 112. This is the point that is different from the configuration of the recording server 100 illustrated in FIG. 27.

The content that has been purchased through a video distribution service can also be managed in the same manner as paid broadcast content (copy once content) after being stored in the individual recording area 112, like the optical disc content for which permission has been acquired and which has been transferred to the individual recording area 112.

When the content is distributed from the video distribution server 340 or when copying of an optical disc is permitted, the content right holder can designate the number of copies. Thus, the recording server 100 can receive permission to perform copying a plurality of times. In this case, the number of copies needs to be managed as in the case of dubbing-10 content.

The synchronization control unit 124 downloads the content distributed by the video distribution server 340, and records the downloaded distributed content in the individual recording area 112.

Also, in a case where the synchronization control unit 124 detects that the recording server 100 has become able to communicate with the mobile server 200 and the distributed content recorded in the individual recording area 112 is designated by the user as a target to be automatically copied or moved, the synchronization control unit 124 automatically copies or moves the distributed content to the mobile server 200.

In FIG. 28, the recording system does not necessarily include the optical disc drive 151, the optical disc playback/recording control unit 152, and the optical disc transfer permission server 330.

The content from the optical disc 320 may be recorded as move-only optical disc content in the individual recording area 112, and the content purchased from the video distribution server 340 may be recorded as move-only distributed content in the individual recording area 112. The recorded move-only optical disc content or move-only distributed content may be subjected to a check-in/check-out process as a target of the CI/CO processing unit 192.

With this configuration, the recording server 100 is capable of managing recorded content by using two categories, free recorded content and paid recorded content (paid broadcast content, optical disc content, or distributed content). Also in terms of a user interface, an instruction to perform a transfer operation (transfer setting) can be provided only by being concerned about the number of copies, as in the situation where the number of copies is managed for dubbing-10 content.

In this case, in step S62 of the flowchart illustrated in FIG. 23, the synchronization control unit 124 determines whether the recorded content as a target to be transferred is optical disc content or distributed content, in addition to whether or not the recorded content as a target to be transferred is copy once content. Accordingly, a check-in/check-out process for optical disc content and distributed content can be realized by performing a process similar to that for copy once content.

The attribute information in the individual transfer management table 166 illustrated in FIG. 21 manages only copy once content and dugging-10 content. If optical disc content and distributed content are also managed, a check-in/check-out process can be realized.

The individual transfer management table 166 may further include an image quality designation item for designating image quality for recording for each piece of recorded content, and a size item indicating the size (capacity or playback time) of each piece of recorded content.

The individual transfer management table 166 may further include an item indicating a status in which a transfer setting is made for individual apparatuses or media.

Figure 29:
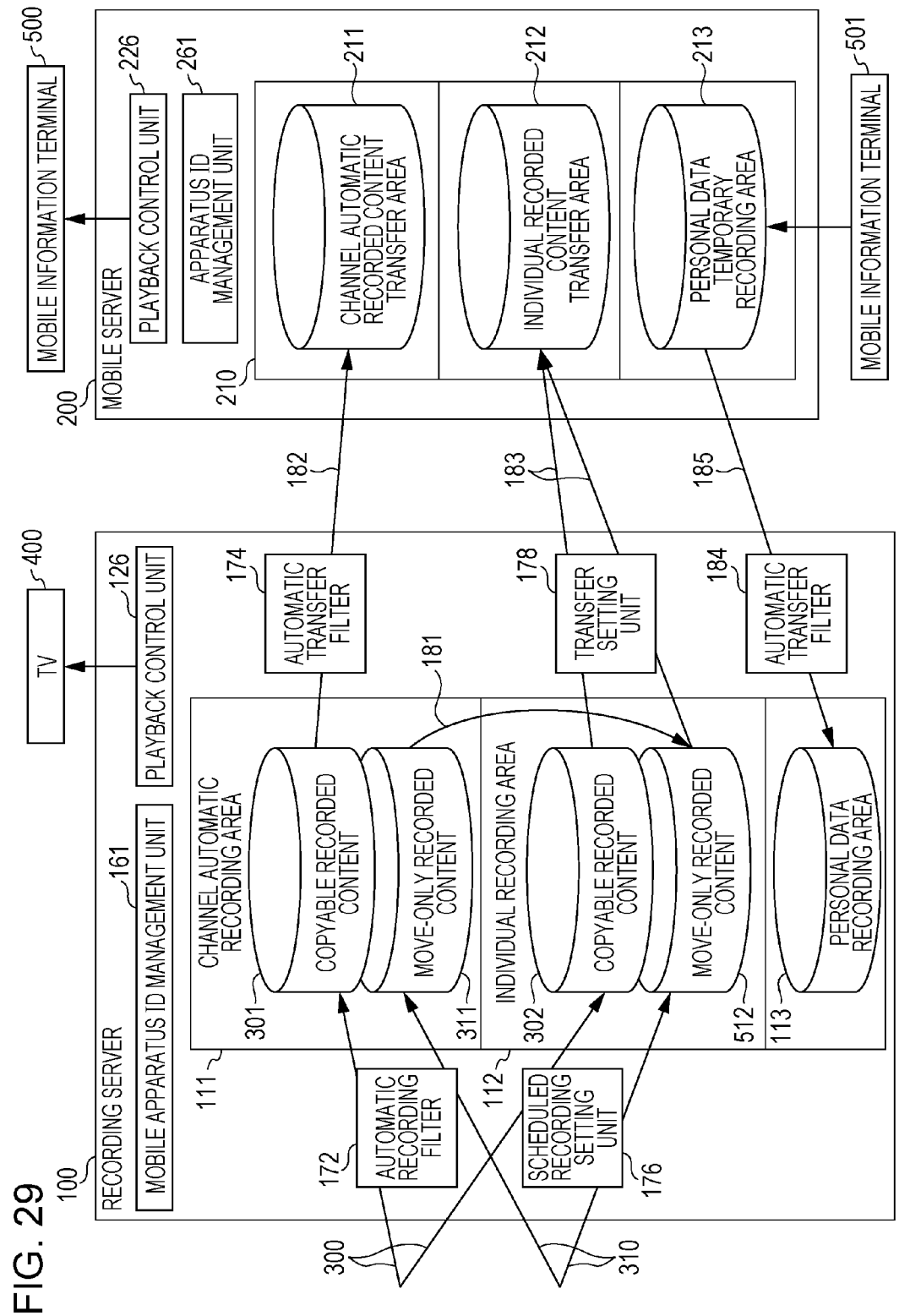
FIG. 29 is a diagram illustrating a fourth modification example of the flow of recorded content in the recording system according to the embodiment.

FIG. 29 is a diagram illustrating a fourth modification example of the flow of recorded content in the recording system according to the embodiment.

The recording server 100 further includes a personal data recording area 113 that stores personal data, such as still images, moving images, and music data. The mobile server 200 further includes a personal data temporary recording area 213 that temporarily stores personal data, such as still images or moving images captured by a mobile information terminal 501, such as a DSC, a video camera, or a smartphone. When a synchronization process is performed between the mobile server 200 and the recording server 100 (when the recording server 100 detects that the recording server 100 has become able to communicate with the mobile server 200), a transfer process 185 is performed in which the personal data in the personal data temporary recording area 213 in the mobile server 200 is transferred to the personal data recording area 113 in the recording server 100 by an automatic transfer unit 184 by using a method designated by the user.

The synchronization control unit 124 records the personal data, including still image data or moving image data captured by the user, in the personal data recording area 113 included in a recording medium.

The mobile server 200 has personal data recorded therein. When the synchronization control unit 124 detects that the recording server 100 has become able to communicate with the mobile server 200, the synchronization control unit 124 receives the personal data recorded in the mobile server 200 from the mobile server 200, and records the received personal data in the personal data recording area 113.

When the synchronization control unit 224 of the mobile server 200 performs a synchronization process for the recording server 100, the synchronization control unit 224 transfers the personal data that is temporarily recorded in the personal data temporary recording area 213 from the mobile server 200 to the recording server 100.

In a case where an available area does not exist in the personal data recording area 113 of the recording server 100 when the personal data is to be automatically transferred from the mobile server 200, the recording server 100 automatically reduces the capacity of the channel automatic recording area 111 of the recording server 100 so as to acquire a recording capacity of the personal data recording area 113. In this case, the recording server 100 includes a UI that enables the user to select in advance whether to shorten a recording period, for example, from 30 days to 29 days, or to increase the compression ratio of part of content or the entire content without shortening the recording period, in accordance with the acquisition of the area.

In a case where personal data, such as still image data or moving image data, is captured using a mobile information terminal such as a DSC or a smartphone, and a large capacity of a recording medium of the mobile information terminal is used to record the captured personal data, the personal data may be transferred to the mobile server 200 so that the user can capture images without concern for the recording capacity of the mobile information terminal. Normally, in the case of transferring personal data to the mobile server 200, the user needs to be concerned about and check the recording capacity of the mobile server 200. However, part of the content in the channel automatic recorded content transfer area 211 is deleted by using a method designated by the user in advance, such as a method of deleting pieces of content in the channel automatic recorded content transfer area 211 in order from the oldest piece, and an available area is produced. Accordingly, personal data can be transferred without concern for the capacity of the mobile server 200.

The recording server 100 may access, via a network, the optical disc transfer permission server 330 designated by the information contained in the optical disc 320 that is played back by the optical disc drive 151, and acquire, from the optical disc transfer permission server 330, a transfer permission that permits a transfer of the optical disc content recorded on the optical disc 320 from the recording server 100 to the mobile server 200. After that, the recording server 100 may transfer the optical disc content to the individual recording area 112.

Further, the mobile server 200 may include a USB communication control unit, a Wi-Fi communication control unit, and a transfer control unit. The USB communication control unit transfers personal data, such as photographs captured by a mobile information terminal such as a DSC or a smartphone, to the personal data temporary recording area 213 in the mobile server 200. The Wi-Fi communication control unit transfers personal data, such as photographs captured by the mobile information terminal such as a DSC or a smartphone, to the personal data temporary recording area 213 in the mobile server 200. The transfer control unit cooperates with the synchronization control unit 224 at the time of synchronization with the recording server 100, and causes the personal data in the personal data temporary recording area 213 to the personal data recording area 113 in the recording server 100.

Also, at the time of synchronizing with the mobile server 200, the recording server 100 may record new personal data transferred from the mobile server 200 in the personal data recording area 113, and also may automatically transfer the new personal data to a personal data area in a personal data storage cloud server. The personal data storage cloud server is connected to the recording server 100 via a network so as to be capable of communicating with the recording server 100, and includes the personal data area.

The recording server 100 may access, via a network, the optical disc transfer permission server 330 designated by the information contained in the optical disc 320 that is played back by the optical disc drive 151, and acquire, from the optical disc transfer permission server 330, a transfer permission that permits a transfer of the optical disc content recorded on the optical disc 320 from the recording server 100 to the mobile server 200. After that, the recording server 100 may transfer the optical disc content to the individual recording area 112. Further, the recording server 100 may transfer distributed content purchased from the video distribution server 340 to the individual recording area 112.

Further, the recording server 100 may include, instead of the personal data recording area 113, an automatic cloud transfer unit that automatically transfers personal data received from the mobile server 200 to the personal data area in the personal data storage cloud server.

The recording server 100 may access, via a network, the optical disc transfer permission server 330 designated by the information contained in the optical disc 320 that is played back by the optical disc drive 151, and acquire, from the optical disc transfer permission server 330, a transfer permission that permits a transfer of the optical disc content recorded on the optical disc 320 from the recording server 100 to the mobile server 200. After that, the recording server 100 may transfer the optical disc content to the individual recording area 112. Further, the recording server 100 may transfer distributed content purchased from the video distribution server 340 to the individual recording area 112.

The recording server 100 may include a user/apparatus ID management unit, instead of the mobile apparatus ID management unit 161. In addition to the management of recorded content using apparatus IDs and medium IDs, the concept of users is introduced. Accordingly, the recorded content in the individual recording area 112 can be managed for individuals, though the channel automatic recording area 111 is an area that is used by a plurality of users in common. Thus, recorded content libraries can be created for individual users in the individual recording area 112. As a result of associating the individual recording area 112 of a specific user with the mobile server 200 of the specific user, synchronization processes satisfying the needs of individual users can be realized.

The user/apparatus ID management unit may include a user/apparatus ID management table, so as to manage apparatuses for individual users.

With the introduction of the concept of users, apparatuses and media can be managed for individual users, and a situation can be prevented from occurring where someone's content is synchronized with another's apparatus or medium.

FIG. 30 is a diagram illustrating an example of a user/apparatus ID management table in a case where each user has one mobile server, and FIG. 31 is a diagram illustrating an example of a user/apparatus ID management table in a case where each user has a plurality of mobile servers.

As illustrated in FIGS. 30 and 31, each user ID is recorded in association with an apparatus ID or a medium ID in the user/apparatus ID management table.

The recording server 100 may include automatic transfer management tables for individual users.

The configuration of the automatic transfer management table for each user is the same as the configuration of the automatic transfer management table for each apparatus.

FIG. 32 is a diagram illustrating an example of an individual transfer management table for each user.

The recording server 100 may include individual transfer management tables for individual users.

The configuration of the individual transfer management table for each user is the same as the configuration of the individual transfer management table for each apparatus. Regarding copy once content, exclusive control may be performed for each user.

Further, the recording server 100 may include a user/apparatus ID management unit. The individual recording area 112 of the recording server 100 may have move-only optical disc content of each user and move-only distributed content for each user recorded therein. The individual recording area 112 is assigned for each user, and optical disc content or distributed content is managed for each user.

Accordingly, the privacy of purchased optical disc content or distributed content is protected.

Further, the recording server 100 may include a user/apparatus ID management unit. The individual recording area 112 of the recording server 100 may include personal data recording areas for individual users. Personal data is managed for each user. Accordingly, the privacy of personal data such as captured still images or moving images is protected.

Further, at the time of synchronizing with the mobile server 200, the recording server 100 may record new personal data transferred from the mobile server 200 in the personal data recording area 113 for each user, and may automatically transfer the new personal data to the personal data area in the personal data storage cloud server. At this time, the personal data area in the personal data storage cloud server manages personal data for each user. Since personal data can be managed for each user, and a cloud service is usually operated based on individual management, the recording server 100 is more likely to cooperate with a cloud service. Accordingly, personal data, such as captured sill images or moving images, can be easily transferred by using a cloud service.

Further, the user/apparatus ID management tables illustrated in FIGS. 30 and 31 may further include an item of managing cloud access information used to cooperate with a cloud server (the name and uniform resource locator (URL) of the cloud service, an ID used in the cloud service, or a password used in the cloud service).

With such cloud access information being managed, in a case where synchronization with an apparatus of a specific user is achieved, personal data can be transferred to a cloud service of the user by automatically cooperating with the cloud service of the user. Accordingly, more convenient cooperation between an apparatus and a cloud service can be realized.

Further, the recording server 100 may record cloud access information for each user in a recording medium. Accordingly, when an apparatus of a specific user synchronizes with the recording server 100, the cloud service of the user can be automatically specified, and the personal data in the mobile server 200 can be transferred to the personal content storage cloud server by using the cloud access information.

Further, the mobile server 200 may record cloud synchronization management information in a recording medium. The cloud synchronization management information includes apparatus IDs and cloud access information in association with each other. Accordingly, when an apparatus synchronizes with the recording server 100, the cloud service of the user who owns the apparatus can be automatically specified, and the personal data in the mobile server 200 can be transferred to the personal content storage cloud server by using the cloud synchronization management information.

Further, when an apparatus synchronizes with a certain recording server, the apparatus can access the cloud server of a target cloud service and transfer personal data. Only in a case where the apparatus ID of a mobile server is registered in the recording server, the mobile server may transfer the personal data to the recording server.

The cloud synchronization management information may include a user ID, an apparatus ID, and cloud access information in association with one another. At this time, only in a case where the mobile server synchronizes with a recording server in which a valid user ID is stored, the mobile server can access the cloud server of the target cloud service and transfer personal data. In a case where a personal data area of the user is acquired in the recording server and the user ID and apparatus ID are recorded, the personal data can also be transferred to the recording server.

The above-described specific embodiment mainly includes the disclosure having the following configuration.

A content recording method according to an aspect of the present disclosure is a content recording method for a recording apparatus. The content recording method includes an automatic recording control step of automatically recording, with the recording apparatus, a first plurality of pieces of content in a channel automatic recording area included in a recording medium, each of the first plurality of pieces of content being broadcast through a channel in a time slot, the channel and the time slot being designated by a user; a deletion step of instructing, with the recording apparatus, a mobile apparatus to delete a first piece of content that has previously been copied or moved from the channel automatic recording area to the mobile apparatus when the recording apparatus detects that the recording apparatus has become able to communicate with the mobile apparatus; and a content transfer step of copying or moving, with the recording apparatus, a second piece of content included in the first plurality of pieces of content to the mobile apparatus when the recording apparatus detects that the recording apparatus has become able to communicate with the mobile apparatus.

With this configuration, a piece of content broadcast through a channel designated by a user in a time slot designated by the user is automatically recorded in the channel automatic recording area included in the recording medium. When it is detected that the recording apparatus has become able to communicate with the mobile apparatus, which is connected to the recording apparatus so as to be able to communicate therewith, a piece of content that has previously been copied or moved from the channel automatic recording area to the mobile apparatus is deleted from the mobile apparatus. When it is detected that the recording apparatus has become able to communicate with the mobile apparatus, a piece of content recorded in the channel automatic recording area is copied or moved to the mobile apparatus.

Accordingly, when it is detected that the recording apparatus has become able to communicate with the mobile apparatus, a piece of content that has previously been copied or moved from the channel automatic recording area to the mobile apparatus is deleted from the mobile apparatus. Thus, an unnecessary piece of content recorded in the mobile apparatus can be automatically deleted, and user convenience can be enhanced.

In the foregoing content recording method, the first piece of content may be a piece of content for which a transfer period has expired, the transfer period being a period in which the piece of content is transferred from the channel automatic recording area to the mobile apparatus.

With this configuration, when it is detected that the recording apparatus has become able to communicate with the mobile apparatus, a piece of content for which a transfer period has expired among pieces of content transferred from the channel automatic recording area to the mobile apparatus is deleted from the mobile apparatus. The transfer period is a period in which the piece of content is transferred from the channel automatic recording area to the mobile apparatus.

Accordingly, a period in which a piece of content remains in the mobile apparatus is no longer than the transfer period, and thus the recording capacity of the mobile apparatus can be kept constant.

In the foregoing content recording method, in a case where, when the recording apparatus detects that the recording apparatus has become able to communicate with the mobile apparatus, the number of days that have elapsed since last detection where the recording apparatus last detects that the recording apparatus has become able to communicate with the mobile apparatus is smaller than a designated number of days designated by the user, the content transfer step may copy or move a third piece of content to the mobile apparatus regardless of the designated number of days, the third piece of content being recorded in the channel automatic recording area after the last detection, and the first plurality of pieces of content may include the third piece of content.

With this configuration, in a case where, when it is detected that the recording apparatus has become able to communicate with the mobile apparatus, the number of days that have elapsed since last detection where the recording apparatus last detects that the recording apparatus has become able to communicate with the mobile apparatus is smaller than a designated number of days designated by the user, a piece of content recorded in the channel automatic recording area after the last detection is copied or moved to the mobile apparatus regardless of the designated number of days.

Accordingly, the latest piece of content recorded in the channel automatic recording area can be recorded in the mobile apparatus.

In the foregoing content recording method, the mobile apparatus may hold a second plurality of pieces of content that have previously been copied or moved from the channel automatic recording area to the mobile apparatus, the second plurality of pieces of content may include the first piece of content, and the first piece of content may be a piece of content whose broadcast time is the earliest among the second plurality of pieces of content.

With this configuration, among pieces of content recorded in the mobile apparatus, a piece of content whose broadcast time is the earliest is deleted from the mobile apparatus. Thus, a piece of content that has already been viewed or a piece of content that will not be viewed any more can be deleted.

In the foregoing content recording method, the second piece of content may be a piece of content of a channel and a time slot which have been designated by the user.

With this configuration, when it is detected that the recording apparatus has become able to communicate with the mobile apparatus, a piece of content of a channel and a time slot which have been designated by the user among pieces of content recorded in the channel automatic recording area is copied or moved to the mobile apparatus.

Accordingly, not all the pieces of content recorded in the channel automatic recording area are copied or moved to the mobile apparatus, but a piece of content of a channel and a time slot designated by the user is copied or moved to the mobile apparatus. Thus, only the pieces of content necessary for the user can be recorded in the mobile apparatus, and the recording capacity of the mobile apparatus can be saved.

In the foregoing content recording method, the second piece of content may correspond to a genre designated by the user.

With this configuration, when it is detected that the recording apparatus has become able to communicate with the mobile apparatus, a piece of content corresponding to a genre designated by the user among pieces of content recorded in the channel automatic recording area is copied or moved to the mobile apparatus. Accordingly, only the pieces of content necessary for the user can be recorded in the mobile apparatus, and the recording capacity of the mobile apparatus can be saved.

In the foregoing content recording method, the second piece of content may be selected based on a viewing history of the user.

With this configuration, when it is detected that the recording apparatus has become able to communicate with the mobile apparatus, a piece of content to be copied or moved to the mobile apparatus is selected from among pieces of content recorded in the channel automatic recording area on the basis of a viewing history of the user, and the selected piece of content is copied or moved to the mobile apparatus. Accordingly, only the pieces of content corresponding to the viewing history of the user can be recorded in the mobile apparatus, and the recording capacity of the mobile apparatus can be saved.

The foregoing content recording method may further include an individual recording control step of accepting, with the recording apparatus, a setting of scheduled recording for at least one piece of content individually designated by the user, recording, with the recording apparatus, the at least one individually designated piece of content in an individual recording area included in the recording medium, and deleting, with the recording apparatus, a piece of content designated by the user among the at least one piece of content recorded in the individual recording area.

With this configuration, scheduled recording of at least one piece of content individually designated by the user is set, the at least one piece of content is recorded in the individual recording area included in the recording medium, and a piece of content designated by the user among the at least one piece of content recorded in the individual recording area is deleted.

Accordingly, a piece of content that is recorded in the individual recording area and individually set by the user is deleted when it is designated by the user. Thus, a situation can be prevented from occurring where a piece of content is automatically deleted although the user has not yet viewed the piece of content.

The foregoing content recording method may further include a transfer permission acquisition step of accessing via a network, with the recording apparatus, a content transfer permission server designated by information contained in an optical disc that is played back by an optical disc drive, acquiring, with the recording apparatus, optical disc content recorded on the optical disc, and acquiring, with the recording apparatus, a transfer permission from the content transfer permission server, the transfer permission permitting a transfer of the acquired optical disc content from the recording apparatus to the mobile apparatus; an optical disc content recording step of copying, with the recording apparatus, the optical disc content to the individual recording area when the transfer permission is acquired; and an optical disc content transfer step of automatically copying or moving, with the recording apparatus, the optical disc content to the mobile apparatus in a case where the recording apparatus detects that the recording apparatus has become able to communicate with the mobile apparatus and the optical disc content that has been copied to the individual recording area is designated by the user as a target to be automatically copied or moved.

With this configuration, the content transfer permission server designated by information contained in the optical disc that is played back by the optical disc drive is accessed via a network, and a transfer permission permitting a transfer of the optical disc content recorded on the optical disc from the recording apparatus to the mobile apparatus is acquired from the content transfer permission server. When the transfer permission is acquired, the optical disc content is copied to the individual recording area. In a case where it is detected that the recording apparatus has become able to communicate with the mobile apparatus and the optical disc content that has been copied to the individual recording area is designated by the user as a target to be automatically copied or moved, the optical disc content is automatically copied or moved to the mobile apparatus.

Accordingly, as a result of acquiring a permission from the content transfer permission server, a piece of content recorded on the optical disc can be automatically copied or moved to the mobile apparatus. This eliminates the necessity of a user's operation for acquiring a permission, and user convenience can be enhanced.

The foregoing content recording method may further include a distributed content recording step of downloading, with the recording apparatus, distributed content that is distributed by a video distribution server, and recording, with the recording apparatus, the downloaded distributed content in the individual recording area; and a distributed content transfer step of automatically copying or moving, with the recording apparatus, the distributed content to the mobile apparatus in a case where the recording apparatus detects that the recording apparatus has become able to communicate with the mobile apparatus and the distributed content that has been recorded in the individual recording area is designated by the user as a target to be automatically copied or moved.

With this configuration, distributed content distributed by the video distribution server is downloaded, and the downloaded distributed content is recorded in the individual recording area. In a case where it is detected that the recording apparatus has become able to communicate with the mobile apparatus and the distributed content that has been recorded in the individual recording area is designated by the user as a target to be automatically copied or moved, the distributed content is automatically copied or moved to the mobile apparatus.

Accordingly, the distributed content downloaded from the video distribution server can be automatically copied or moved to the mobile apparatus. This eliminates the necessity of a user's operation for transferring the distributed content, and user convenience can be enhanced.

The foregoing content recording method may further include a personal data recording step of recording, with the recording apparatus, personal data including still image data or moving image data captured by the user in a personal data area included in the recording medium.

With this configuration, personal data including still image data or moving image data captured by the user is recorded in the personal data area included in the recording medium, and thus the personal data including still image data or moving image data captured by the user can be stored.

In the foregoing content recording method, the mobile apparatus may have the personal data recorded therein, and, when the recording apparatus detects that the recording apparatus has become able to communicate with the mobile apparatus, the personal data recording step may receive the personal data recorded in the mobile apparatus from the mobile apparatus and record the received personal data in the personal data area.

With this configuration, the mobile apparatus has personal data recorded therein. When it is detected that the recording apparatus has become able to communicate with the mobile apparatus, the personal data recorded in the mobile apparatus is received from the mobile apparatus, and the received personal data is recorded in the personal data area.

Accordingly, the personal data recorded in the mobile apparatus is recorded in the personal data area, and thus the recording capacity of the mobile apparatus can be saved.

A recording apparatus according to another aspect of the present disclosure includes an automatic recording control unit and a synchronization control unit. The automatic recording control unit automatically records a first plurality of pieces of content in a channel automatic recording area included in a recording medium, each of the first plurality of pieces of content being broadcast through a channel in a time slot, the channel and the time slot being designated by a user. The synchronization control unit instructs a mobile apparatus to delete a first piece of content that has previously been copied or moved from the channel automatic recording area to the mobile apparatus, and copies or moves a second piece of content included in the first plurality of pieces of content to the mobile apparatus, when the recording apparatus detects that the recording apparatus has become able to communicate with the mobile apparatus.

With this configuration, a piece of content broadcast through a channel designated by a user in a time slot designated by the user is automatically recorded in the channel automatic recording area included in the recording medium. When it is detected that the recording apparatus has become able to communicate with the mobile apparatus, which is connected to the recording apparatus so as to be able to communicate therewith, a piece of content that has previously been copied or moved from the channel automatic recording area to the mobile apparatus is deleted from the mobile apparatus. When it is detected that the recording apparatus has become able to communicate with the mobile apparatus, a piece of content recorded in the channel automatic recording area is copied or moved to the mobile apparatus.

Accordingly, when it is detected that the recording apparatus has become able to communicate with the mobile apparatus, a piece of content that has previously been copied or moved from the channel automatic recording area to the mobile apparatus is deleted from the mobile apparatus. Thus, an unnecessary piece of content recorded in the mobile apparatus can be automatically deleted, and user convenience can be enhanced.

A recording system according to another aspect of the present disclosure includes a recording apparatus and a mobile apparatus connected to the recording apparatus such that the mobile apparatus is able to communicate with the recording apparatus. The recording apparatus includes an automatic recording control unit and a first synchronization control unit. The automatic recording control unit automatically records a first plurality of pieces of content in a channel automatic recording area included in a recording medium, each of the first plurality of pieces of content being broadcast through a channel in a time slot, the channel and the time slot being designated by a user. The first synchronization control unit instructs the mobile apparatus to delete a first piece of content that has previously been copied or moved from the channel automatic recording area to the mobile apparatus, and copies or moves a second piece of content included in the first plurality of pieces of content to the mobile apparatus, when the recording apparatus detects that the recording apparatus has become able to communicate with the mobile apparatus. The mobile apparatus includes a second synchronization control unit that records the second piece of content that has been copied or moved in a recording medium and deletes the first piece of content in accordance with the instruction to delete the first piece of content.

With this configuration, in the recording apparatus, a piece of content broadcast through a channel designated by a user in a time slot designated by the user is automatically recorded in the channel automatic recording area included in the recording medium. When it is detected that the recording apparatus has become able to communicate with the mobile apparatus, a piece of content that has previously been copied or moved from the channel automatic recording area to the mobile apparatus is deleted from the mobile apparatus. When it is detected that the recording apparatus has become able to communicate with the mobile apparatus, a piece of content recorded in the channel automatic recording area is copied or moved to the mobile apparatus. In the mobile apparatus, the piece of content that has been copied or moved by the recording apparatus is recorded in the recording medium, and the piece of content that has previously been copied or moved is deleted from the recording apparatus. The piece of content recorded in the recording medium is transmitted to a display apparatus and is played back.

Accordingly, when it is detected that the recording apparatus has become able to communicate with the mobile apparatus, a piece of content that has previously been copied or moved from the channel automatic recording area to the mobile apparatus is deleted from the mobile apparatus. Thus, an unnecessary piece of content recorded in the mobile apparatus can be automatically deleted, and user convenience can be enhanced.

The content recording method, recording apparatus, and recording system according to the present disclosure are capable of enhancing user convenience, and are useful as a content recording method for a recording apparatus that records content in a recording medium, a recording apparatus, and a recording system.

What is claimed is:

1. A content recording method for a recording apparatus, the content recording method comprising:
   an automatic recording control step of automatically recording, with the recording apparatus, a first plurality of pieces of content in a channel automatic recording area included in a recording medium, each of the first plurality of pieces of content being broadcast through a channel in a time slot, the channel and the time slot being designated by a user;
   a deletion step of instructing, with the recording apparatus, a mobile apparatus to delete a first piece of content that has previously been copied or moved from the channel automatic recording area to the mobile apparatus when the recording apparatus detects that the recording apparatus has become able to communicate with the mobile apparatus; and
   a content transfer step of copying or moving, with the recording apparatus, a second piece of content included in the first plurality of pieces of content to the mobile apparatus when the recording apparatus detects that the recording apparatus has become able to communicate with the mobile apparatus, the content transfer step being bypassed if, in the deletion step, the first piece of content does not exist in the mobile apparatus and an area available for recording the second piece of content does not exist in the mobile apparatus.

2. The content recording method according to claim 1, wherein the first piece of content is a piece of content for which a transfer period has expired, the transfer period being a period when the piece of content is able to be transferred from the channel automatic recording area to the mobile apparatus.

3. The content recording method according to claim 1, wherein
   the mobile apparatus holds a second plurality of pieces of content that have previously been copied or moved from the channel automatic recording area to the mobile apparatus,
   the second plurality of pieces of content include the first piece of content, and
   the first piece of content is a piece of content whose broadcast time is the earliest among the second plurality of pieces of content.

4. The content recording method according to claim 1, wherein the second piece of content is a piece of content of a channel and a time slot which have been designated by the user.

5. The content recording method according to claim 1, wherein the second piece of content corresponds to a genre designated by the user.

6. The content recording method according to claim 1, wherein the second piece of content is selected based on a viewing history of the user.

7. The content recording method according to claim 1, further comprising:
   an individual recording control step of accepting, with the recording apparatus, a setting of scheduled recording for at least one piece of content individually designated by the user, recording, with the recording apparatus, the at least one individually designated piece of content in an individual recording area included in the recording medium, and deleting, with the recording apparatus, a piece of content designated by the user among the at least one piece of content recorded in the individual recording area.

8. The content recording method according to claim 7, further comprising:
   a distributed content recording step of downloading, with the recording apparatus, distributed content that is distributed by a video distribution server, and recording, with the recording apparatus, the downloaded distributed content in the individual recording area; and
   a distributed content transfer step of automatically copying or moving, with the recording apparatus, the distributed content to the mobile apparatus in a case where the recording apparatus detects that the recording apparatus has become able to communicate with the mobile apparatus and the distributed content that has been recorded in the individual recording area is designated by the user as a target to be automatically copied or moved.

9. The content recording method according to claim 8, further comprising:
   a personal data recording step of recording, with the recording apparatus, personal data including still image data or moving image data captured by the user in a personal data area included in the recording medium.

10. The content recording method according to claim 9, wherein
- the mobile apparatus has the personal data recorded therein, and
- when the recording apparatus detects that the recording apparatus has become able to communicate with the mobile apparatus, the personal data recording step receives the personal data recorded in the mobile apparatus from the mobile apparatus and records the received personal data in the personal data area.

11. A content recording method for a recording apparatus, the content recording method comprising:
- an automatic recording control step of automatically recording, with the recording apparatus, a first plurality of pieces of content in a channel automatic recording area included in a recording medium, each of the first plurality of pieces of content being broadcast through a channel in a time slot, the channel and the time slot being designated by a user;
- a deletion step of instructing, with the recording apparatus, a mobile apparatus to delete a first piece of content that has previously been copied or moved from the channel automatic recording area to the mobile apparatus when the recording apparatus detects that the recording apparatus has become able to communicate with the mobile apparatus; and
- a content transfer step of copying or moving, with the recording apparatus, a second piece of content included in the first plurality of pieces of content to the mobile apparatus when the recording apparatus detects that the recording apparatus has become able to communicate with the mobile apparatus,
- wherein the first piece of content is a piece of content for which a transfer period has expired, the transfer period being a period when the piece of content is able to be transferred from the channel automatic recording area to the mobile apparatus,
- in a case where, when the recording apparatus detects that the recording apparatus has become able to communicate with the mobile apparatus, a number of days that have elapsed since last detection where the recording apparatus last detects that the recording apparatus has become able to communicate with the mobile apparatus is smaller than a designated number of days designated by the user, the content transfer step copies or moves a third piece of content to the mobile apparatus regardless of the designated number of days, the third piece of content being recorded in the channel automatic recording area after the last detection, and
- the first plurality of pieces of content include the third piece of content.

12. A content recording method for a recording apparatus, the content recording method comprising:
- an automatic recording control step of automatically recording, with the recording apparatus, a first plurality of pieces of content in a channel automatic recording area included in a recording medium, each of the first plurality of pieces of content being broadcast through a channel in a time slot, the channel and the time slot being designated by a user;
- a deletion step of instructing, with the recording apparatus, a mobile apparatus to delete a first piece of content that has previously been copied or moved from the channel automatic recording area to the mobile apparatus when the recording apparatus detects that the recording apparatus has become able to communicate with the mobile apparatus;
- a content transfer step of copying or moving, with the recording apparatus, a second piece of content included in the first plurality of pieces of content to the mobile apparatus when the recording apparatus detects that the recording apparatus has become able to communicate with the mobile apparatus;
- an individual recording control step of accepting, with the recording apparatus, a setting of scheduled recording for at least one piece of content individually designated by the user, recording, with the recording apparatus, the at least one individually designated piece of content in an individual recording area included in the recording medium, and deleting, with the recording apparatus, a piece of content designated by the user among the at least one piece of content recorded in the individual recording area;
- a transfer permission acquisition step of accessing via a network, with the recording apparatus, a content transfer permission server designated by information contained in an optical disc that is played back by an optical disc drive, acquiring, with the recording apparatus, optical disc content recorded on the optical disc, and acquiring, with the recording apparatus, a transfer permission from the content transfer permission server, the transfer permission permitting a transfer of the acquired optical disc content from the recording apparatus to the mobile apparatus;
- an optical disc content recording step of copying, with the recording apparatus, the optical disc content to the individual recording area when the transfer permission is acquired; and
- an optical disc content transfer step of automatically copying or moving, with the recording apparatus, the optical disc content to the mobile apparatus in a case where the recording apparatus detects that the recording apparatus has become able to communicate with the mobile apparatus and the optical disc content that has been copied to the individual recording area is designated by the user as a target to be automatically copied or moved.

13. A recording apparatus comprising:
- a non-transitory recording medium;
- an automatic recording control unit that automatically records a first plurality of pieces of content in a channel automatic recording area included in the non-transitory recording medium, each of the first plurality of pieces of content being broadcast through a channel in a time slot, the channel and the time slot being designated by a user; and
- a synchronization control unit that instructs a mobile apparatus to delete a first piece of content that has previously been copied or moved from the channel automatic recording area to the mobile apparatus, and copies or moves a second piece of content included in the first plurality of pieces of content to the mobile apparatus, when the recording apparatus detects that the recording apparatus has become able to communicate with the mobile apparatus, the synchronization control unit bypassing copying or moving the second piece of content if the first piece of content does not exist in the mobile apparatus and an area available for recording the second piece of content does not exist in the mobile apparatus.

14. A recording system comprising:

a recording apparatus; and a mobile apparatus connected to the recording apparatus such that the mobile apparatus is able to communicate with the recording apparatus, the recording apparatus including an automatic recording control unit that automatically records a first plurality of pieces of content in a channel automatic recording area included in a recording medium, each of the first plurality of pieces of content being broadcast through a channel in a time slot, the channel and the time slot being designated by a user, and a first synchronization control unit that instructs the mobile apparatus to delete a first piece of content that has previously been copied or moved from the channel automatic recording area to the mobile apparatus, and copies or moves a second piece of content included in the first plurality of pieces of content to the mobile apparatus, when the recording apparatus detects that the recording apparatus has become able to communicate with the mobile apparatus, the first synchronization control unit bypassing copying or moving the second piece of content if the first piece of content does not exist in the mobile apparatus and an area available for recording the second piece of content does not exist in the mobile apparatus, and the mobile apparatus including a second synchronization control unit that records the second piece of content that has been copied or moved in a recording medium and deletes the first piece of content in accordance with the instruction to delete the first piece of content.

* * * * *